US007986641B2

(12) United States Patent
Tani et al.

(10) Patent No.: US 7,986,641 B2
(45) Date of Patent: *Jul. 26, 2011

(54) MULTICAST DATA COMMUNICATION METHOD, MULTICAST DATA COMMUNICATION SYSTEM, REPEATER, REPEATING METHOD, AND MEDIUM FOR STORING REPEATING PROGRAMS

(75) Inventors: Seiichiro Tani, Atsugi (JP); Toshiaki Miyazaki, Yokohama (JP); Noriyuki Takahashi, Yokosuka (JP); Takahiro Murooka, Atsugi (JP); Shinya Ishihara, Tokyo (JP); Takeru Inoue, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 518 days.

This patent is subject to a terminal disclaimer.

(21) Appl. No.: 11/852,618

(22) Filed: Sep. 10, 2007

(65) Prior Publication Data

US 2008/0069099 A1 Mar. 20, 2008

Related U.S. Application Data

(63) Continuation of application No. 10/117,369, filed on Apr. 5, 2002, now Pat. No. 7,313,596.

(30) Foreign Application Priority Data

Apr. 9, 2001 (JP) ................................ 2001-110544
May 10, 2001 (JP) ................................ 2001-140286
Aug. 28, 2001 (JP) ................................ 2001-257659

(51) Int. Cl.
*H04L 12/28* (2006.01)
*H04L 12/56* (2006.01)
*G06F 15/173* (2006.01)
*G06F 15/16* (2006.01)

(52) U.S. Cl. ......... 370/255; 370/390; 709/238; 709/245

(58) Field of Classification Search ................. None
See application file for complete search history.

(56) References Cited

U.S. PATENT DOCUMENTS

| 5,696,763 | A | 12/1997 | Gang, Jr. .................... 370/390 |
| 6,212,188 | B1 | 4/2001 | Rochberger et al. ...... 370/395.32 |
| 6,269,080 | B1 * | 7/2001 | Kumar ...................... 370/236 |

(Continued)

FOREIGN PATENT DOCUMENTS

JP 10-063598 3/1998

(Continued)

OTHER PUBLICATIONS

Seiichiro Tani et al., Adaptive Stream Multicast Based on IP Unicast and Dynamic Commerical Attachment Mechanism: An Active Network Implementation, Proceedings of the Third Annual International Working Conference on Active Networks (IWAN01), pp. 116-133, Springer-Verlag, Sep. 2001.

(Continued)

*Primary Examiner* — Xavier Szewai Wong
(74) *Attorney, Agent, or Firm* — Leason Ellis LLP.

(57) ABSTRACT

A multicast data communication system is provided that has high security, and prevents problems such as an attack by a malicious user creating a great number of meaningless tables at nodes in the network. Clients regularly transmit request packets toward a server; a node receives the request packet, and subsequently receives a delivery-table-creation packet or a delivery packet from the server; if the node has no delivery table corresponding to the server, the node creates the delivery table, registers the addresses of the clients, and their request packet arrival times, and regularly transmits the request packet toward the server; when the node has received a delivery packet from the server, the node duplicates and delivers the delivery packet only to those clients whose request packet arrival times, registered in the delivery table, are within a fixed period from the arrival of the delivery packet.

13 Claims, 71 Drawing Sheets

U.S. PATENT DOCUMENTS

| | | | |
|---|---|---|---|
| 6,308,216 B1 | 10/2001 | Goldszmidt et al. | 709/236 |
| 6,532,233 B1 | 3/2003 | Momona et al. | 370/390 |
| 6,611,872 B1 * | 8/2003 | McCanne | 709/238 |
| 6,785,659 B1 | 8/2004 | Landsman et al. | 705/14 |
| 6,859,882 B2 | 2/2005 | Fung | 713/300 |
| 6,862,279 B1 | 3/2005 | Imai et al. | 370/390 |
| 6,914,907 B1 | 7/2005 | Bhardwaj et al. | 370/432 |
| 2001/0019538 A1 * | 9/2001 | Mizutani et al. | 370/248 |
| 2002/0001310 A1 * | 1/2002 | Mai et al. | 370/390 |
| 2002/0062334 A1 | 5/2002 | Chen et al. | 709/200 |
| 2006/0242311 A1 | 10/2006 | Mai et al. | 709/229 |

FOREIGN PATENT DOCUMENTS

| | | |
|---|---|---|
| JP | 11-134353 | 5/1999 |
| JP | 2000-029712 | 1/2000 |
| JP | 2001-285318 A1 | 10/2001 |
| JP | 2001-306611 | 11/2001 |
| JP | 2002-111679 A1 | 4/2002 |

OTHER PUBLICATIONS

Hugh W. Holbrook and David Cheriton, "IP Multicast Channels: EXPRESS Support for Large-scale Single-source Applications", In Proc. Of SIGCOMM, pp. 65-78, Aug. 1999.

Ion Stoica et al., "REUNITE: A Recursive Unicast Approach to Multicast", in Proc. Of INFOCOM2000, pp. 1644-1653, Mar. 2000.

Seiichiro Tani et al., "A job assignment algorithm for transcoding on active multicast", The Institute of Electronics, Information and Communication Engineers, pp. 549-550, Aug. 2001.

Toshiaki Miyazaki et al., "A Stream-data Multicast Protocol Using IP Unicast Address", Technical Report of IEICE (The Institute of Electronics, Information and Communication Engineers) IN2001-9, p. 61-68, May 2001.

Seiichiro Tani et al., "Adaptive commercial multicast on active networks", Technical Report of IEICE (The Institute of Electronics, Information and Communication Engineers) IN2001-8, pp. 53-60, May 2001.

D. Waitzman et al., "RFC 1075: Distance Vector Multicast Routing Protocol", pp. 1-24, Nov. 1998.

S. Deering, "RFC 1112: Host Extensions for IP Multicasting", pp. 1-17, Aug. 1989.

J. Moy, "RFC 1584: Multicast Extensions to OSPF", pp. 1-70, Mar. 1994.

D. Estrin et al., "RFC 2362: Protocol Independent Multicast-Sparse Mode (PIM-SM): Protocol Specification", pp. 1-67, Jun. 1998.

* cited by examiner

FIG. 5

| TREE ID: 1 | | |
|---|---|---|
| | ADDRESS | REQUEST PACKET ARRIVAL TIME |
| CHILD1 | 10.10.9.8 | 10:23:10 |
| CHILD2 | 10.11.10.9 | 10:23:08 |

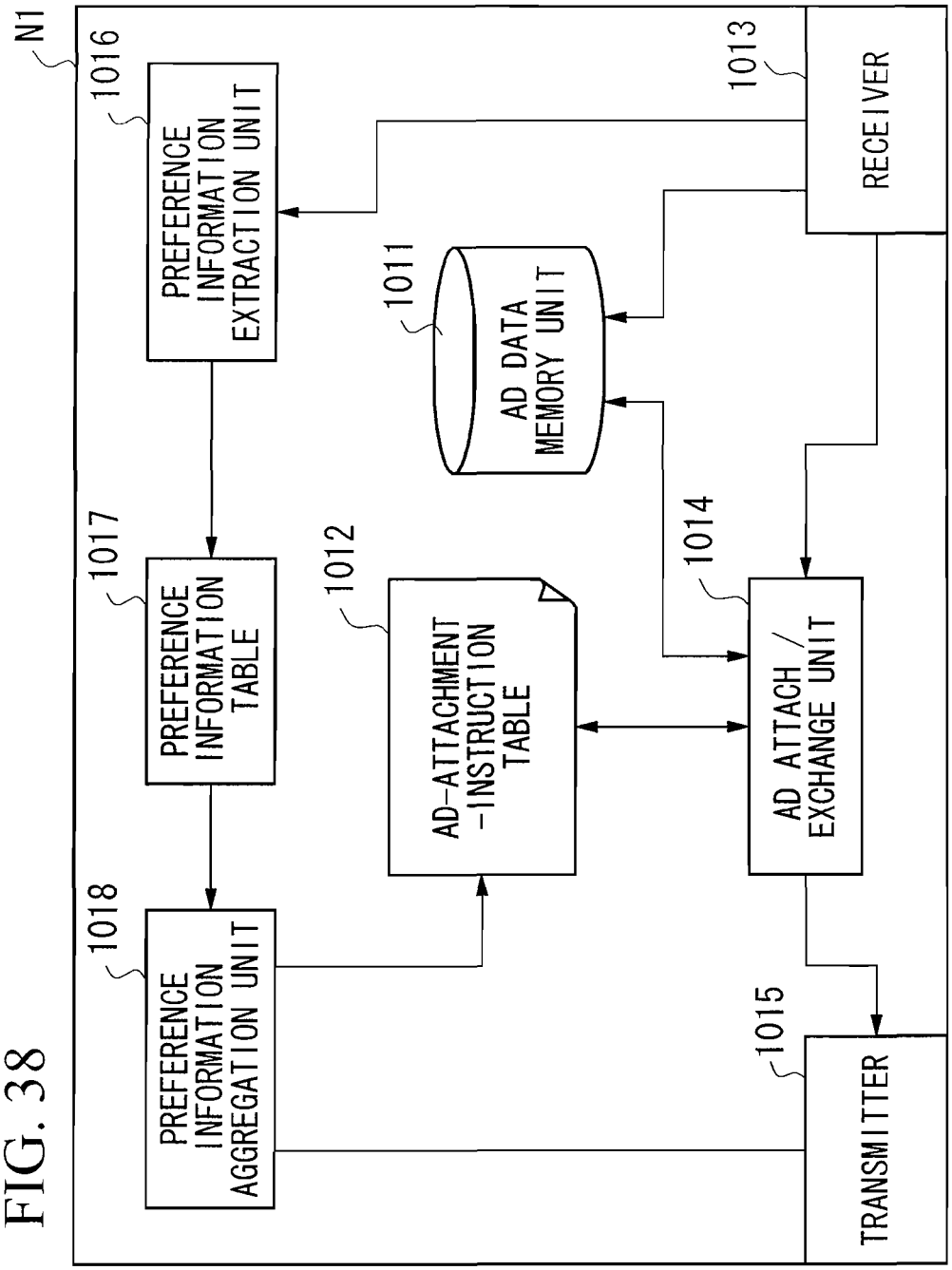

| IN | OUT1 | OUT2 |
|----|------|------|
| φ  | A    | A OR C |
| A  | A    | A    |
| B  | A    | A OR C |
| C  | A    | C    |

1012

| g1001 | φ | A | B |
|---|---|---|---|
| φ | 1 | 10 | 15 |
| A | 1 | 1 | 15 |
| B | 1 | 10 | 1 |

$$G1001 = \begin{pmatrix} 1 & 10 & 15 \\ 1 & 1 & 15 \\ 1 & 10 & 1 \end{pmatrix}$$

FIG. 47A

| g1002 | φ | A | B |
|---|---|---|---|
| φ | 1 | 2 | 2 |
| A | 1 | 1 | 2 |
| B | 1 | 2 | 1 |

$$G1002 = \begin{pmatrix} 1 & 2 & 2 \\ 1 & 1 & 2 \\ 1 & 2 & 1 \end{pmatrix}$$

FIG. 47B

| g1003 | φ | A | B |
|---|---|---|---|
| φ | 1 | 20 | 20 |
| A | 10 | 1 | 20 |
| B | 10 | 20 | 1 |

$$G1003 = \begin{pmatrix} 1 & 20 & 20 \\ 10 & 1 & 20 \\ 10 & 20 & 1 \end{pmatrix}$$

FIG. 47C

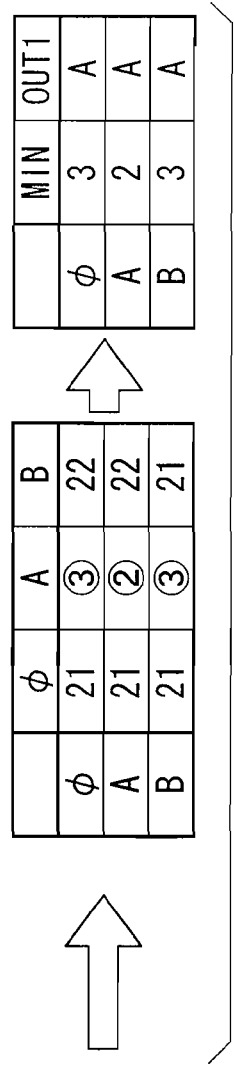
FIG. 49A
FIG. 49B
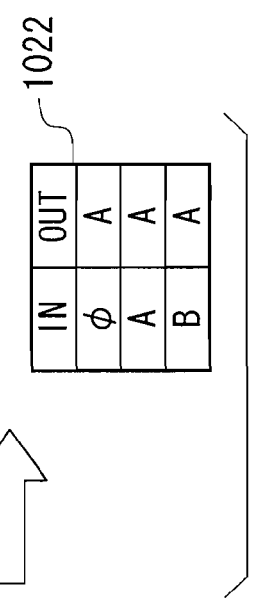
FIG. 49C

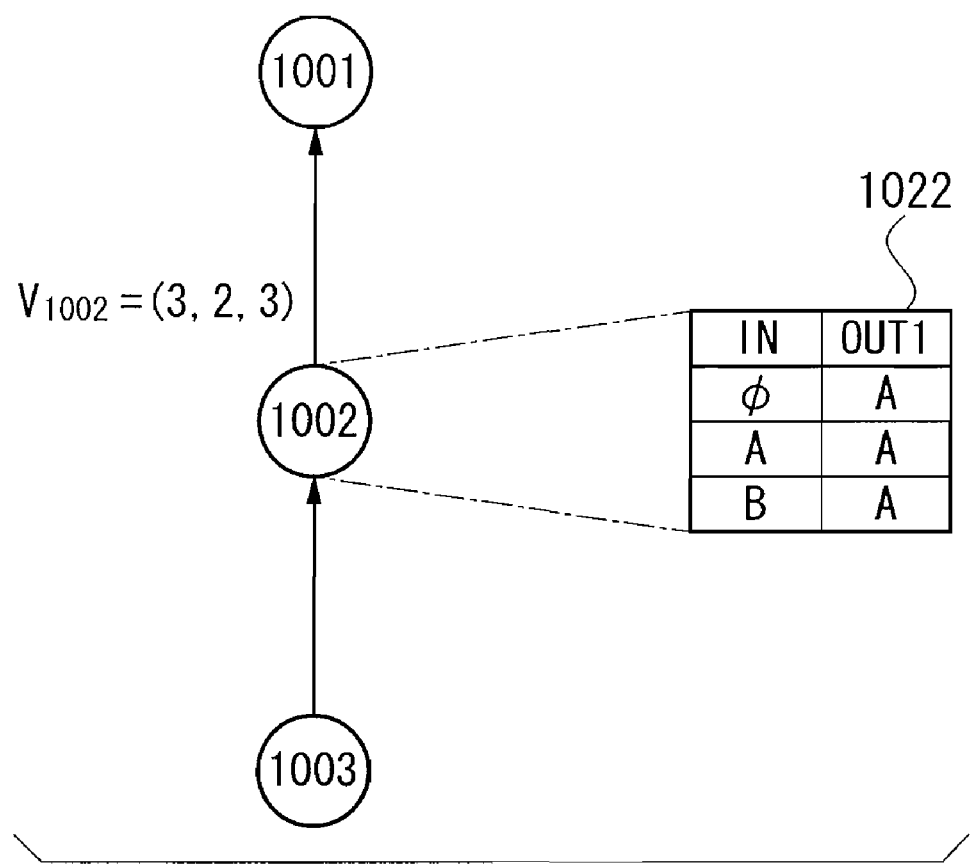

FIG. 55A $$\left( G1002 + \begin{pmatrix} U1 \\ U1 \\ U1 \end{pmatrix} \right) + \left( G1002 + \begin{pmatrix} U2 \\ U2 \\ U2 \end{pmatrix} \right) = \begin{pmatrix} 21 & 11 & 35 \\ 28 & 2 & 35 \\ 28 & 11 & 21 \end{pmatrix} + \begin{pmatrix} 5 & 13 & 18 \\ 12 & 4 & 18 \\ 12 & 13 & 4 \end{pmatrix}$$

FIG. 55B

| | φ | A | B |
|---|---|---|---|
| φ | 21 | ⑪ | 35 |
| A | 28 | ② | 35 |
| B | 28 | ⑪ | 21 |

+

| | φ | A | B |
|---|---|---|---|
| φ | ⑤ | 13 | 18 |
| A | 12 | ④ | 18 |
| B | 12 | 13 | ④ |

FIG. 55C

| | MIN | OUT1 |
|---|---|---|
| φ | 11 | A |
| A | 2 | A |
| B | 11 | A |

+

| | MIN | OUT2 |
|---|---|---|
| φ | 5 | φ |
| A | 4 | A |
| B | 4 | B |

FIG. 55D

| | V1002 |
|---|---|
| φ | 16 |
| A | 6 |
| B | 15 |

| IN | OUT1 | OUT2 |
|---|---|---|
| φ | A | φ |
| A | A | A |
| B | A | B |

1022

|  | A | B | C |
|---|---|---|---|
| 1~1000 | A1 | B1 | C1 |
| 1001~10000 | A2 | B2 | C2 |
| 10001~ | A3 | B3 | C3 |

1029

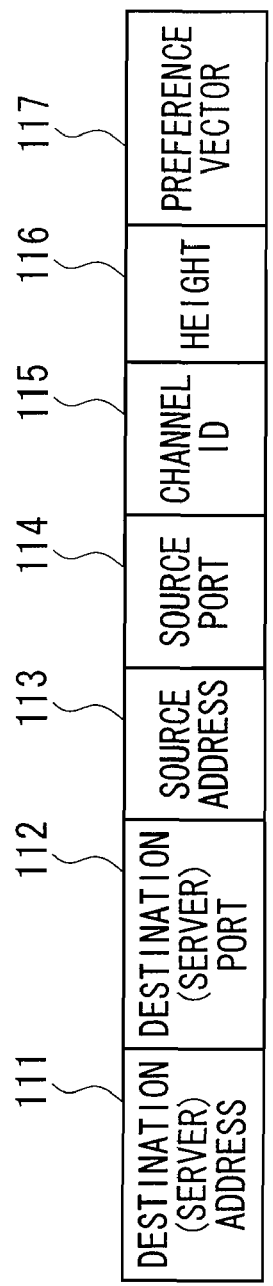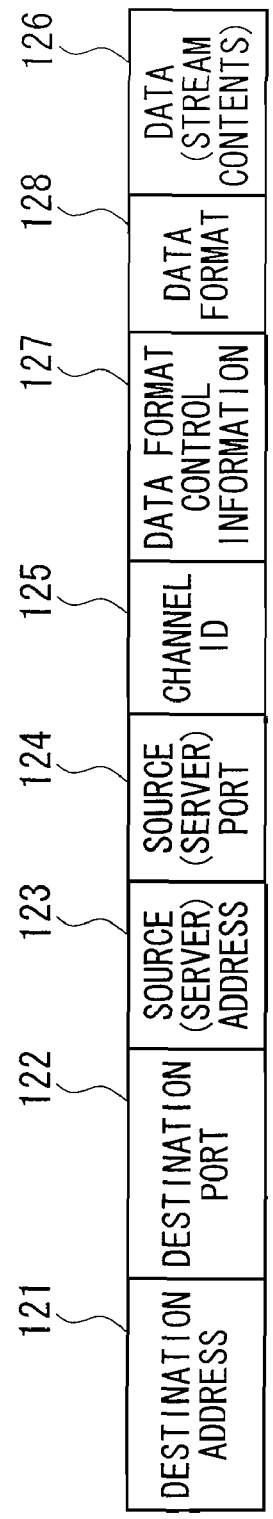

FIG. 70

MULTICAST TREE (SERVER ADDRESS, CHANNEL ID)

| CHILD NUMBER | ADDRESS | PORT | REQUEST PACKET ARRIVAL TIME | PREFERENCE VECTOR | AD | | | |
|---|---|---|---|---|---|---|---|---|
| | | | | | φ | A | B | C |
| 1 | 10.10.9.8 | 17000 | 23:45:40 | (1,0,1) | A | A | A | A |
| 2 | 10.11.10.9 | 12800 | 23:45:41 | (1,0,0) | A | A | A | A |
| 3 | 10.12.11.10 | 23403 | 23:45:38 | (1,1,0) | A | A | A | A |
| 4 | 10.13.12.11 | 59830 | 23:45:44 | (0,1,1) | B | B | B | A |
| 5 | ... | ... | ... | ... | ... | ... | ... | ... |

US 7,986,641 B2

MULTICAST DATA COMMUNICATION METHOD, MULTICAST DATA COMMUNICATION SYSTEM, REPEATER, REPEATING METHOD, AND MEDIUM FOR STORING REPEATING PROGRAMS

RELATED APPLICATION

This application is a continuation of U.S. patent application Ser. No. 10/117,369, filed Apr. 5, 2002, which claims the benefit of Japanese Patent Application No. 2001-110544 filed Apr. 9, 2001, Japanese Patent Application No. 2001-140286 filed May 10, 2001, and Japanese Patent Application No. 2001-257659 filed Aug. 28, 2001.

BACKGROUND OF THE INVENTION

1. Field of the Invention

The present invention relates to a multicast data communication method, which multicasts data to a plurality of clients (receivers) on the existing Internet, supporting only one-to-one communication (unicast), a multicast data communication system, a repeater, a repeating method, and a medium for storing repeating programs.

2. Description of the Related Art

Conventionally, IP multicast is a method for realizing multicast communication for multicasting data to a plurality of clients on the Internet, by using predetermined multicast IP addresses. In this method, when a server (transmitter) transmits data with a multicast IP address as the destination, a multicast router (repeater) installed on the Internet copies the data during delivery when necessary, and delivers identical data to all the clients.

Normally, the data delivery path from the server to the plurality of clients is a tree having the server as its root and the clients as its leaves. This is termed a multicast tree. In IP multicast, the multicast tree is constructed from protocols such as DVMRP (Distance-Vector Multicast Routing Protocol) of RFC1075, MOSPF (Multicast Open Shortest Path First) of RFC1584, PIM-SM (Protocol Independent Multicast-Sparse Mode) of RFC2362, and a protocol IGMP (Internet Group Management Protocol) of RFC1112 manages the joining and leaving of the clients to/from the tree.

To realize the IP multicast mentioned above, all routers must be compatible with IP multicast. However, the reality is that many routers are not compatible with IP multicast, making it very difficult to implement with all routers. IP multicast has another disadvantage that it is not possible to pass a multicast packet through a network which is not compatible with multicast. Moreover, to realize IP multicast, the client must expand its function at the operating system level, and consequently it is not easy for individual clients to make themselves compatible with IP multicast.

The abovementioned protocols have a drawback of no scalability. In DVMRP, even when no client exists, the multicast tree is constructed to the router nearest the client and data is delivered. In MOSPF, each node must keep topology information relating to the whole of the massive multicast tree. In PIM-SM, a client joining the multicast tree must access a specific node termed a "rendezvous points".

Furthermore, since the above protocols must guarantee that the multicast IP address is global and unique, the cost of managing the addresses to identify the multicast tree is high. In addition, the above protocols allow hosts who are not participating in the multicast tree to become servers, enabling an attack from a malicious host to send unwanted traffic to participants in the multicast tree.

Japanese Unexamined Patent Application, First Publication No. Hei 10-63598 discloses a multicast data communication method using only unicast, and not using IP multicast. According to this method, a multicast server (node or repeater) who has received a request from a client to start receiving, stores the address of the client, and thereafter delivers multicast data to that client until a request to end receiving is received from that client.

However, this method has a problem that the delivery of multicast data to the client does not stop when the request to end receiving from the client has been lost during transmission, or when the client has hung up. A further drawback is that, once the delivery path has been decided by the request to start receiving, the delivery path to the client does not change, even when the nearest node to the client has changed due to a change in the route information of the router.

FIG. 71 shows one example of a network constitution for multicast communication, and shows four clients 2-1, 2-2, 2-3, and 2-4 connected via a network to one node 1.

Let us imagine that an unillustrated server is connected to the node 1 via the network. The four clients 2-1, 2-2, 2-3, and 2-4 have addresses 10.10.9.8, 10.11.10.9, 10.12.11.10, and 10.13.12.11, and are located on the opposite side of the node 1 to the server.

Now let us suppose that of the four clients 2-1 to 2-4, the three clients 2-1 to 2-3 with the addresses 10.10.9.8, 10.11.10.9, and 10.12.11.10, have transmitted request packets. When the request packets arrive at the node 1, a table for the server is created at the node 1, and the three clients 2-1 to 2-3 are registered in the table.

The table shows that the node 1 should duplicate a delivery packet from the server, and delivery it to the three clients. The clients registered in the table are known as the "children" of the node 1.

FIG. 72 shows an example of the table. The addresses of the children are stored in the table.

When a new table is created, the node 1 itself transmits the request packet. In order to send the request packet to a node near the server, some sort of method is used to determine a routing tree for each multicast identifier. In this way, the request packet eventually arrives at the server.

FIG. 73 shows another example of the constitution of a network where multicast communication is carried out, and shows three nodes 11-1, 11-2, and 11-3 connected to seven clients 12-1, 12-2, 12-3, 12-4, 12-5, 12-6, and 12-7 and one server 13 via the network.

Next, the process of forming a multicast tree will be explained.

Let us suppose that the client 12-1 sends a request packet, as shown in FIG. 74. At this time, a table showing that the client 12-1 is a child of the node 11-1 is created at the node 11-1, and, as shown in FIG. 75, the node 11-1 transmits the request packet.

When the request packet arrives at the node 11-2, the node 11-2 similarly creates a table, and registers the node 11-1. Then, the node 11-2 transmits the request packet. The arrival of the request packet at the server 13 informs the server 13 that the data should be sent to the node 11-2, and the server 13 starts to transmit the delivery packet.

Thereafter, let us suppose that the client 12-2 transmits a request packet, as shown in FIG. 76. When this request packet arrives at the node 11-1, the client 12-2 is registered in the existing table. When the client 12-4 sends a request packet, as shown in FIGS. 77 and 78, the node 11-3 registers the client 12-4, and the node 11-2 registers the node 11-3. FIG. 79 shows the state when the clients 12-5 and 12-6 have also joined the multicast.

Thus a tree-shaped delivery path is constructed with the server as the root and the clients as the leaves. This type of tree-shaped delivery path is created for each server. When the tree is identified by a code termed a tree ID (multicast identifier), as shown in FIG. 72, a table for each tree ID is created at the node.

At each node, the delivery packet transmitted from the server is duplicated when necessary, and then sent to the children registered in the table. For this reason, even when the path from the clients to the server is different from the path from the server to the clients, the delivery packets always pass through nodes where tables have already been created.

When a client wishes to stop receiving the delivery packets, the client transmits a leave packet; when the leave packet arrives at the node, the node simply deletes the client who sent the leave packet from the table. Then, when the children registered in the table have disappeared, the node outputs a leave packet. As in the case of the request packet, the leave packet is transmitted by some sort of method to the node nearest the server. As disclosed in Japanese Unexamined Patent Application, First Publication No. Hei 10-63598, the nodes need only repeat the same process.

However, the communication method described above has a drawback that, when a client has hung up or forcibly terminated communication without transmitting a leave packet, the client remains registered in the table at the node, and the server continues to send delivery packets to this client.

To prevent this, the node is provided with a timer, and sends regular inquiries to the children registered in its table. When a reply packet has been returned from the child, the node concludes that the child is still receiving, and continues to transmit the delivery packets; when no reply arrives, the node terminates transmission.

When a parent node has sent an inquiry to the node, the node sends back a reply packet in the case where the child is registered in the table; when no children are registered in the table, the node either does not send a reply packet or sends a leave packet to the parent node. The tree is maintained in this way so that the delivery packets are only delivered to children who return reply packets.

For example, in the network constitution shown in FIG. 71, the node 1 sends inquiries to the three children (clients) having the addresses 10.10.9.8, 10.11.10.9, and 10.12.11.10, which are registered in the table as shown in FIG. 72. Let us suppose that the children with the addresses 10.10.9.8 and 10.11.10.9 are operating correctly, and have replied by sending reply packets, but the child with address 10.12.11.10 has hung up, and consequently has not sent a reply packet. The node 1 now determines that it is not necessary to deliver the delivery packet to the child with address 10.12.11.10, and, as shown in FIG. 81, deletes that child from the table.

Alternatively, instead of sending the delivery packet and the inquiry packet separately, the delivery packet can be treated as an inquiry packet, and when the client (or the node) receives the delivery packet, they send a reply packet to the server.

However, according to these methods, the client (or the node) must transmit a request packet at the start of receiving in order to be registered in the table of the parent node. In a network where there is the possibility of losing the request packet, the client (or the node) must repeatedly transmit the request packet until it is registered in the table of the parent node. A reply packet is then sent with regard to the delivery packet after the client (or the node) has been registered in the table. That is, there is a problem that a state transition is required from actively transmitting a packet to passively transmitting a packet.

Techniques similar to that in Japanese Unexamined Patent Publication, First Publication No. Hei 10-63598 described above have been disclosed in Hugh W. Holbrook, David R. Cheriton, "IP Multicast Channels: EXPRESS Support for Large-scale Single-source Applications" pp. 65-78, In Proc. of SIGCOMM, 1999, and in Ion Stoica, T. S. Eugene Ng, Hui Zhang, "REUNITE: A Recursive Unicast Approach to Multicast" pp. 1644-1653, in Proc, of INFOCOM2000 (hereinafter termed REUNITE).

The first of these documents proposes a method of IP multicast expansion termed "source-specific multicast" (SSM), wherein a source address and a multicast address are coupled together to identify the multicast tree. The REUNITE document describes a multicast technique in an application layer, where the multicast tree is determined based on the forward-path to the first client who transmits a request. When this client later leaves the multicast tree, the multicast tree is determined based on the forward-path to another client, changing the constitution of the multicast tree.

However, the methods of Japanese Unexamined Patent Publication, First Publication No. Hei 10-63598, SSM, and REUNITE, have security problems such as the following. Any server or client can create a table at any node on the path from server/client to the destination by transmitting a packet having a table-creation function (e.g. the request packet described above) with a random terminal address as the destination. By taking advantage of this, a malicious user can send table-creation packets to a great number of addresses, creating a great number of meaningless tables in the network nodes. As a result, the load of the nodes becomes unnecessarily heavy, reducing their capability.

SUMMARY OF THE INVENTION

It is an object of this invention to provide a high-security multicast data communication method which has no problem of heavy load caused by an attack from a malicious user who creates a great number of meaningless tables in the network nodes, a multicast data communication system, a repeater, a repeating method, and a medium for storing repeating programs.

It is another object of this invention to provide the multicast data communication method which can stop delivery of multicast data when a client has malfunctioned and when a packet has been lost during transmission, the multicast data communication system, the repeater, the repeating method, and the medium for storing repeating programs.

It is still another object of this invention to provide the multicast data communication method which enables the delivery path of the multicast data to be changed when the nearest node to the client has changed, and when the load status of the node has changed, the multicast data communication system, the repeater, the repeating method, and the medium for storing repeating programs.

It is yet another object of this invention to provide the multicast data communication method which requires no state transition at the client from actively transmitting packets to passively transmitting them, the multicast data communication system, the repeater, the repeating method, and the medium for storing repeating programs.

Other objects of this invention will become clear from the description given in the following specification, diagrams, and in particular the claims.

To achieve the above objects, this invention utilizes a method (hereinafter termed "keep alive method") in which the clients regularly issue request packets, and the server and nodes stop delivering multicast data to clients from whom a request packet does not arrive within a predetermined time interval.

A first aspect of this invention provides a multicast data communication system which uses a network capable of unicast communication to multicast data via one or more repeaters provided on a unicast delivery path from a transmitter to a plurality of receivers, each receiver comprising a unit for transmitting a request message with the transmitter as the destination at a time interval which is shorter than a predetermined value; the transmitter comprising a unit which determines whether a node adjacent to the receiver side is continuing to request receipt of the data, based on whether a receive interval of the request message is shorter than a predetermined time interval, and a unit which transmits the data toward the receivers when it has been determined that a node adjacent to the receiver side is continuing to request receipt of the data; and each repeater comprising a unit which creates a delivery table for registering one or more nodes adjacent to the receiver side where the data should be delivered to when, after the request message has been received from the node adjacent to the receiver side, the data or a delivery-table-creation packet has been received from a node adjacent to the transmitter side; a unit which registers the node adjacent to the receiver side which transmitted a request message after the delivery table was created, in the delivery table; a unit which determines whether the node adjacent to the receiver side is continuing to request receipt of the data, based on whether a receive interval of the request messages is shorter than a predetermined time interval; and a unit which, when it has been determined that the node adjacent to the receiver side is continuing to request receipt of the data, transmits a request message with the transmitter as the destination at a time interval which is shorter than a predetermined value, and in addition, replicates the data, sent from the node adjacent to the transmitter side, and delivers the replicated data to the nodes adjacent to the receiver side, which are registered in the delivery table.

A second aspect of this invention provides a multicast data communication method which uses a network capable of unicast communication to multicast data via one or more repeaters provided on a unicast delivery path from a transmitter to a plurality of receivers, the method comprising the steps of: each receiver transmitting a request message with the transmitter as the destination at a time interval which is shorter than a predetermined value; each repeater creating a delivery table for registering one or more nodes adjacent to the receiver side where the data should be delivered to when, after the request message has been received from the node adjacent to the receiver side, the data or a delivery-table-creation packet has been received from a node adjacent to the transmitter side; the transmitter determining whether a node adjacent to the receiver side is continuing to request receipt of the data, based on whether a receive interval of the request messages is shorter than a predetermined time interval, transmitting the data to the node adjacent to the receiver side which are continuing to request receipt of the data, and terminating the delivery of the data to the node adjacent to the receiver side which have stopped requesting receipt of the data; each repeater registering the node adjacent to the receiver side which transmitted a request message after the delivery table was created, in the delivery table; and each repeater determining whether the node adjacent to the receiver side is continuing to request receipt of the data, based on whether a receive interval of the request messages is shorter than a predetermined time interval; and, when it has been determined that the node adjacent to the receiver side is continuing to request receipt of the data, transmitting a request message with the transmitter as the destination at a time interval which is shorter than a predetermined value, replicating the data, sent from the node adjacent to the transmitter side, and delivering the replicated data to the nodes adjacent to the receiver side, which are registered in the delivery table.

A third aspect of this invention provides a repeater in a multicast data communication system, which uses a network capable of unicast communication to multicast data from a transmitter to a plurality of receivers, the repeater being provided on a unicast delivery path from the transmitter to the plurality of receivers, and comprising: a unit which creates a delivery table for registering one or more nodes adjacent to the receiver side where the data should be delivered to when, after the request message, sent by one of the plurality of receivers with the transmitter as the destination at a time interval which is shorter than a predetermined value, has been received from the node adjacent to the receiver side, the data or a delivery-table-creation packet has been received from a node adjacent to the transmitter side; a unit which registers the node adjacent to the receiver side which transmitted a request message after the delivery table was created, in the delivery table; a unit which determines whether the node adjacent to the receiver side is continuing to request receipt of the data, based on whether a receive interval of the request message is shorter than a predetermined time interval; and a unit which, when it has been determined that the node adjacent to the receiver side is continuing to request receipt of the data, transmits a request message with the transmitter as the destination at a time interval which is shorter than a predetermined value, and in addition, replicates the data, sent from the node adjacent to the transmitter side, and delivers the replicated data to the nodes adjacent to the receiver side, which are registered in the delivery table.

A fourth aspect of this invention provides a repeating method, applied when using a network capable of unicast communication to multicast data from a transmitter to a plurality of receivers, the data being repeated via one or more repeaters provided on a unicast delivery path from the transmitter to the plurality of receivers, the method comprising the steps of: receiving request messages, sent by the plurality of receivers with the transmitter as the destination at a time interval which is shorter than a predetermined value; creating a delivery table for registering one or more nodes adjacent to the receiver side where the data should be delivered to when, after the request message has been received from the node adjacent to the receiver side, the data or a delivery-table-creation packet has been received from a node adjacent to the transmitter side; registering the node adjacent to the receiver side, which transmitted a request message after the delivery table was created, in the delivery table; determining whether the node adjacent to the receiver side is continuing to request receipt of the data, based on whether a receive interval of the request message is shorter than a predetermined time interval; and when it has been determined that the node adjacent to the receiver side is continuing to request receipt of the data, transmitting a request message with the transmitter as the destination at a time interval which is shorter than a predetermined value, and in addition, replicating the data, sent from the node adjacent to the transmitter side, and delivering the replicated data to the nodes adjacent to the receiver side, which are registered in the delivery table.

A fifth aspect of this invention provides a computer-readable medium which stores repeating programs for repeating data when using a network capable of unicast communication to multicast data from a transmitter to a plurality of receivers, the data being repeated on a unicast delivery path from the transmitter to the plurality of receivers, the repeating program comprising the steps of: a step of receiving request messages, sent by the plurality of receivers with the transmitter as the destination at a time interval which is shorter than a predetermined value; a step of creating a delivery table for registering one or more nodes adjacent to the receiver side where the data should be delivered to when, after the request message has been received from the node adjacent to the receiver side, the data or a delivery-table-creation packet has been received from a node adjacent to the transmitter side; a step of registering the node adjacent to the receiver side, which transmitted the request message after the delivery table was created, in the delivery table; a step of determining whether the node adjacent to the receiver side is continuing to request receipt of the data, based on whether a receive interval of the request message is shorter than a predetermined time interval; and a step of, when it has been determined that the node adjacent to the receiver side is continuing to request receipt of the data, transmitting a request message with the transmitter as the destination at a time interval which is shorter than a predetermined value, and in addition, replicating the data, sent from the node adjacent to the transmitter side, and delivering the replicated data to the nodes adjacent to the receiver side, which are registered in the delivery table.

According to this invention, the repeater does not create a delivery table when it receives only a request message, regularly output by the receivers, or only data from the transmitter. Consequently, an attack by a malicious user, who sends packets for creating delivery tables to a great number of addresses, will not result in the creation of a great number of meaningless delivery tables at repeaters in the network. Therefore, it is possible to prevent the load of the repeater from becoming heavy, reducing its capability, as a result of the above attack.

According to this invention, the receivers regularly transmit request messages, and the transmitter and repeaters stop delivering multicast data to receivers whose request message does not arrive within a predetermined time interval; this makes it possible to stop delivering multicast data when a receiver has malfunctioned, and when a packet has been lost during transmission. Further, since the receivers continue to regularly send request messages, the delivery path of the multicast data can be changed even when the nearest repeater to the receiver has changed, and even when the load status of the repeater has changed; moreover, the receiver need only output packets actively, and does not need to shift its transmission status.

BRIEF DESCRIPTION OF THE DRAWINGS

FIG. 5 is a diagram showing one example of an updated delivery table according to the first embodiment of this invention;

FIG. 38 is a block diagram showing the internal constitution of a node according to a first apparatus example in an applied example of this invention;

FIGS. 47A to 47C are diagrams showing specific example of cost function according to the second example of a method in the applied example of this invention;

FIGS. 49A to 49C are diagrams showing example calculations of cost functions according to the second example of the method in the applied example of this invention;

FIG. 50 is a diagram showing another part of an example of a specific operation of a request phase according to the second example of the method in the applied example of this invention;

FIGS. 55A to 55D are diagrams showing a calculation example of the node 1002 in FIG. 54A;

FIG. 67 is a diagram showing the format of a request packet in a multicast data communication system according to the applied example of this invention equipped with a transcoding function;

FIG. 68 is a diagram showing the format of a delivery packet in a multicast data communication system according to the applied example of this invention equipped with a transcoding function;

FIG. 70 is a diagram showing one example of an integrated delivery table of a node according to the applied example of this invention equipped with a transcoding function;

DETAILED DESCRIPTION OF THE PREFERRED EMBODIMENTS

Preferred embodiments of the present invention will be explained with reference to the drawings.

Firstly, examples of areas which embodiments of this invention are applied in will be explained, but the application of the invention is not limited to these areas. The embodiments of this invention are preferably applied in individual broadcast station stream delivery for a mass audience on a broad network. Individual broadcast station stream delivery here signifies a type of stream delivery in which a terminal belonging to an individual becomes the source of a stream. The terminal belonging to the individual may be a fixed terminal or a mobile terminal, though the stream source may vary from time to time in the case of a mobile terminal. The transmission period in individual broadcast station stream delivery is often comparatively short. This feature of individual broadcast station stream delivery makes it difficult to construct a predetermined multicast tree.

The following requirements must be satisfied in order to realize multicast communication which takes into consideration the area of application described above. Since both the transmitter and receivers are mass (general users), there is a need for a protocol which can guarantee high security. Furthermore, since it is impossible to guess where a stream will be delivered from, it must be possible to construct the multicast tree on demand. Non-concentrated control is needed to maintain scalability with respect to the number of receivers and the like to whom the stream is delivered. Considering the likelihood of applying the multicast data communication system on a broad network, it must be flexible enough to cope with route changes and the like.

Embodiment 1

Figure 1:
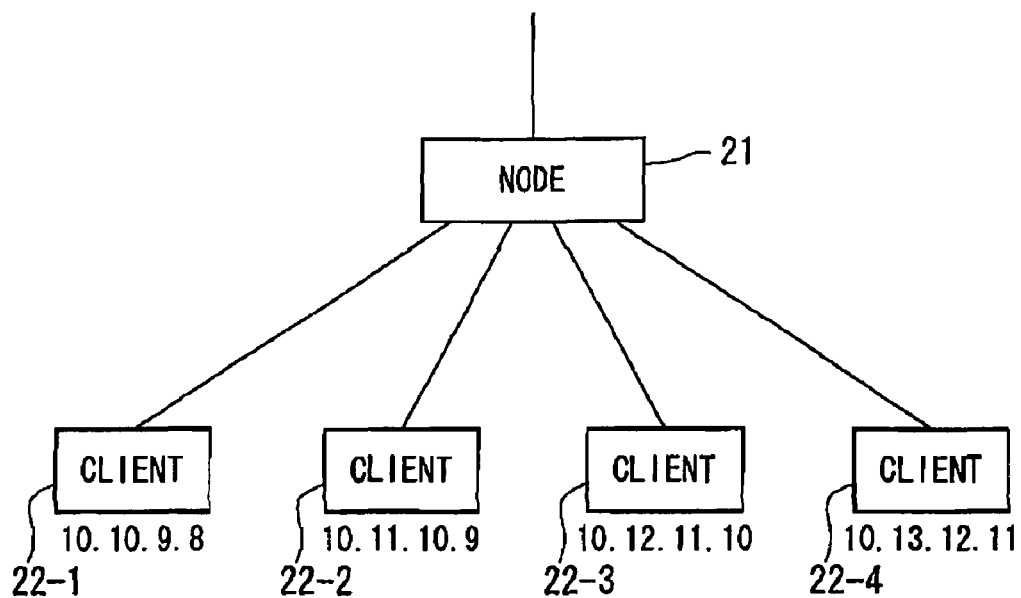
FIG. 1 is a diagram showing one example of the constitution of a network in multicast communication according to a first embodiment of this invention.
Figure 71:
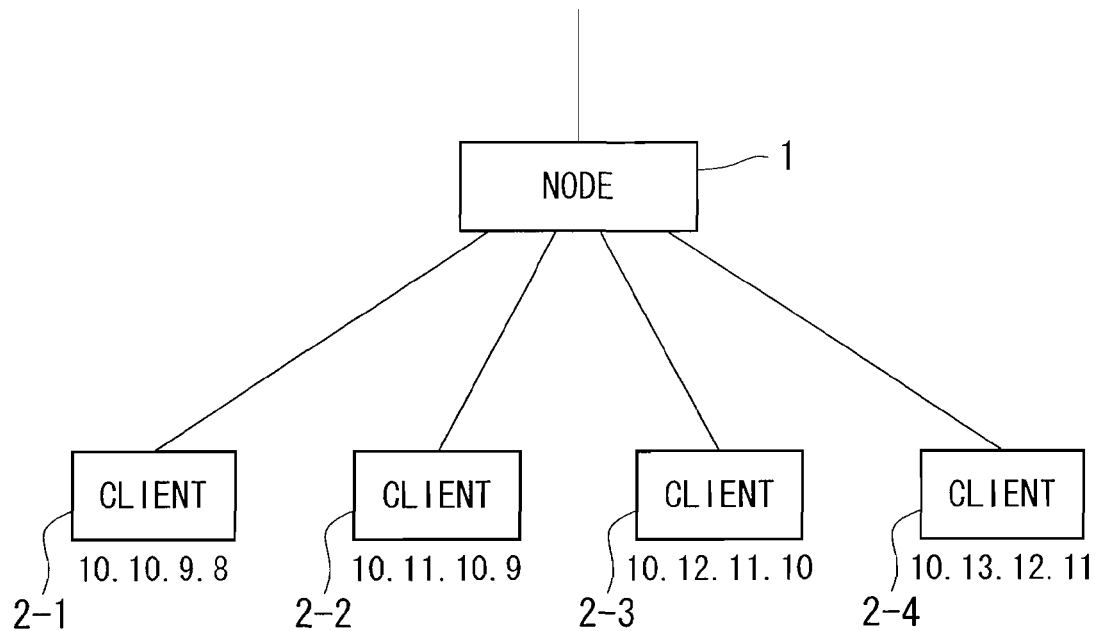
FIG. 71 is a diagram showing one example of the constitution of a network in conventional multicast communications.
Figure 72:
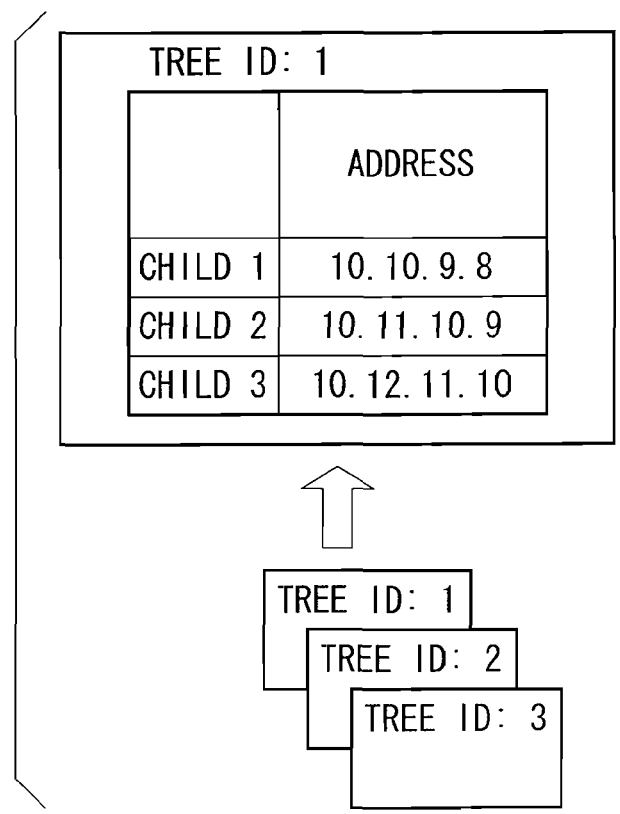
FIG. 72 is a diagram showing one example of a conventional table, created and updated by a node.

FIG. 1 shows one example of a network constitution where multicast communication is performed; this example is similar to the conventional example shown in FIG. 71. Four clients 22-1, 22-2, 22-3, and 22-4 (having the same addresses as those shown in FIG. 71) connect via the network to a node 21, and an unillustrated server is connected via the network to the node 21.

The clients 22-1 to 22-4 transmit request packets at time intervals which are shorter than a predetermined value. When a request packet arrives at the node 21, the arrival time is stored in a table of the node 21 (hereinafter termed "delivery table"). The children are registered at the node 21, and the node 21 itself transmits request packets toward the server at time intervals which are shorter than a predetermined value. When the request packet arrives at a node which is closer to the server, the arrival time is stored. The timing of the transmission of request packets from the node itself toward the server will be explained later.

Figure 2:
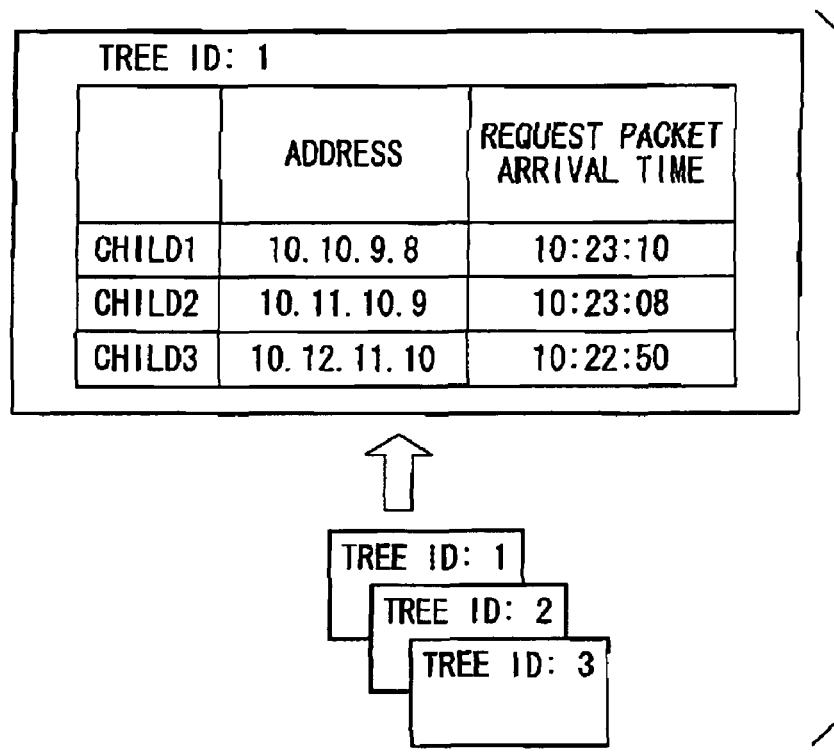
FIG. 2 is a diagram showing one example of a delivery table according to the first embodiment of this invention, created and updated by a node.

FIG. 2 shows an example of a delivery table according to this embodiment, where the address of each child and the arrival time of the request packet from each child are stored in the node 21 for each child.

When a delivery packet from the server arrives at the node 21, the node 21 compares the present time with the request packet arrival time of each child stored in the delivery table; any child whose interval time has exceeded a given value is timed out, and the node 21 does not transmit a delivery packet to that child. The child is deleted from the delivery table.

Figure 3:
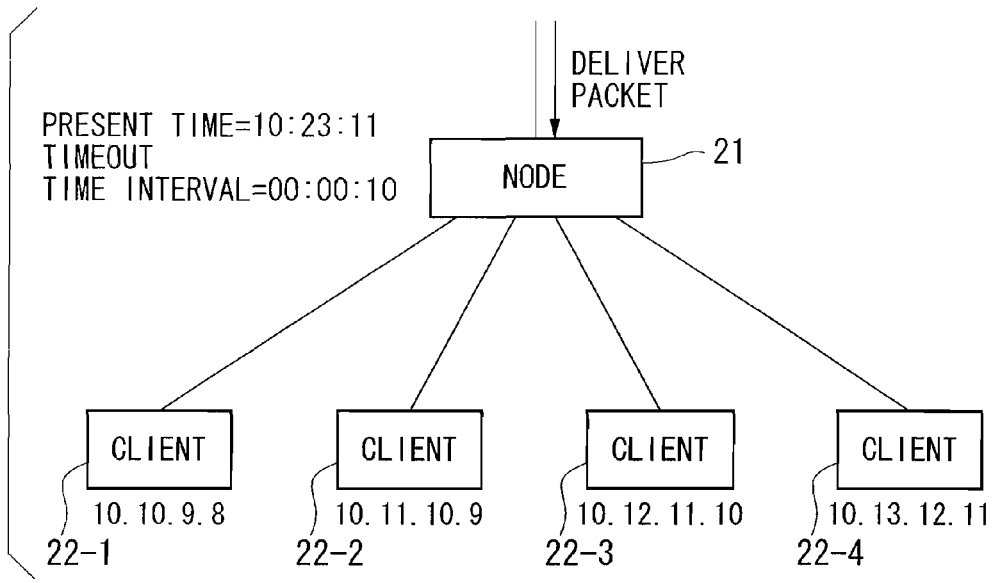
FIG. 3 is a diagram showing a process of unicasting data from a node according to the first embodiment of this invention.
Figure 4:
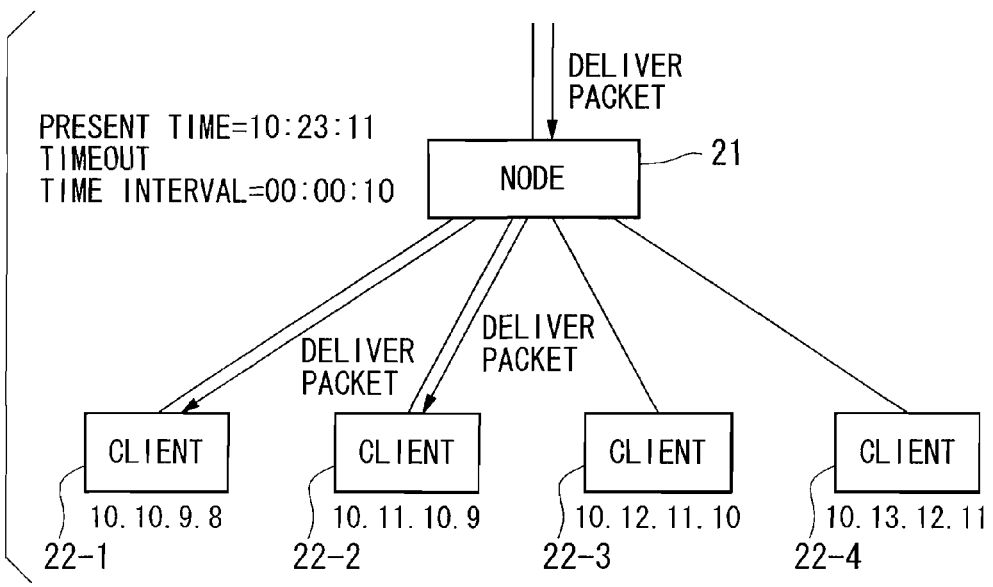
FIG. 4 is a diagram showing a process of unicasting data from a node according to the first embodiment of this invention.

For example, FIG. 3 shows the state when a delivery packet from the server has arrived at the node 21 at time 10:23:11. If the timeout interval is 00:00:10, of the child in FIG. 2 only child 3 is timed out. Therefore, as shown in FIG. 4, this delivery packet is transmitted only to child 1 and child 2 (clients 22-1 and 22-2). In addition, child 3 is deleted from the delivery table. FIG. 5 shows the delivery table after child 3 has been deleted.

When all children have been timed out, the delivery table itself is deleted. There are other methods for deleting the children stored in the delivery table and the delivery table itself. For example, the amount of processing when forwarding a delivery packet can be reduced by deleting the timed-out children from the delivery table of tree ID corresponding to a request packet, when the request packet has arrived. This is advantageous when the forwarding rate is important, such as in the case of real time stream data. To more reliably delete the timed-out children and the delivery table, the node itself may regularly activate a program for deleting them.

A keep alive system not only increases tolerance against client hang-ups and forced termination, but is also capable of dynamically reconstructing a tree in accordance with the load status of the node.

Figure 6:
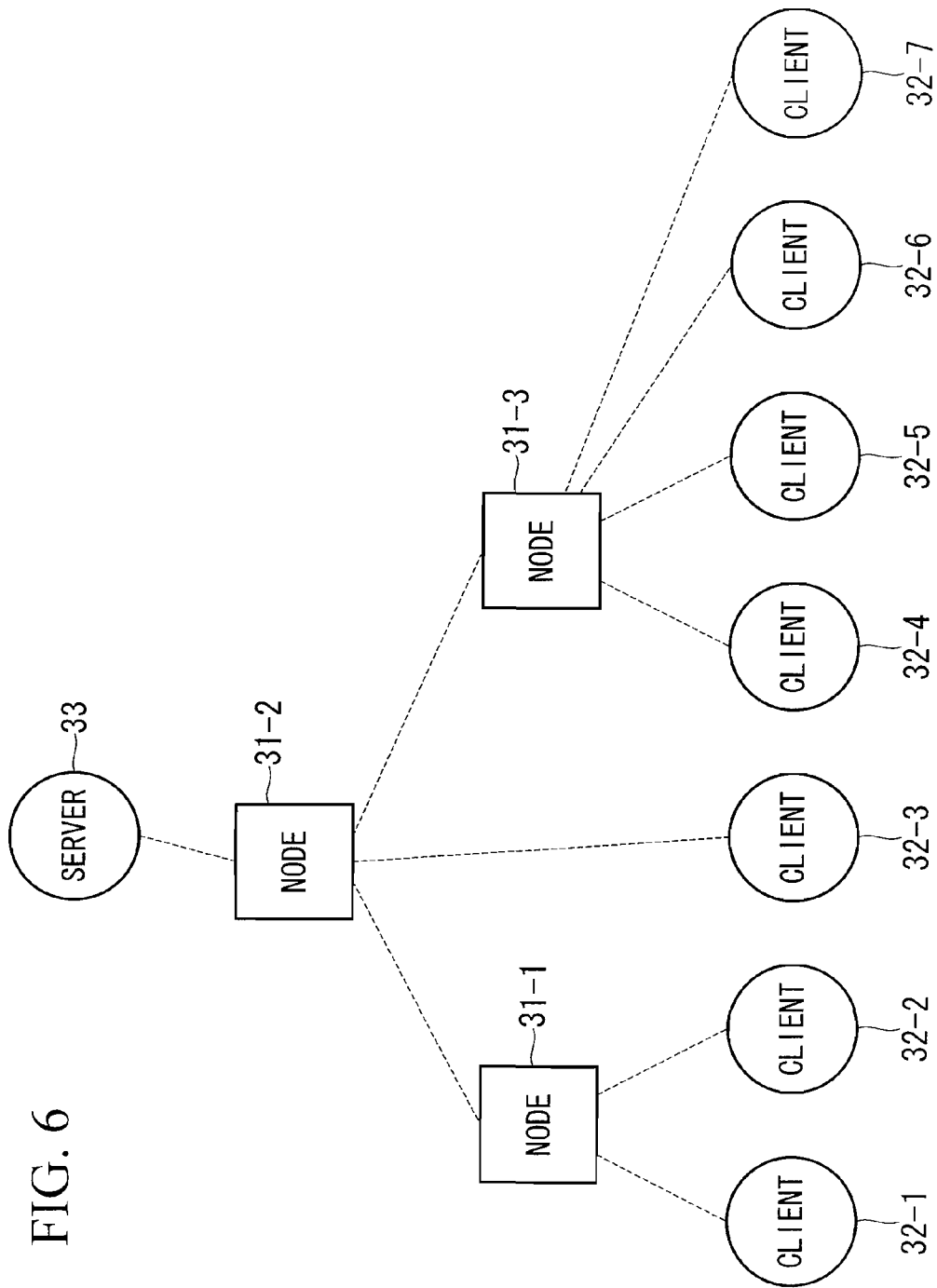
FIG. 6 is a diagram showing another example of the constitution of a network in multicast communication according to the first embodiment of this invention.
Figure 73:
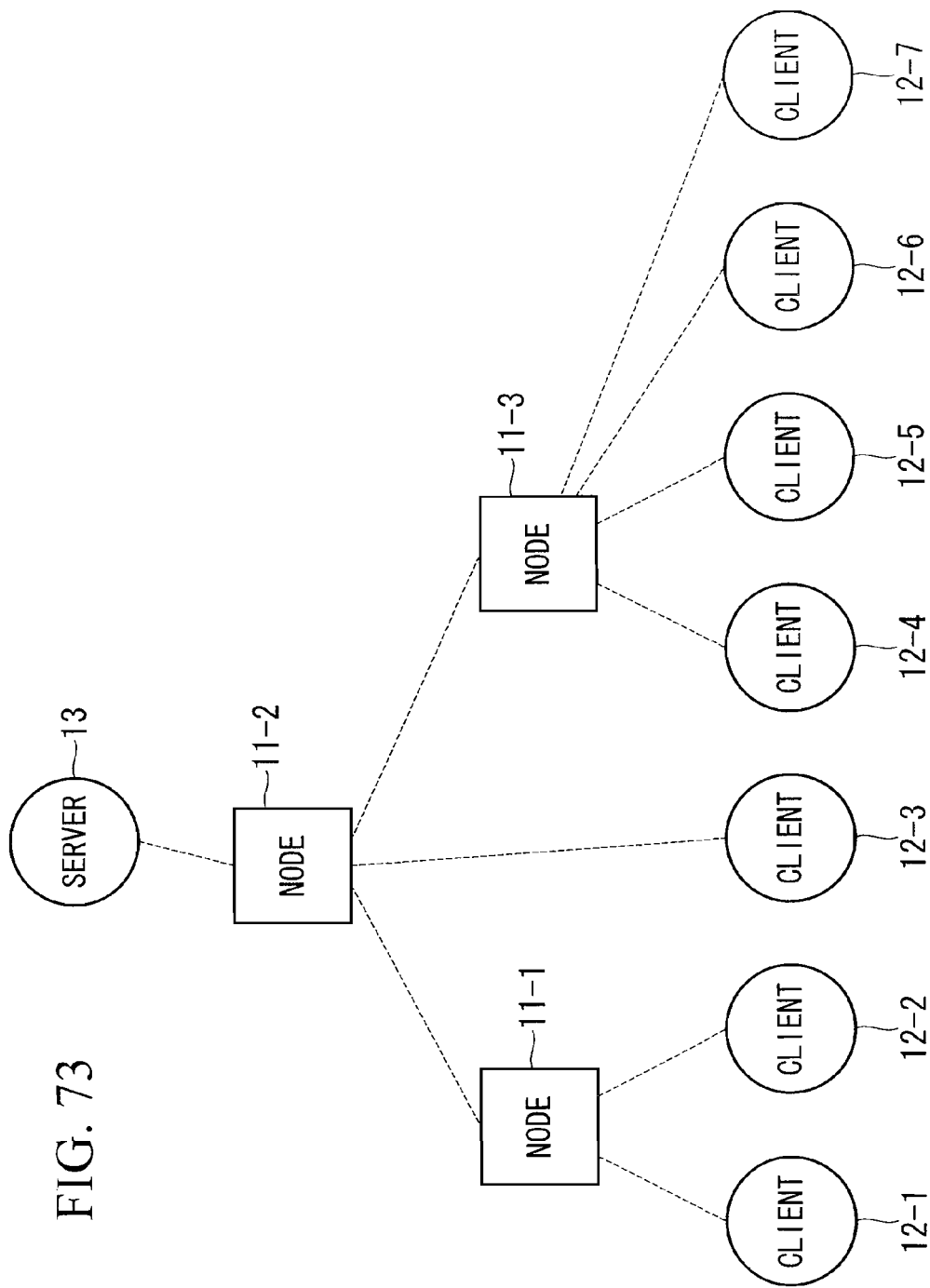
FIG. 73 is a diagram showing another example of the constitution of a network in conventional multicast communications.
Figure 74:
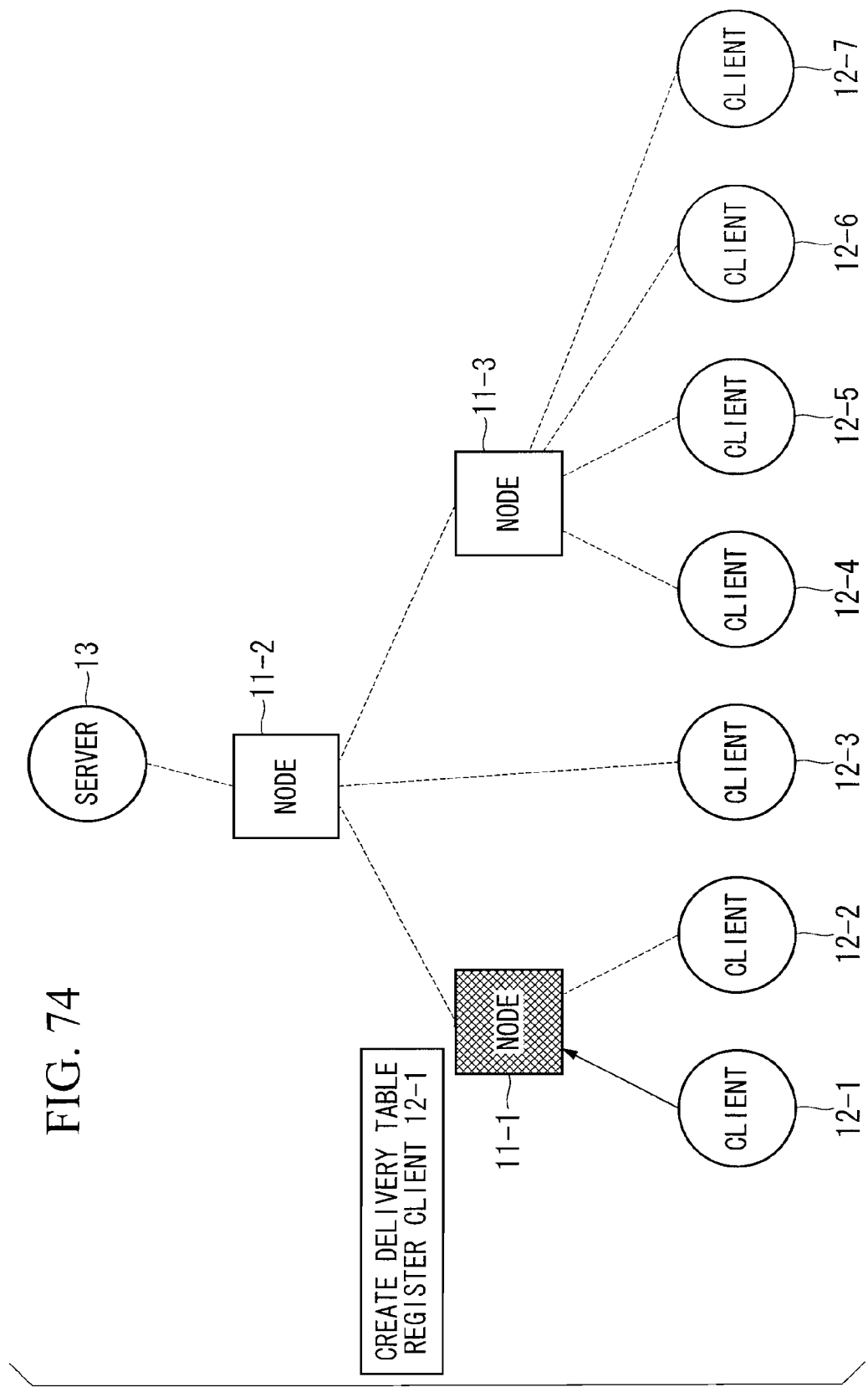
FIG. 74 is a diagram showing a process of forming a multicast tree in the network constitution of FIG. 73.
Figure 75:
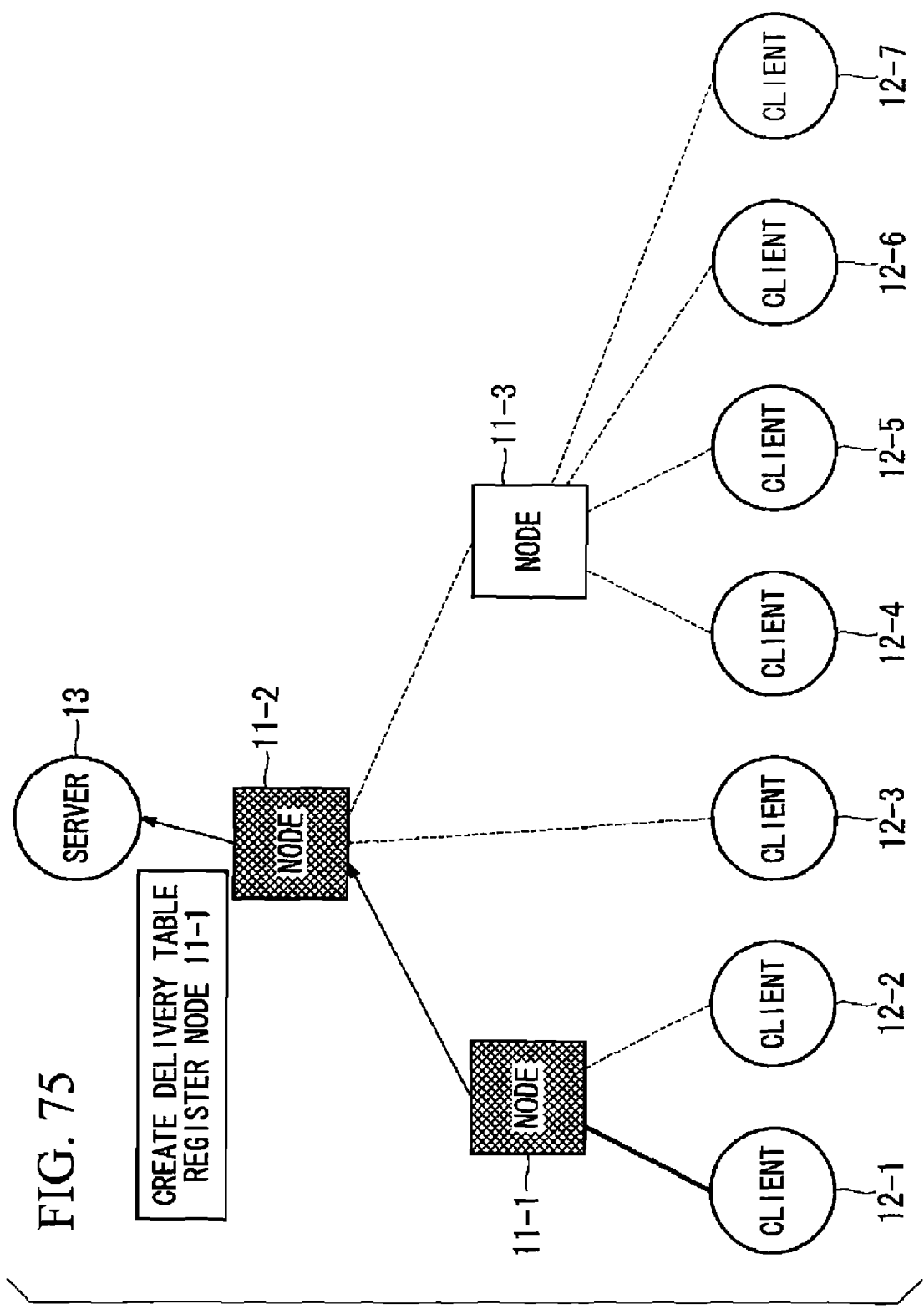
FIG. 75 is a diagram showing a process of forming a multicast tree in the network constitution of FIG. 73.
Figure 76:
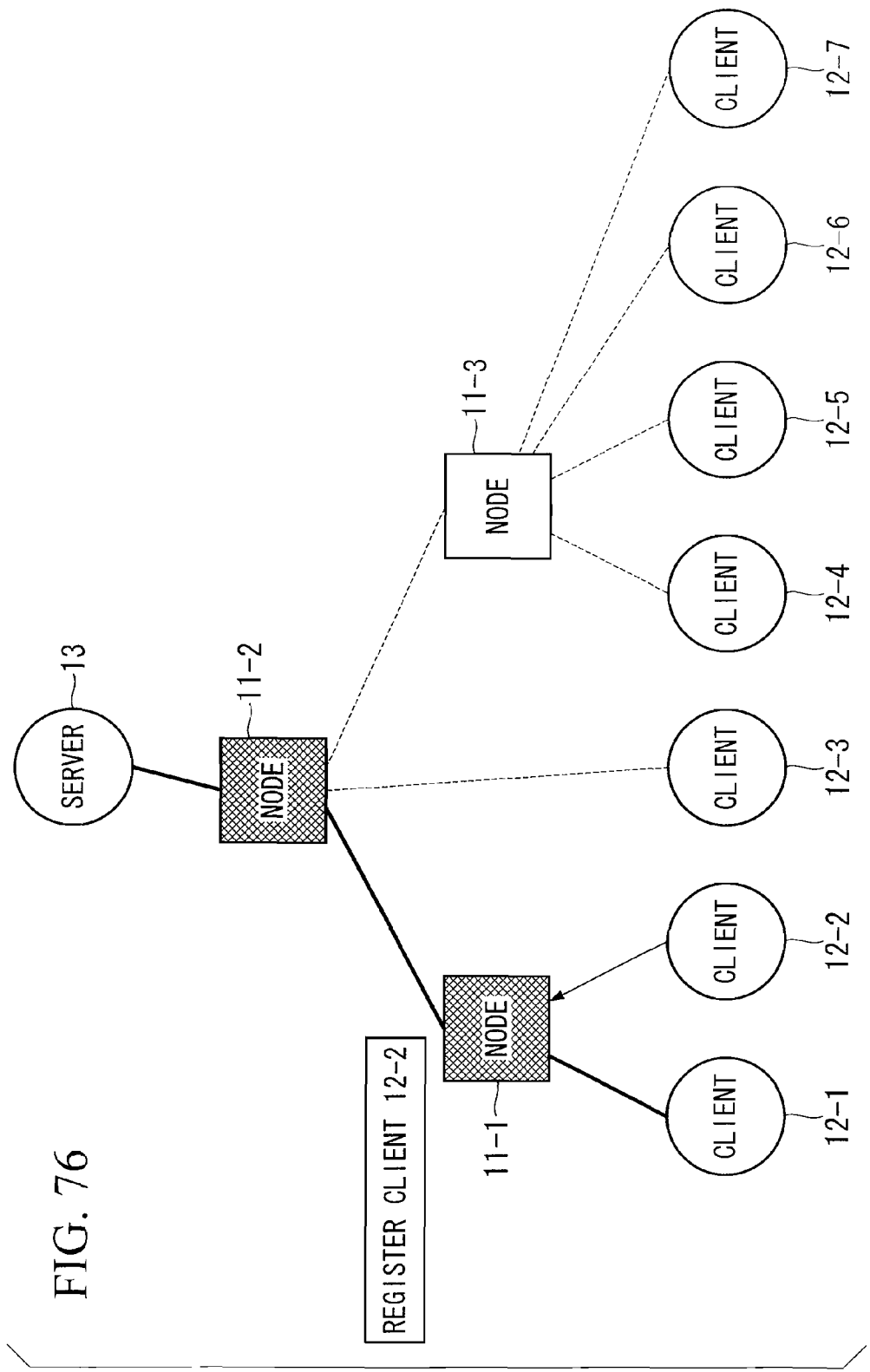
FIG. 76 is a diagram showing a process of forming a multicast tree in the network constitution of FIG. 73.
Figure 77:
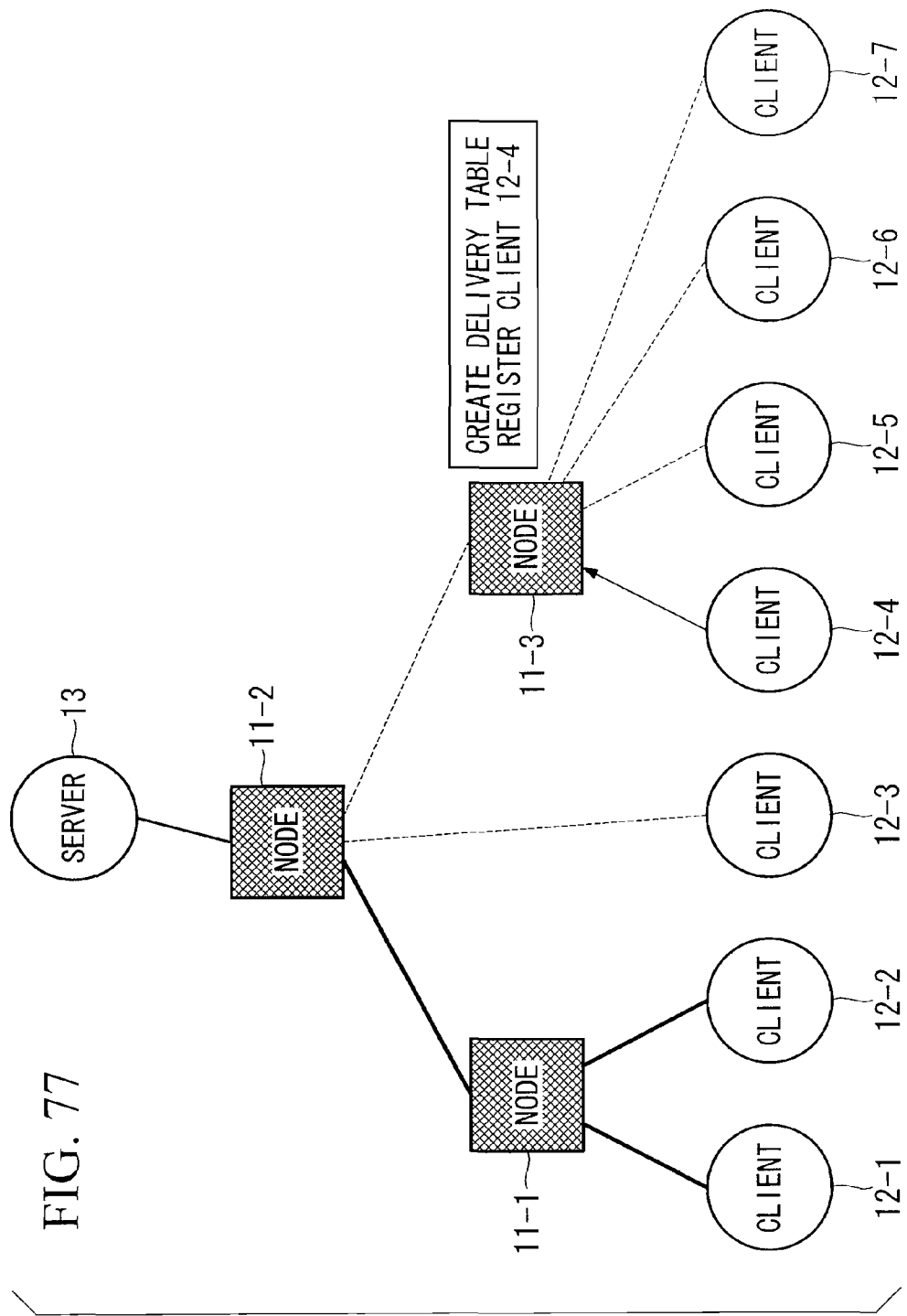
FIG. 77 is a diagram showing a process of forming a multicast tree in the network constitution of FIG. 73.
Figure 78:
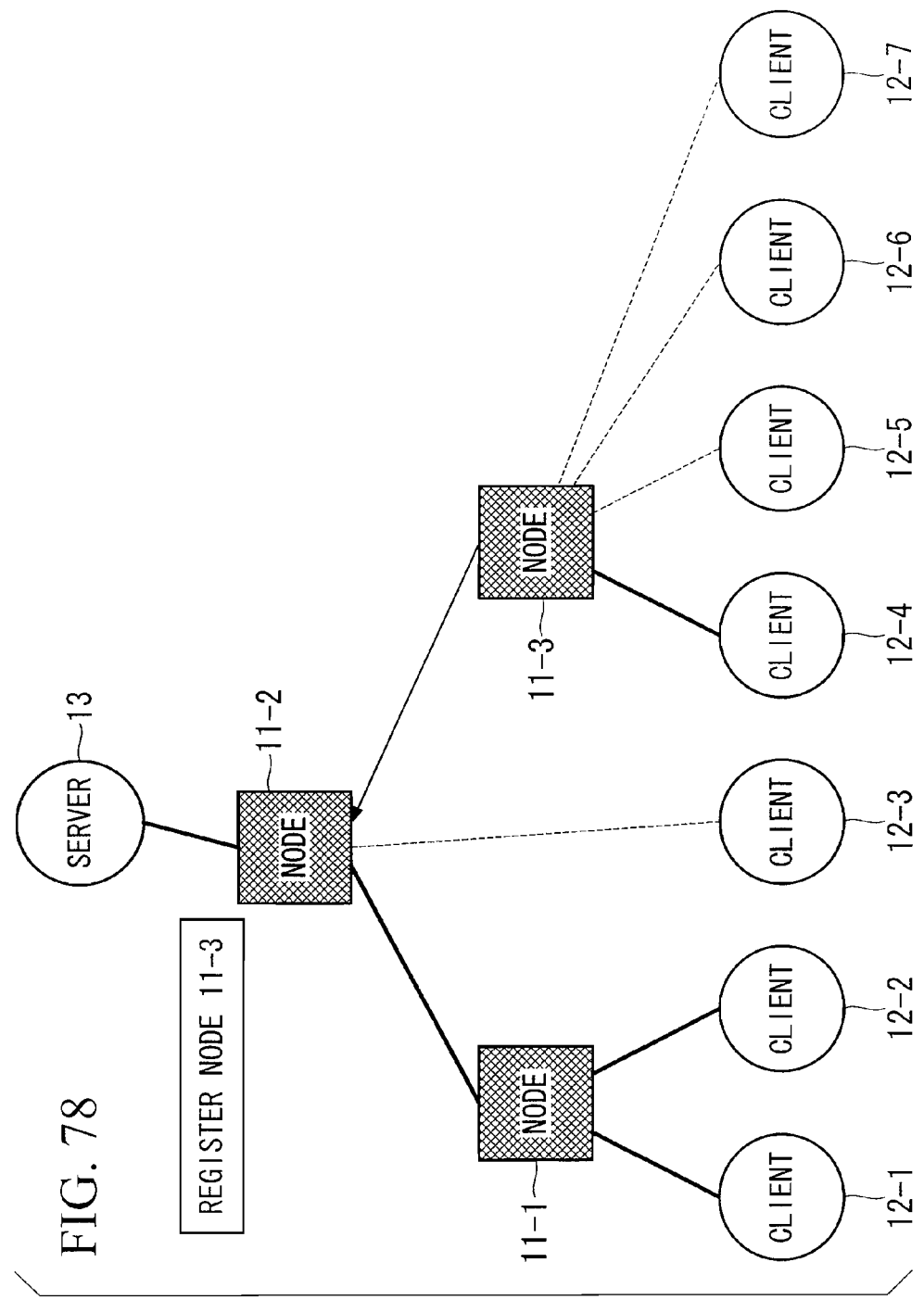
FIG. 78 is a diagram showing a process of forming a multicast tree in the network constitution of FIG. 73.

FIG. 6 shows another example of a network constitution where multicast communication is performed; this example is similar to the conventional example shown in FIG. 73. Seven clients 32-1, 32-2, 32-3, 32-4, 32-5, 32-6, and 32-7 and one server 33 are connected via the network to three nodes 31-1, 31-2, and 31-3.

Figure 7:
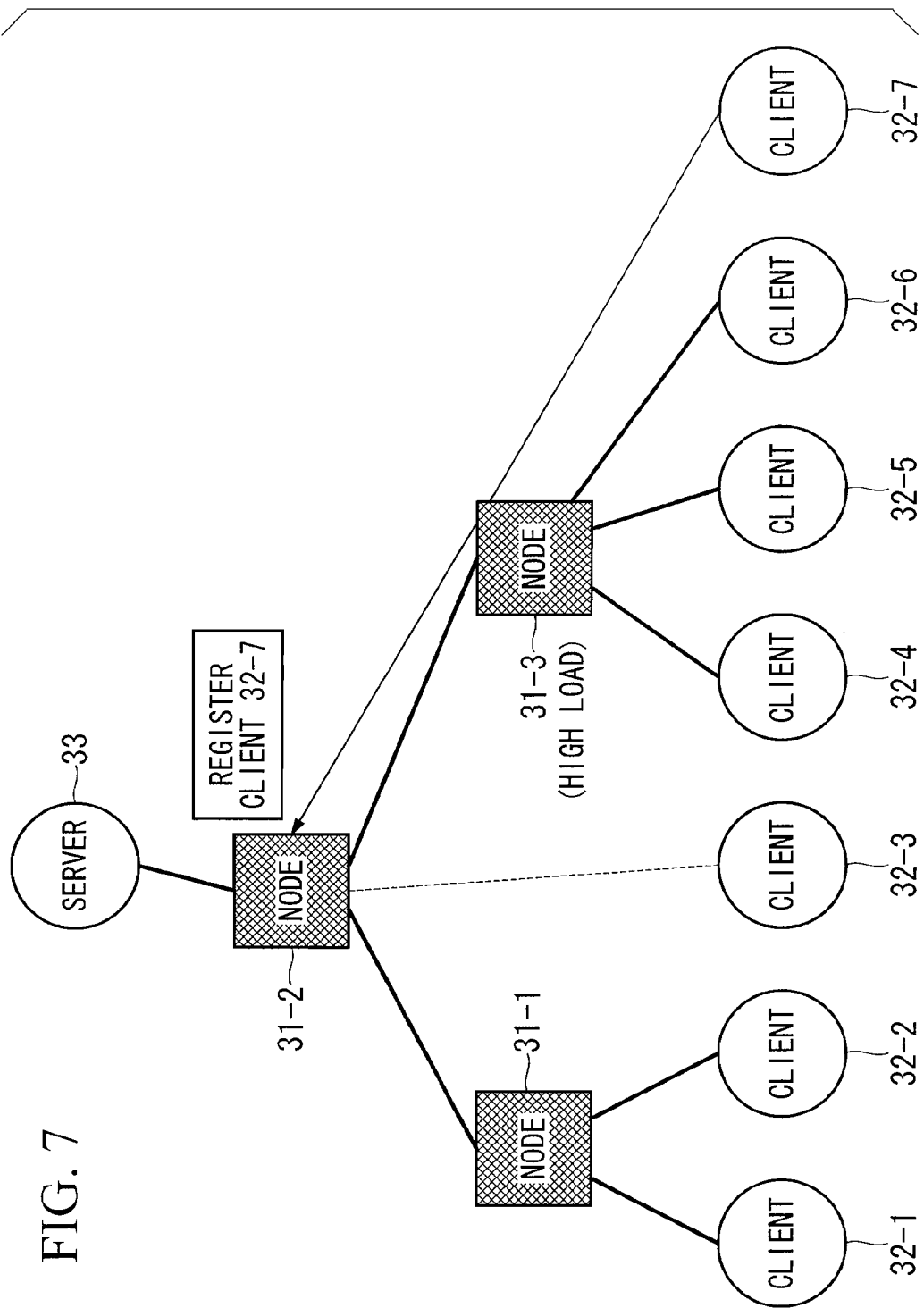
FIG. 7 is a diagram showing a process of forming a multicast tree in the network constitution of FIG. 6.
Figure 79:
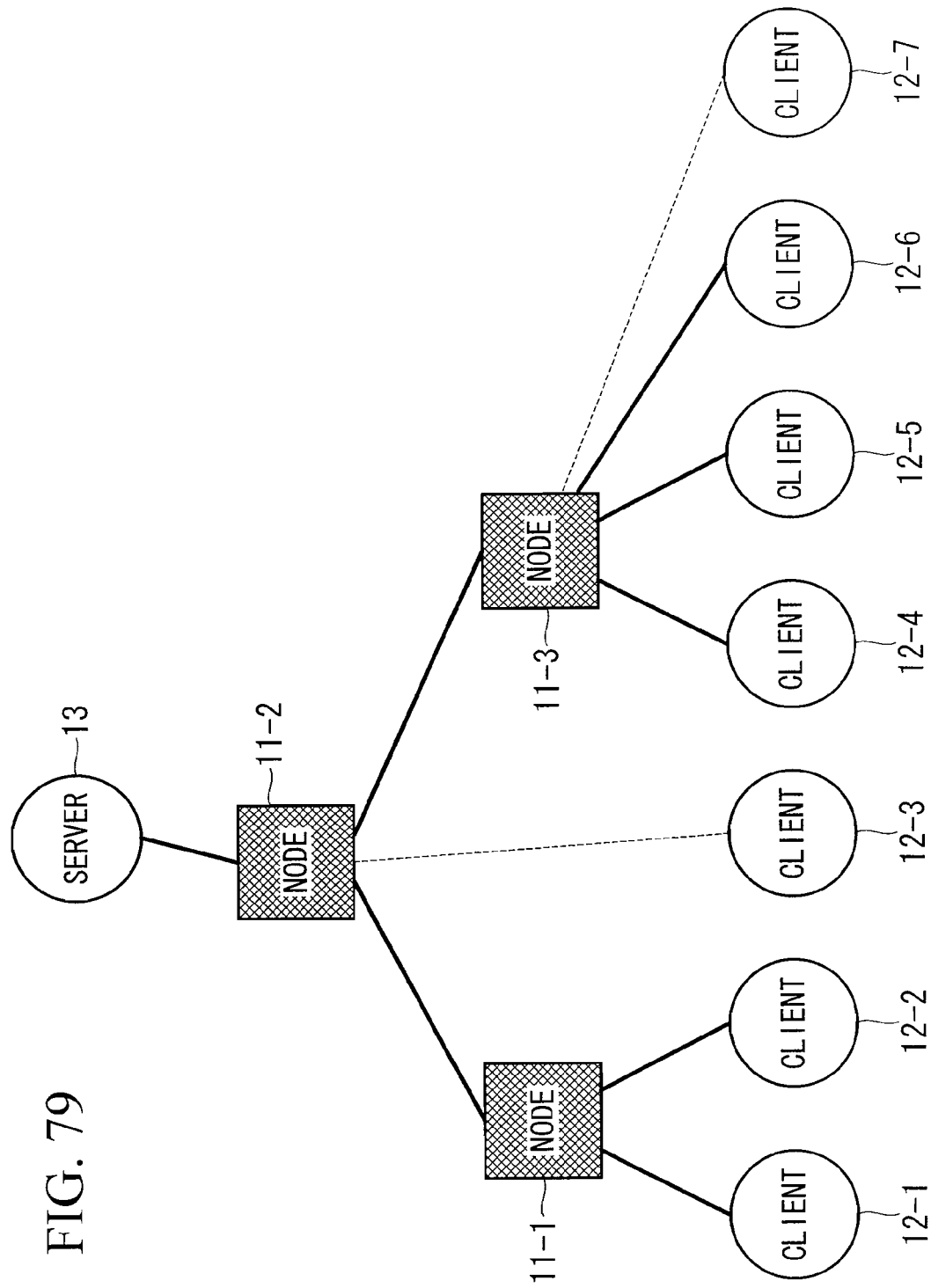
FIG. 79 is a diagram showing a process of forming a multicast tree in the network constitution of FIG. 73.
Figure 80:
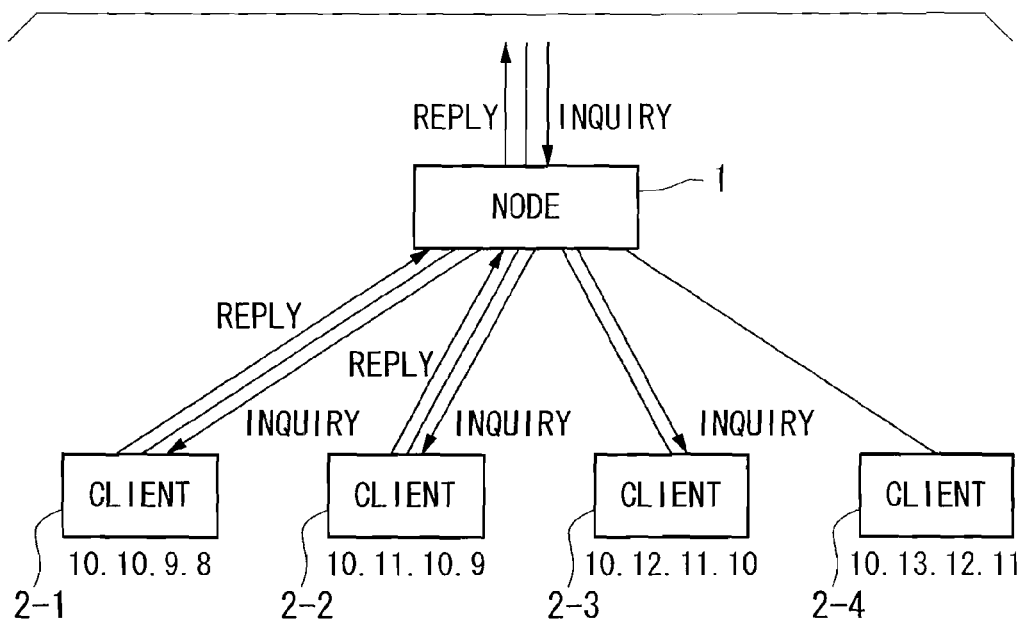
FIG. 80 is a diagram showing a node making an inquiry to a client.
Figure 81:
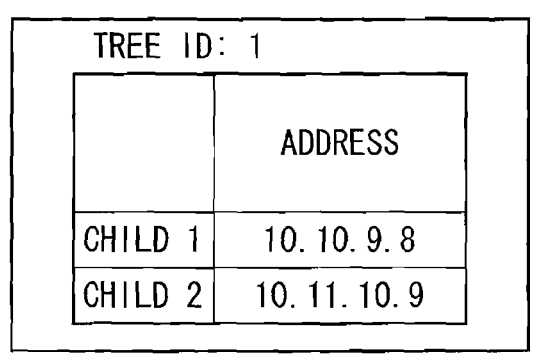
FIG. 81 is a diagram showing an example of a table after the inquiry of FIG. 80 has been made.

FIG. 7 shows the same state as FIG. 79 with regard to the constitution of FIG. 6; that is, when the clients 32-1, 32-2, 32-4, 32-5, and 32-6 are participating in the multicast, and the client 32-7 has newly transmitted a request packet. Let us suppose that the node 31-3 already has a high load, and is unable to increase the number of delivery packet duplications for the client 32-7.

At this time, the node 31-3 forwards the request packet from the client 32-7 unaltered toward the server 33. When the request packet from the client 32-7 has arrived at the node 31-2, unless the node 31-2 has a high load, the client 32-7 is registered as a child in the delivery table of the node 31-2. As a result, the delivery packet from the server 33 is duplicated at the node 31-2 for the client 32-7, and sent by unicast directly to the client 32-7.

The request packet from the client 32-7 is continually transmitted at time intervals below a predetermined value; each time, the node 31-3 forwards the request packet, and node 31-2 updates the request packet arrival time in its delivery table.

Figure 8:
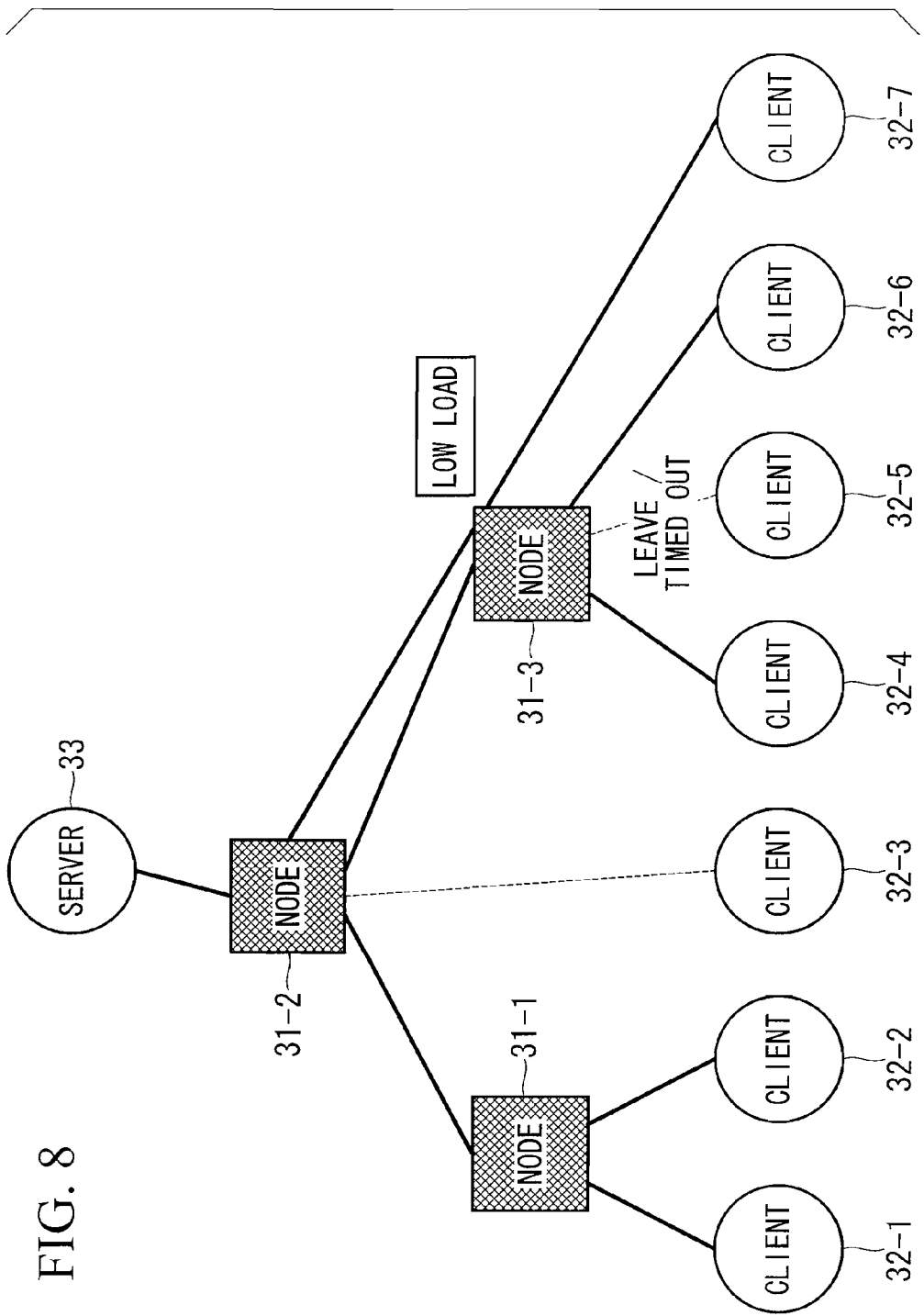
FIG. 8 is a diagram showing a process of forming a multicast tree in the network constitution of FIG. 6.
Figure 9:
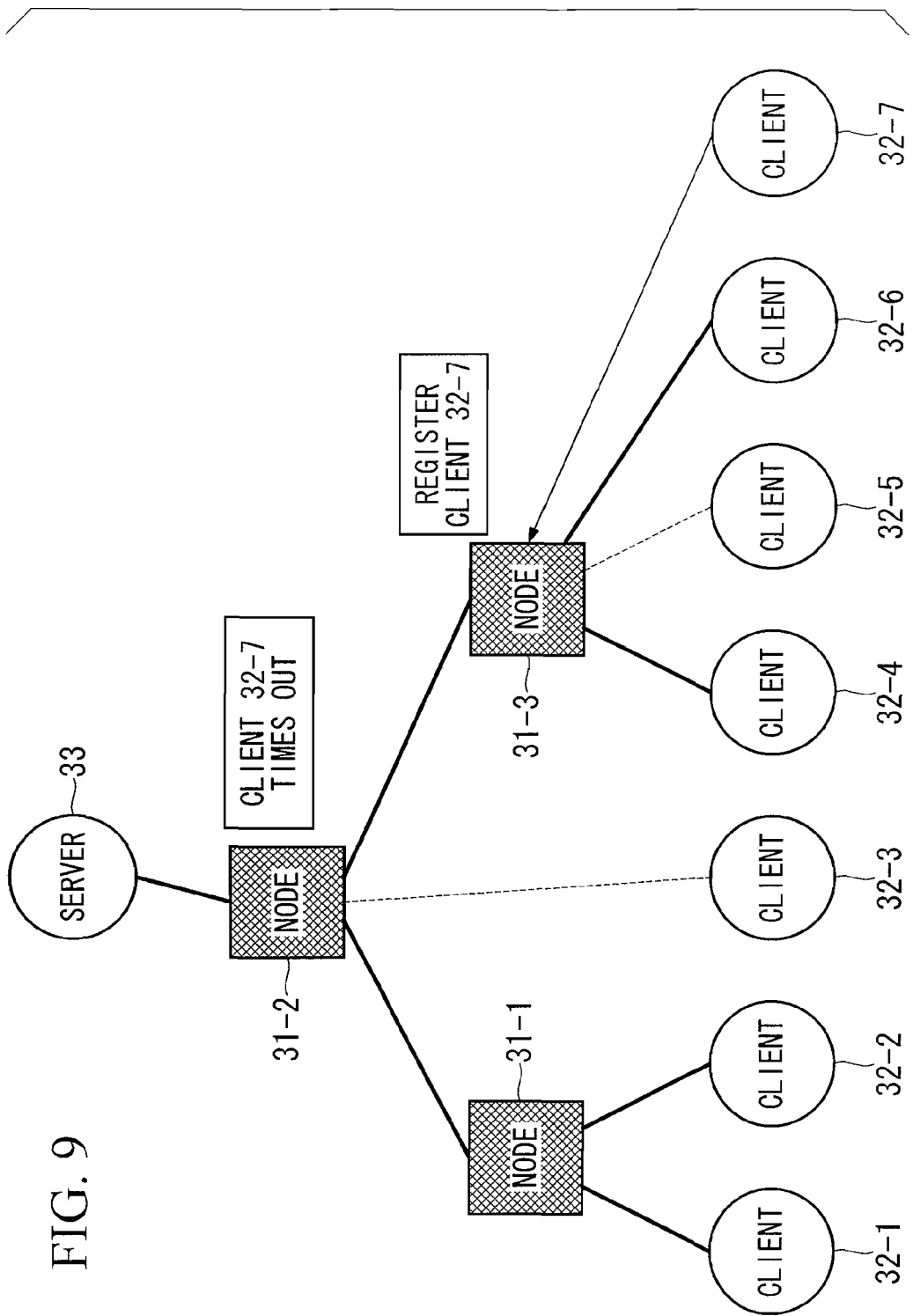
FIG. 9 is a diagram showing a process of forming a multicast tree in the network constitution of FIG. 6.

Subsequently, as shown in FIG. 8, let us suppose that the client 32-5 is deleted from the delivery table of the node 31-3 after sending a leave packet or being timed out; this reduces the load of the node 31-3 and enables it to increase its number of children. Now, when the request packet from the client 32-7 arrives at the node 31-3, the node 31-3 registers the client 32-7 in its delivery table without forwarding the request packet to the node 31-2. This state is shown in FIG. 9.

As a result, the delivery packet is transmitted from the node 31-3 to the client 32-7. Thereafter, since no further request packets from the client 32-7 arrive at the node 31-2, the client 32-7 times out in the delivery table of the node 31-2 and the node 31-2 sends no more delivery packets to the client 32-7.

During the time until the client 32-7 is timed-out at the node 31-2, the same delivery packet is sent from the nodes 31-2 and 31-3 to the client 32-7. To prevent the same delivery packet from being sent multiple times to the client 32-7, a number may be appended to the delivery packet beforehand, and, based on that number, the node 31-3 discards the packet which was duplicated. When the same packet has been received at the client 32-7 a multiple number of times, the client 32-7 discards these packets.

The number appended to the delivery packet may be expressed by a combination of a time stamp and a sequence number, as in the real-time transport protocol (RTP) of RFC1889.

According to the above, the structure of the multicast tree can be autonomously updated in accordance with the load status of the nodes, and the load can be dispersed.

The keep alive method is also useful when the client and/or the server comprise mobile terminals. For example, when the client is a mobile terminal, the client may move outside the range accommodated by the node and become accommodated by a different node. In such a case, the client continuously outputs a request packet, and thus the client is registered in the node where the client is newly accommodated, and the client is timed-out in the old node where the client was being accommodated. In this way, the client can continue to receive delivery packets from the server 33 without concern for its accommodating node.

Conversely, when the server 33 is a mobile object, provided that there is a mechanism such as a mobile IP for realizing unicast transmission to a mobile object, request packets toward the server 33 are always sent to the position where the server 33 is actually located. When the server 33 has moved and is now accommodated by a different node, a new delivery table is created only in the case where there is no delivery table at the nodes on the path from the clients to the server.

Figure 10:
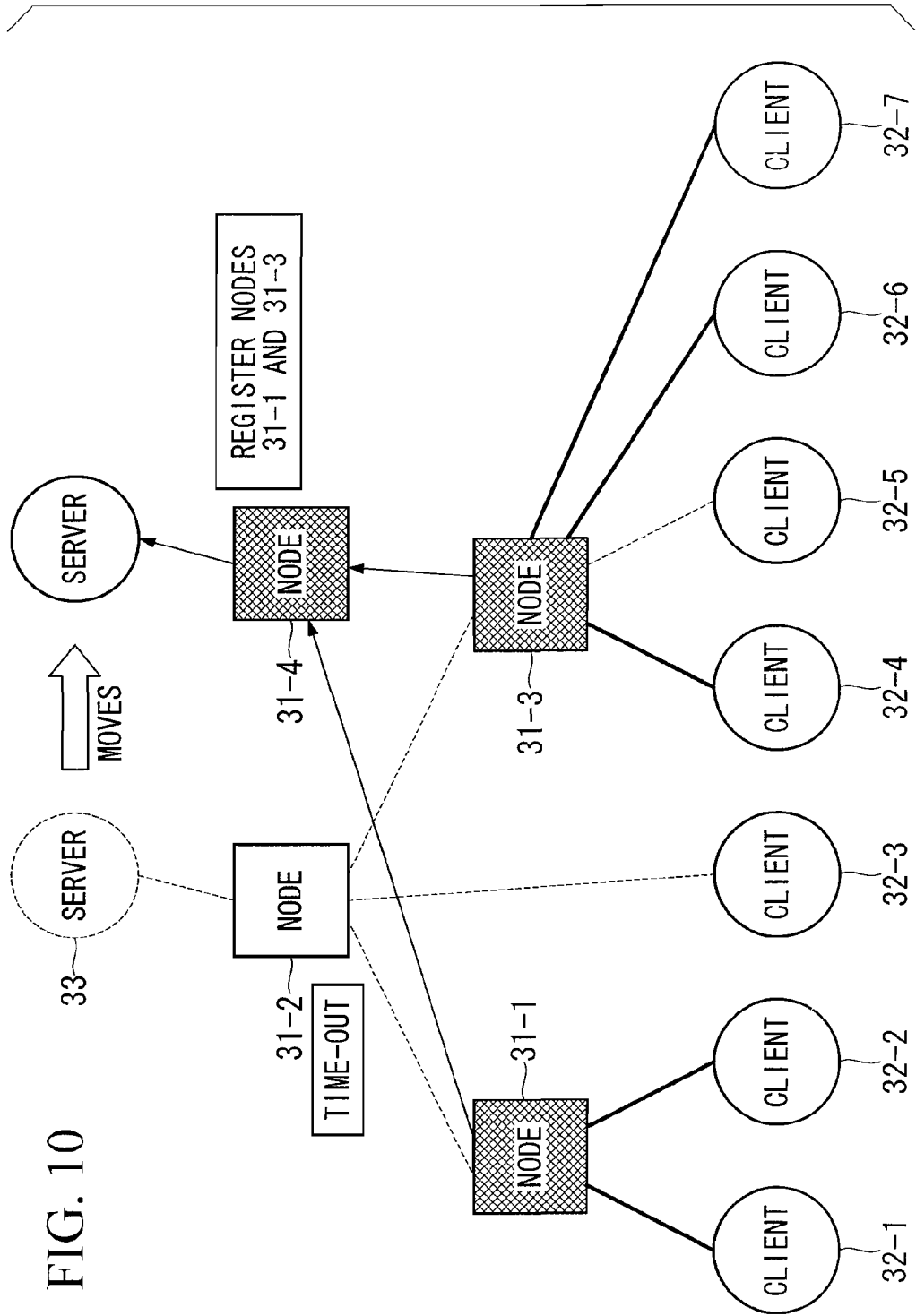
FIG. 10 is a diagram showing a process of forming a multicast tree in the network constitution of FIG. 6.

Let us imagine an example, such as that shown in FIG. 10, where the server 33 which was previously accommodated by the node 31-2 has moved, and is now accommodated by the node 31-4.

At this time, there is no change to the delivery tables of the nodes 31-1 and 31-3, jointly present on the path leading from a given client to the server 33 before and after the server 33 has moved; a delivery table is created at the node 31-4, which newly joins the path, and the nodes 31-1 and 31-3 are registered. Then, the node 31-4 transmits a request packet to the server 33.

Figure 11:
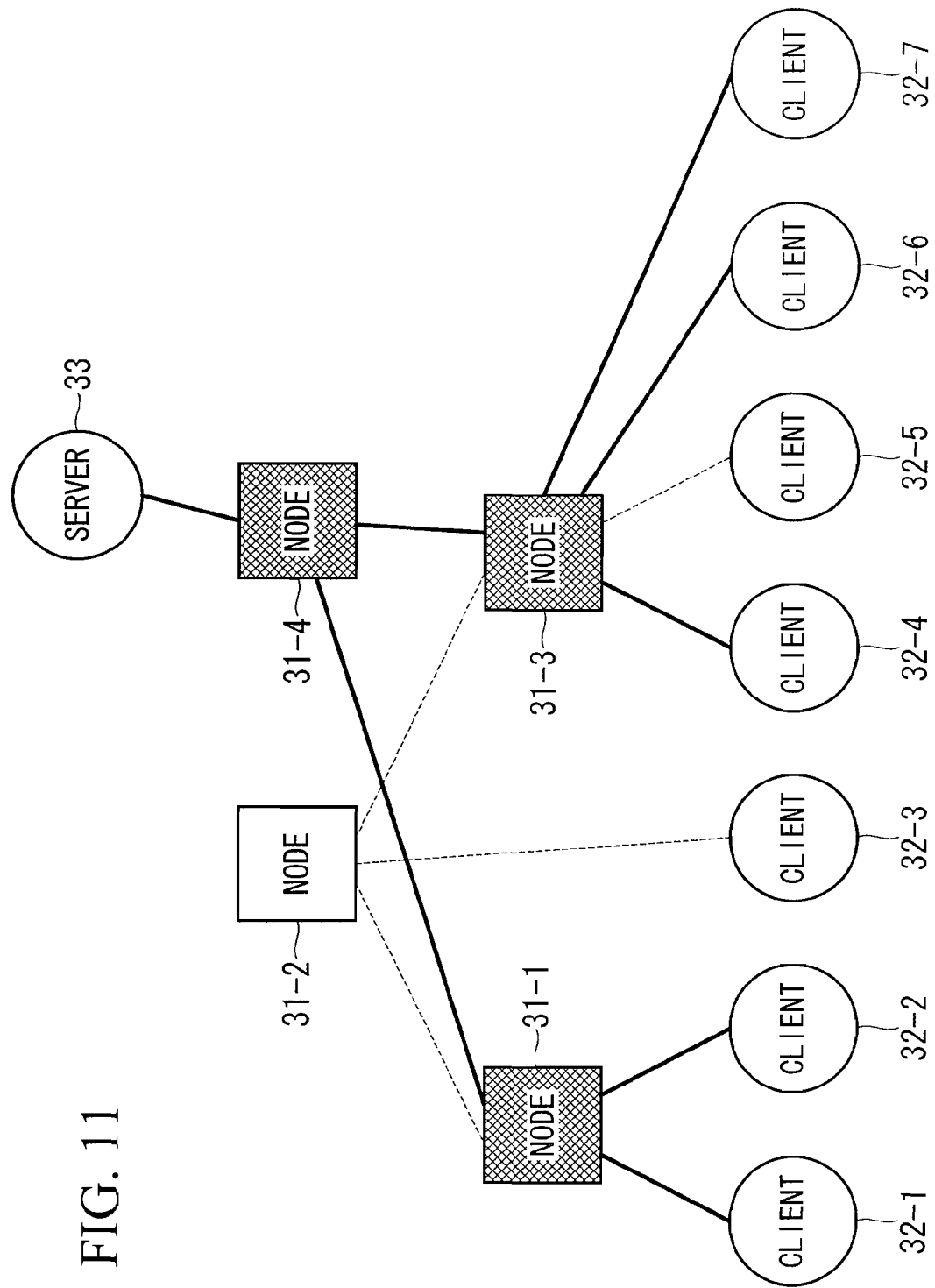
FIG. 11 is a diagram showing a process of forming a multicast tree in the network constitution of FIG. 6.

Since no request packet is sent to the node 31-2, which is not on the path from the clients to the server 33, the node 31-2 times out. FIG. 11 shows the final aspect obtained as a result.

Until the node 31-2 times out, there is a possibility that delivery packets may arrive at the nodes 31-1 and 31-3 via the nodes 31-4 and 31-2; when this happens, the same delivery packet arrives repeatedly. This can be prevented, as already described, by appending sequence numbers to the delivery packets, enabling the nodes or clients to discard the same packets which may arrive.

In the keep alive method, it is necessary to make sure that a node with children which have not timed out does not time out as the child of a node nearer the server. The simplest method uses an interrupt based on a timer. The timer is provided at the node itself, and a check as to whether all the children in the delivery table have timed out is performed at predetermined time intervals. When there is a child which has not timed out, a request packet is sent toward the server.

However, in this method, there is a possibility that a timer interrupt may appear during processing of a delivery packet or request packet, and this may cause serious overhead problems.

One method which does not use timer interrupts realizes as a part of the processes when the request packet arrives.

For example, suppose that a client transmits request packets at time intervals D. The node stores a transmission time T when the final request packet was transmitted toward the server. When the request packet has arrived, the source is registered in the delivery table if it was not already registered, and the transmission time T is compared with the present time; when (present time−T)≧D, the request packet is transmitted toward the server and the time T is set to present time.

When the maximum number of links from the client to the node (or the server) is termed the "height" of the node (or the server), then, assuming that there are no jitters in the communication delay between nodes and between the client and the node, according to the above method, the time interval at which request packets arrive at a node (or server) at height h is no more greater than h×D. As explained below, the reason for this can be demonstrated inductively.

Let us assume that the arrival time interval of request packets from a child to a node (when measured for each child) is no greater than D'. At this time, according to the above method, the interval at which request packets are transmitted from the node reaches its maximum when a request packet is received from a child immediately before time D has elapsed since a request packet was transmitted from the node, and no request packet arrives from any other children (due to leaving, hang-up, and the like) until the next request packet arrives from the same child.

In this case, a time of D+D' elapses from the transmission of the first request packet until the transmission of the next request packet. In the case of a node whose children are all clients, D' is equivalent to D.

When there is a jitter in the communication delay between nodes, and between the clients and the node, if a represents the absolute value of the amount of increase/decrease in the communication delay (jitter), then the arrival time interval of request packets arriving at a node whose children are all clients is no greater than D+2α. Therefore, for the same reason as above, the time interval of request packets arriving at a node (or server) at height h is no longer than h×(D+2α).

If the height of each child at a node (or server) of height h is h−1, then timeout should be determined when a time greater than h×(D+2α) has elapsed since the previous request packet was received from the child. Furthermore, when there is a jitter in the processing delay of the node, the sum of the communication delay and processing delay jitter may be regarded as α.

However, when a packet may be lost during transmission, and when clients continue to transmit request packets, there is a possibility that request packets may arrive at a time interval of greater than h×(D+2α) at a node (or server) of height h. In this case, the time interval must be extended as appropriate in order to determine timeout. Hereinafter, it is assumed that no packets are lost during transmission.

When the maximum value H for h is determined in advance according to the network used, all nodes may use H×(D+2α) for timeout determination.

When the maximum value H for h is not determined in advance, h is determined by, for example, using a request packet. The request packet is given a variable h which expresses height. A client transmits the request packet with h=0. At the node, the request packet is transmitted with an h value of 1 added to the maximum value of the variable h contained in each request packet received from the children. By this method, when the node receives a request packet with an h value of h* from a child, it knows that the height of that child is h*. In this way, the time interval for timeout can be varied dynamically in accordance with the shape of the tree.

Figure 12:
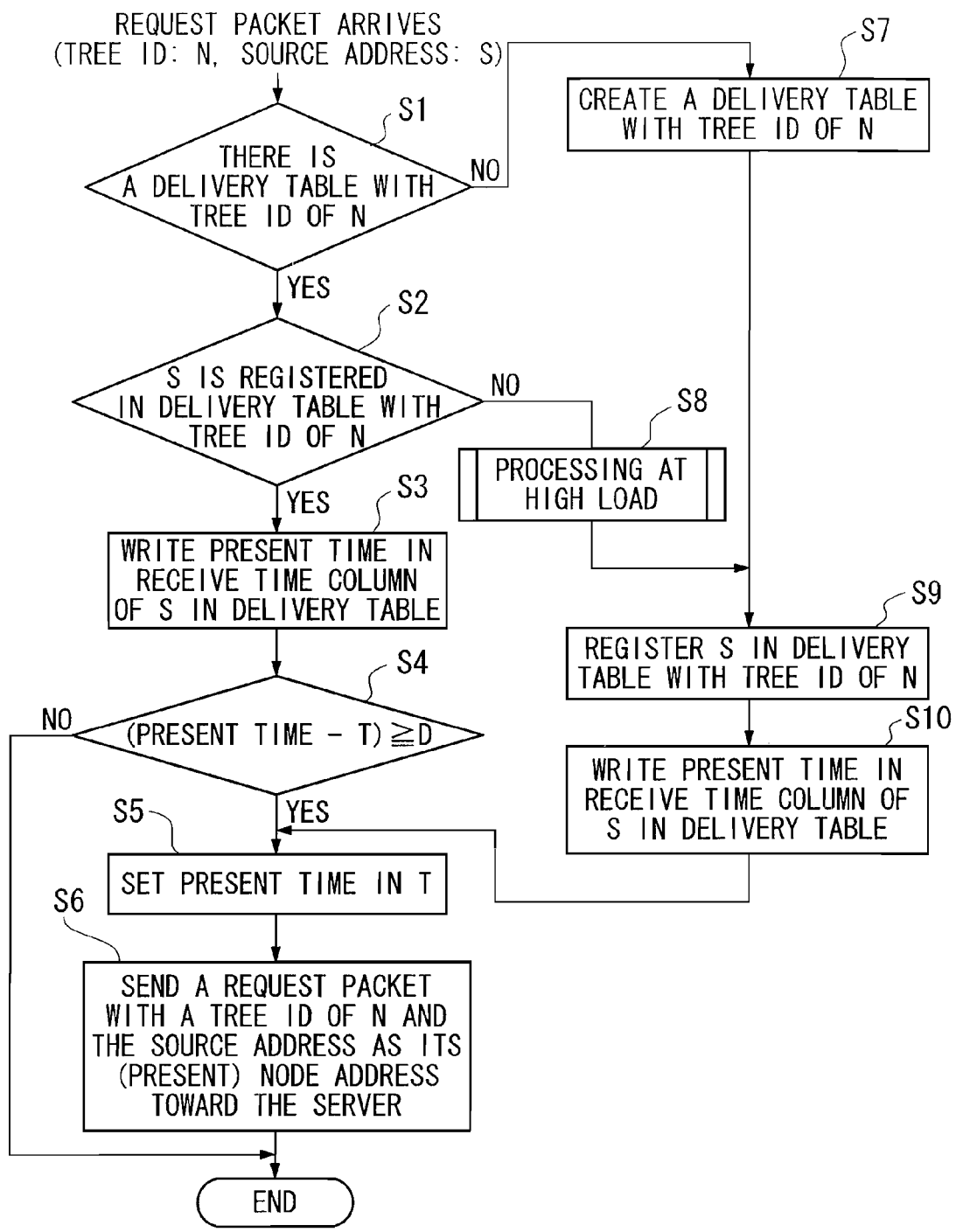
FIG. 12 is a flowchart showing processing when a request packet arrives according to the first embodiment of this invention.
Figure 13:
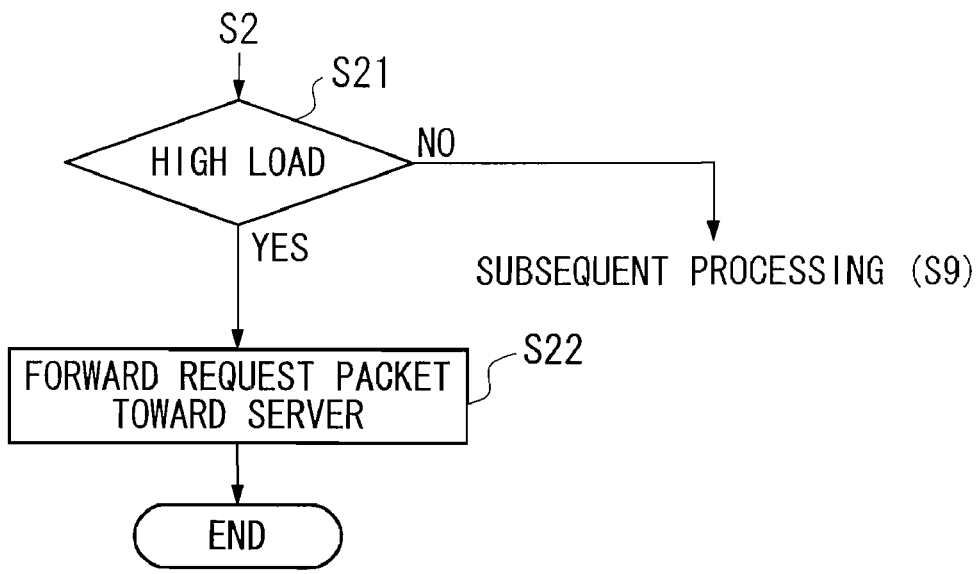
FIG. 13 is a flowchart showing processing at high load in FIG. 12.

FIG. 12 shows the processing flow at a node when a request packet arrives. The tree ID and source (transmission source) address in the request packet are termed N and S respectively. FIG. 13 shows the high load processing of FIG. 12.

Figure 15:
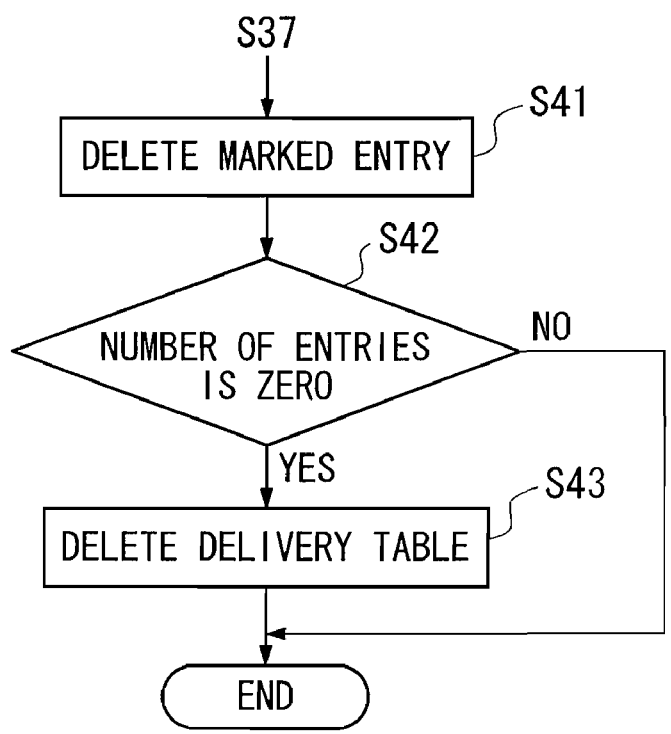
FIG. 15 is a flowchart showing entry delete operation processing in FIG. 14.
Figure 14:
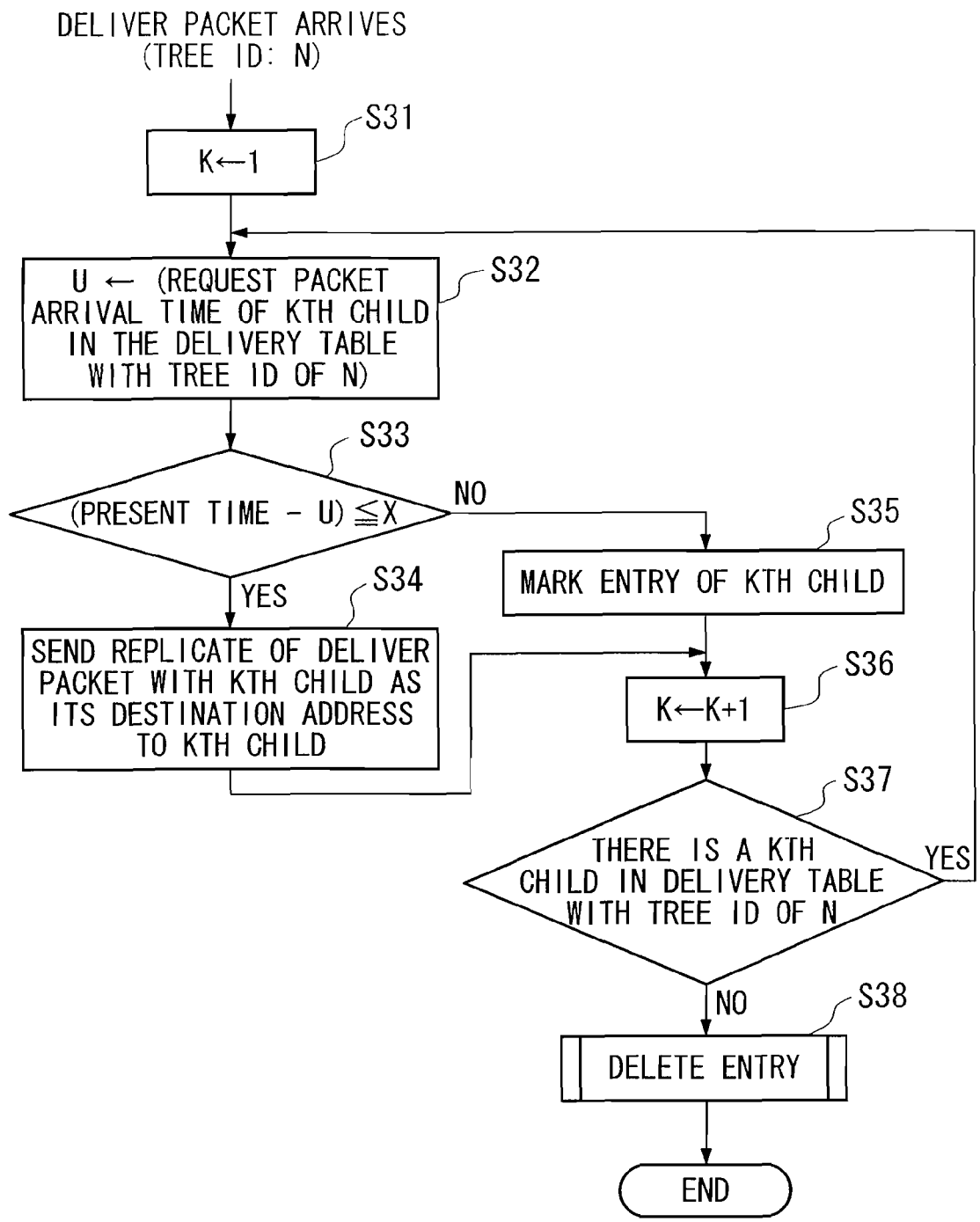
FIG. 14 is a flowchart showing processing when a delivery packet arrives according to the first embodiment of this invention.

FIG. 14 shows the processing flow at the node when a delivery packet arrives. FIG. 15 shows the entry deletion of FIG. 14. The tree ID and source (transmission source) address in the delivery packet are expressed as N and S. Letter X represents the time interval determining timeout. That is, timeout is determined when the time elapsed from the arrival of the request packet to the present exceeds X. FIGS. 12 to 14 assume that X is fixed.

The method described above presents no problems when the user specifies a server by making a selection from a predetermined server group, but in a case where the user inputs the address of a server by manipulating a keyboard or the like, a mistake in specifying the server may result in a delivery table for a nonexistent server being created at the node. To avoid this, a server-probe packet is sent to the server prior to transmitting the request packet, which is transmitted only after a packet confirming the existence of the server has been received from the server.

In this embodiment, when a server and a node receive a request packet from a child, they send a delivery packet to the child. Clients and nodes request delivery of delivery packets toward the server. Furthermore, when the client and node have received a delivery packet from a parent node, the client and node can see that the delivery packet is transmitted from the server. In other words, this embodiment is excellent from a scalability point of view, since request packets and delivery packets can be transmitted without needing to consider how many nodes are connected beyond the parent node or child.

The functions in each of the sections of the clients, nodes, and server can in fact be realized by a computer. This is achieved by storing programs (e.g. in the case of a node, a repeating program) for enabling the computer to execute the operations of this embodiment in a computer-readable recording medium; the functions of the embodiment are realized when the computer reads and executes the programs from the recording medium. The computer system mentioned here includes hardware, such are peripheral devices, in addition to an OS (operating system). In a case using a WWW (world-wide web) system, the computer may include a website supply environment (or the web-page display environment). The above program may acceptably realize some of the functions, and may realize them in combination with other programs already stored in the computer (i.e. a differential program). The computer-readable recording medium may comprise a portable medium such as a flexible disk, an optical magnetic disk, a ROM (read only memory), and a CD-ROM, or a memory apparatus such as hard disk accommodated in the computer system. Moreover, the computer-readable recording medium may comprise a medium which dynamically holds programs for a short time, in the manner of a communication cable when transmitting programs via a network, such as the Internet, and a communication line, such as a telephone line; it may also comprise a medium which holds a program for a fixed period of time in the manner of a volatile memory in a computer system. The same goes for all embodiments and applied examples subsequently explained below.

Embodiment 2

The first embodiment describes a countermeasure against mistakes in specifying the server, in which two types of packet (server-probe packet and request packet) are transmitted from the client. The second embodiment describes a method which counters the problem of mistakes in specifying the server while transmitting only the request packet from the client.

When there is a delivery table at the node which is nearest the client, a request packet sent from the client is registered at the nearest node in the same way as in the first embodiment. The same method as the first embodiment is also used when the nearest node has high load and cannot accommodate the client as a child.

When there is no delivery table at the node which is nearest the client, the request packet is forwarded toward the server. The node which the request packet passes while being forwarded is recorded in the request packet.

When the request packet has arrived at a node which already has a delivery table, or at the server, information relating to the path from the client to the node or the server is recorded in the request packet. The node or server sends a delivery-table-creation packet containing this path information toward the client.

The delivery-table-creation packet is delivered to the client by following the path information in reverse, being simply forwarded when the node it passes midway already has a delivery table corresponding to the server, and a delivery table corresponding to the server being created when none already exists. The next node on the path identified by the path information in the delivery-table-creation packet may be registered in the delivery table at the same time as creating the delivery table, but, in the following example, nothing is registered when creating the delivery table.

In this way, before the delivery-table-creation packet arrives at the client (more precisely, until the delivery-table-creation packet is discarded at the node which is nearest the client), a new delivery table is created at each node without a delivery table on the path from the client to the server. As in the first embodiment, the client continues transmitting the request packet at a time interval which is less than a predetermined value. Therefore, when all the nodes on the path from the client to the server have a delivery table, the client is registered in the delivery table in the same say as in the first embodiment, and, if necessary, the node itself transmits a request packet to the server.

Figure 16:
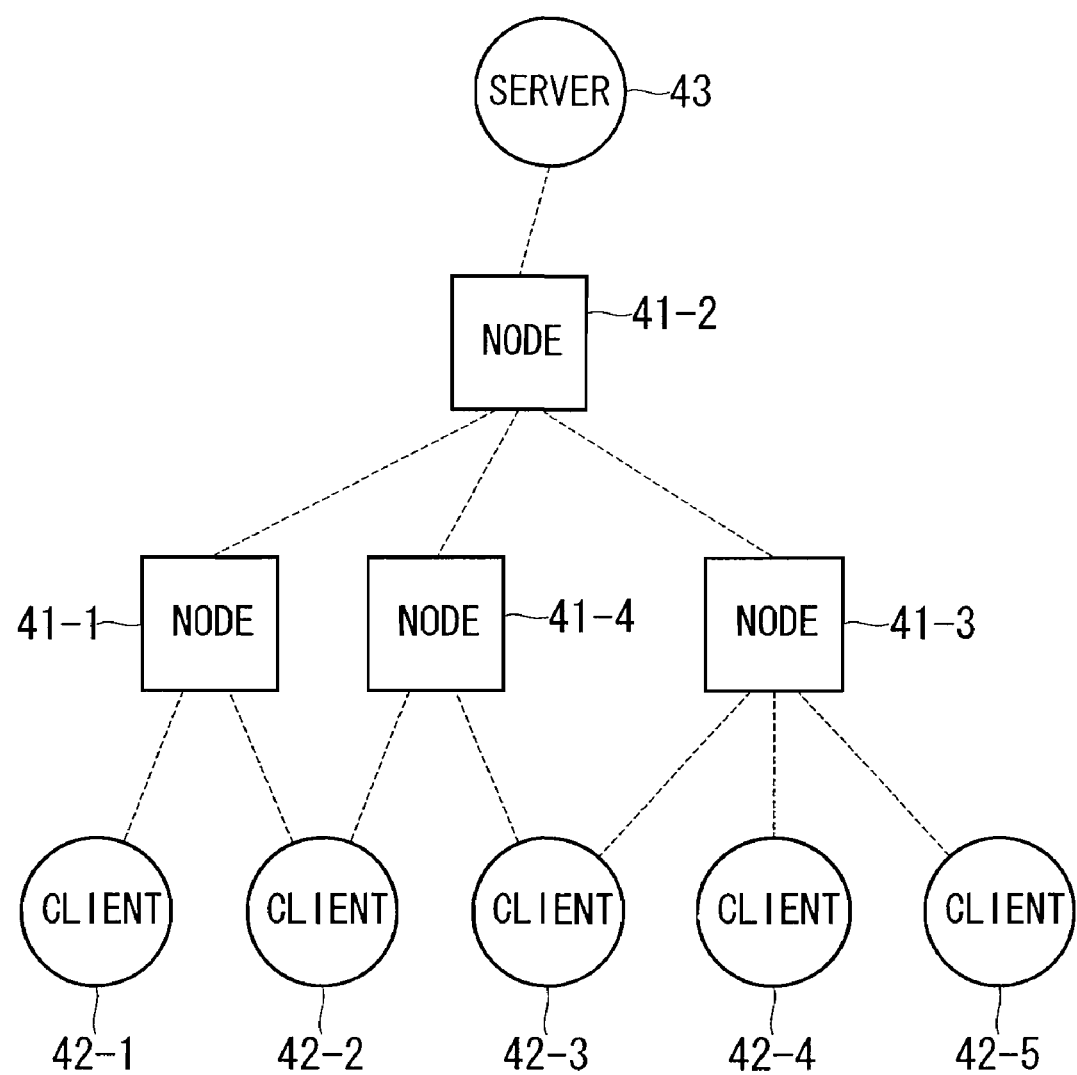
FIG. 16 is a diagram showing one example of the constitution of a network in multicast communication according to a second embodiment of this invention.

FIG. 16 shows one example of the constitution of a network where multicast communication is performed, and shows four nodes 41-1, 41-2, 41-3, and 41-4 connected via a network to five clients 42-1, 42-2, 42-3, 42-4, and 4-2-5 and one server 43.

Figure 17:
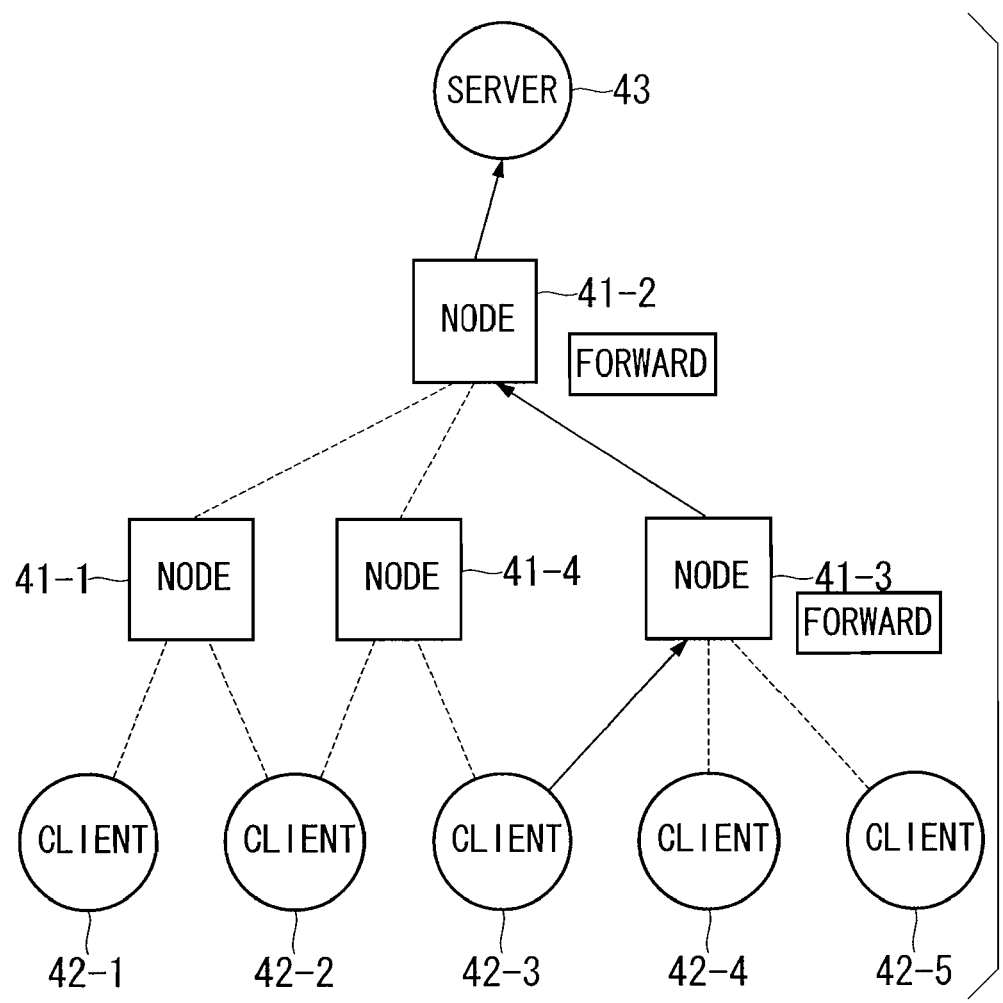
FIG. 17 is a diagram showing a process of forming a multicast tree in the network constitution of FIG. 16.

Let us suppose that client 42-3 in the constitution of FIG. 16 transmits a request packet, as shown in FIG. 17, and that nodes 41-3 and 41-2 are on the path to the server 43. Since there are no delivery tables at the nodes 41-3 and 41-2, the request packet is forwarded to the server 43. The nodes 41-3 and 41-2 are written in the request packet as path information.

Figure 18:
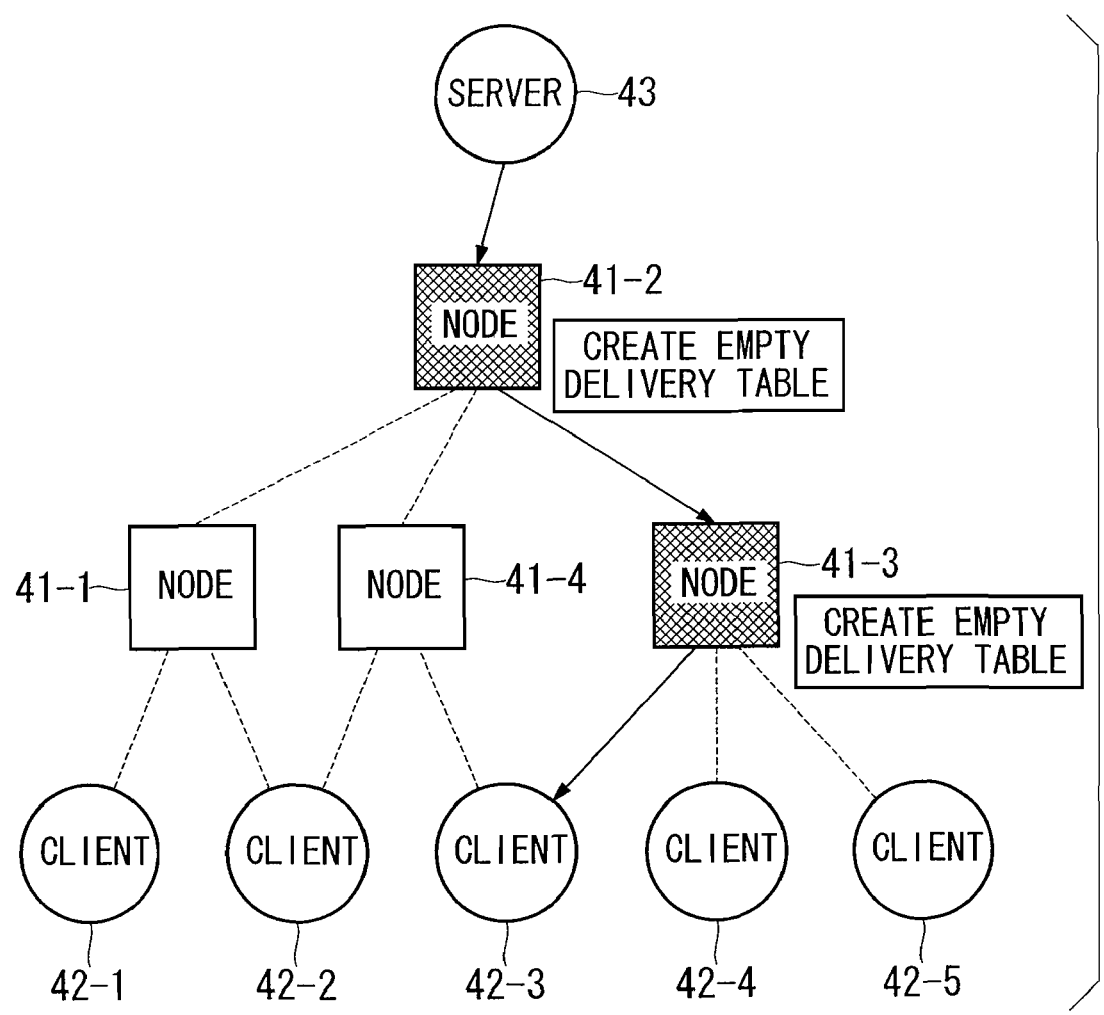
FIG. 18 is a diagram showing a process of forming a multicast tree in the network constitution of FIG. 16.

As shown in FIG. 18, when the server 43 transmits a delivery-table-creation packet containing the path information, delivery tables are created at the nodes 41-2 and 41-3 by following the path information in reverse. Even when the normal path from the server 43 to the client 42-3 passes through the node 41-4, the delivery-table-creation packet passes the nodes 41-2 and 41-3.

Figure 19:
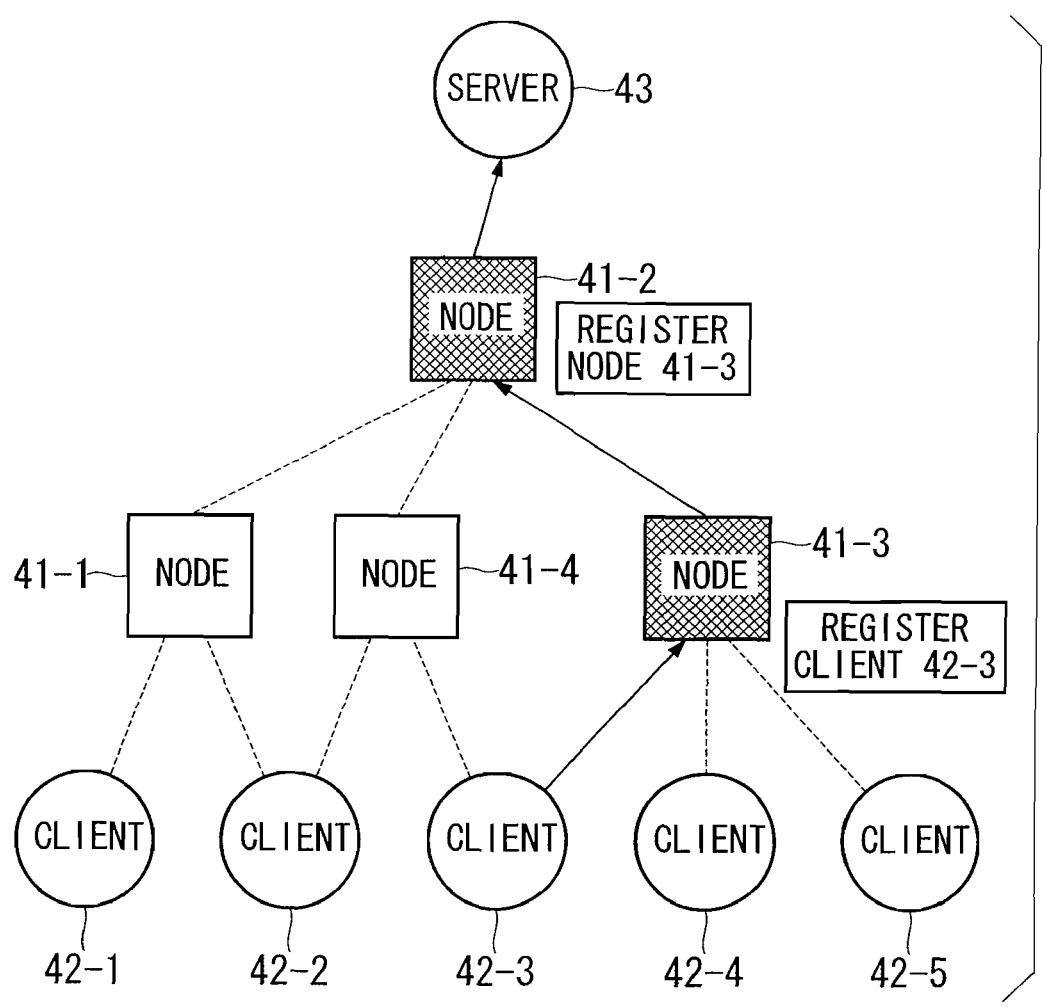
FIG. 19 is a diagram showing a process of forming a multicast tree in the network constitution of FIG. 16.

Thereafter, as shown in FIG. 19, based on the request packet transmitted from the client 42-3, the client 42-3 and the node 41-3 are registered in the delivery tables of the nodes 41-3 and 41-2 respectively, and the node 41-2 sends a request packet to the server 43.

Figure 20:
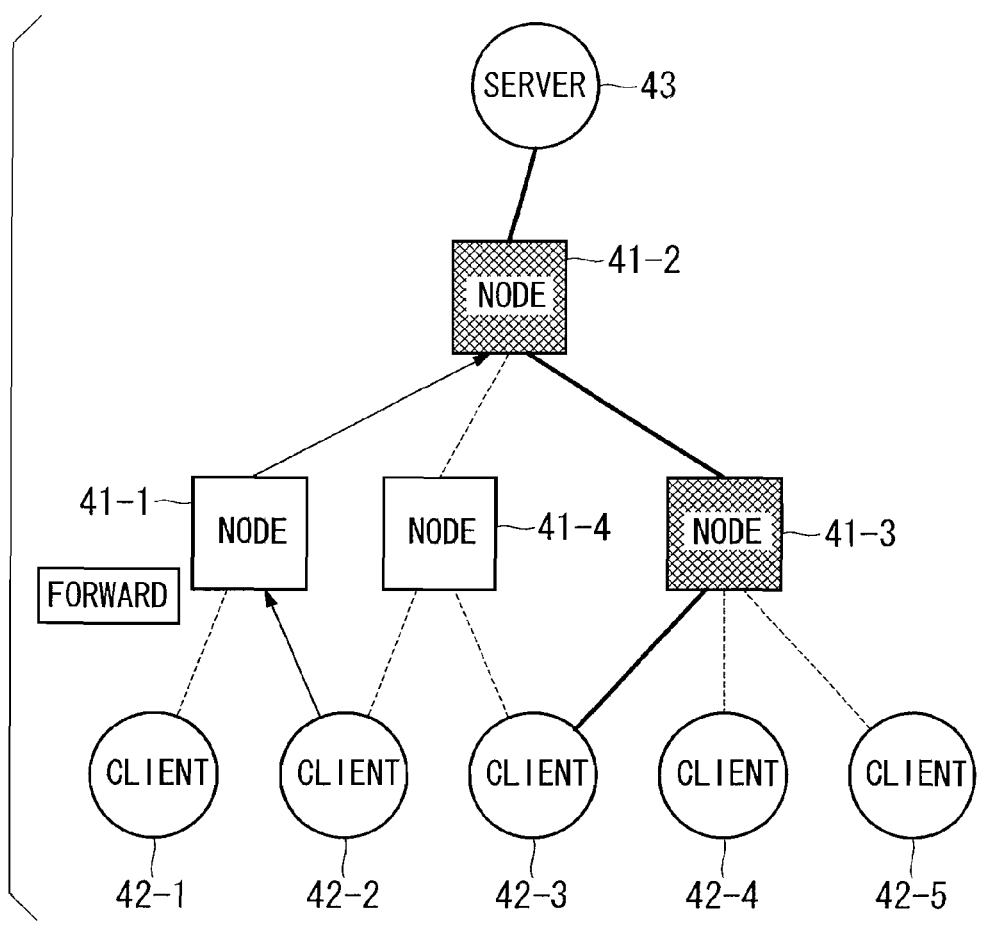
FIG. 20 is a diagram showing a process of forming a multicast tree in the network constitution of FIG. 16.
Figure 21:
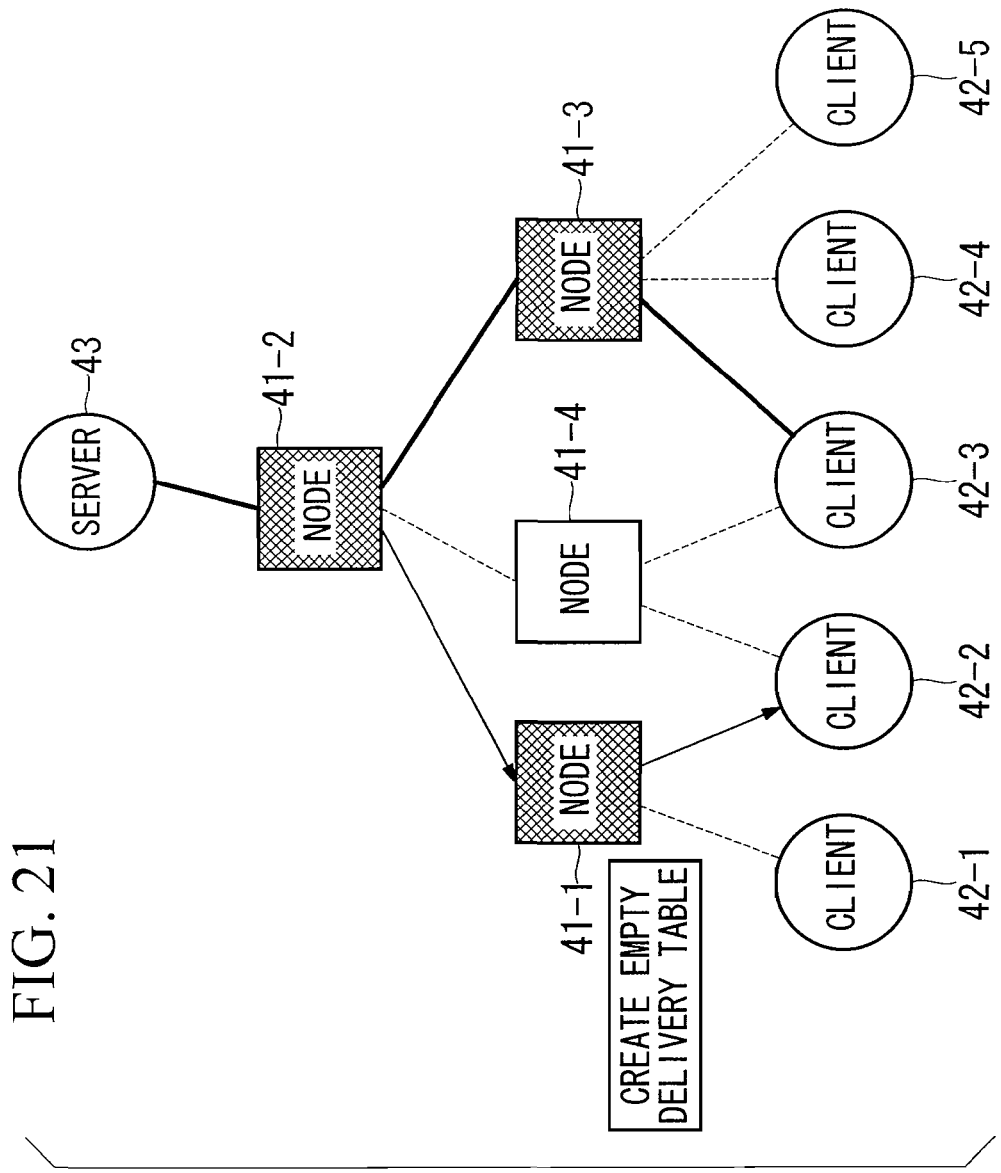
FIG. 21 is a diagram showing a process of forming a multicast tree in the network constitution of FIG. 16.
Figure 22:
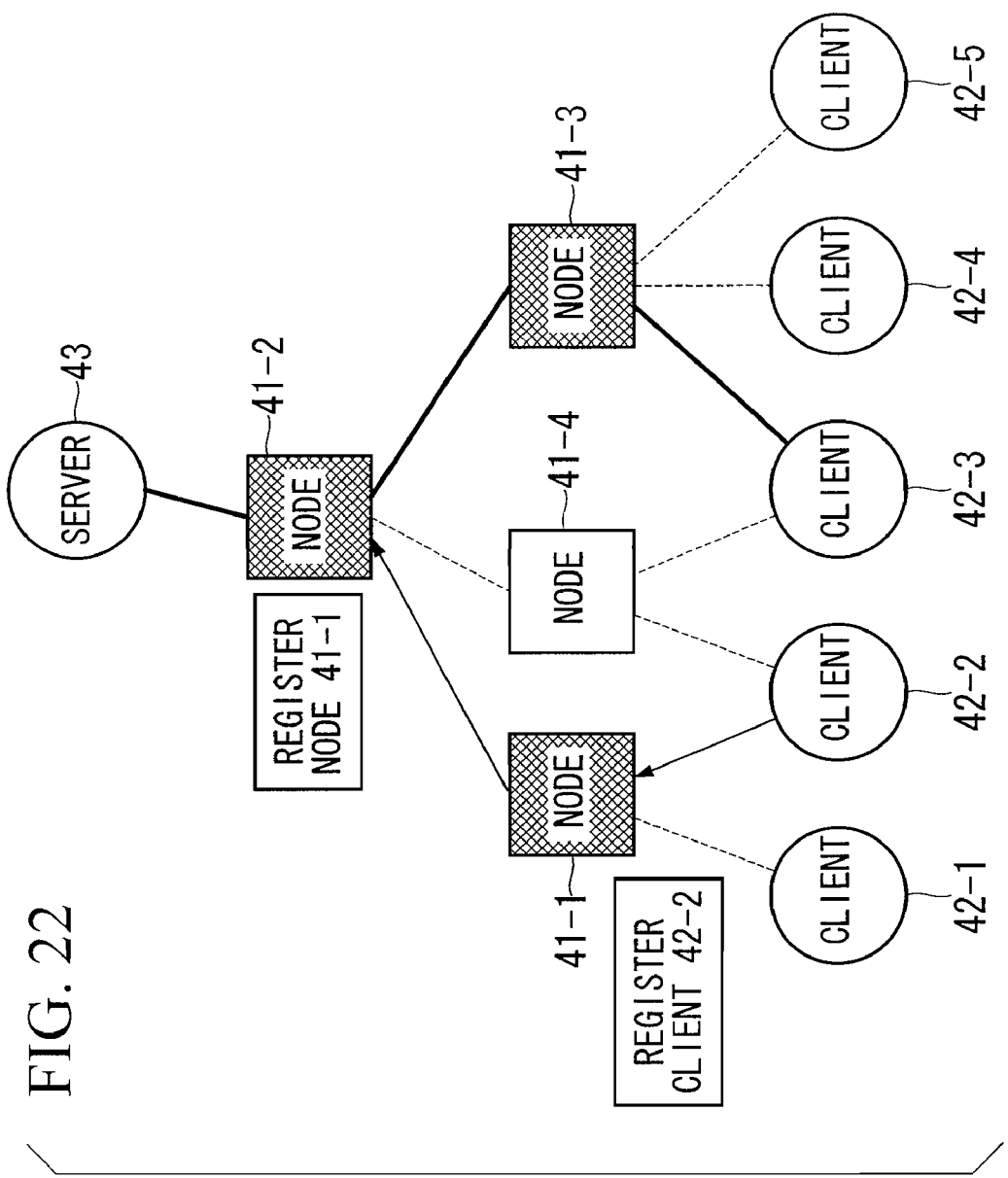
FIG. 22 is a diagram showing a process of forming a multicast tree in the network constitution of FIG. 16.

Then, as shown in FIG. 20, when the client 42-2 has transmitted a request packet, since there is no delivery table at the node 41-1, the request packet is forwarded toward the server 43. The request packet arrives at the node 41-2, and, since the node 41-2 has a delivery table, the node 41-2 sends a delivery-table-creation packet toward the client 42-2. As shown in FIG. 21, the delivery-table-creation packet creates a delivery table at the node 41-1; then, as shown in FIG. 22, based on the request packet from the client 42-2, the client 42-2 is registered in the delivery table of the node 41-1, and the node 41-1 is registered at the node 41-2.

Path information is accumulated based on the request packets, and the delivery-table-creation packet, transmitted from the server or node to the client, follows the path information in reverse for the following reason. If the path from the client to the server is different from the path from the server to the client, when the delivery-table-creation packet has simply been send toward the client, the delivery table will be created on a path which is different to that from the client to the server. In this case, since the request packet does not arrive at the node where the delivery table has been created, the node immediately times out. Furthermore, the request packet is forwarded to the node or the server which transmitted the delivery-table-creation packet. As a consequence, the delivery packet never arrives.

As with the first embodiment, the second embodiment is particularly useful when the client and server are mobile terminals. When the client is a mobile terminal, the client becomes registered at a new accommodating node by continuing to transmit a request packet, and is timed out at its old accommodating node. Conversely, when the server is a mobile terminal, as long as there is a mechanism for permitting unicast transmission to a mobile object such as a mobile IP, a request packet bound for the server is always transmitted to the position where the server is actually located. Consequently, a delivery table is created at a node which newly receives the request packet, and the delivery table at the node where the request packet has stopped arriving times out.

A specific implementation example will be described. The request packet holds a tree ID N, a source (transmission source) address S, a source (transmission source) side adjacent node address P, and path information Q from the source to the present node. The client transmits the request packet with the client address as S and P, and Q=S, toward the server. At the time of the arrival of the request packet at the node, if there is already a delivery table corresponding to the tree ID N, when S=P, the node registers S, and, when S≠P, transmits a delivery-table-creation packet including Q toward S.

When there is no delivery table corresponding to the tree ID N, the request packet is forwarded with P changed to the address of the present node and the present node added to Q. When the request packet has arrived at the server, the same node processing is performed by the server as when a delivery table exists.

Figure 23:
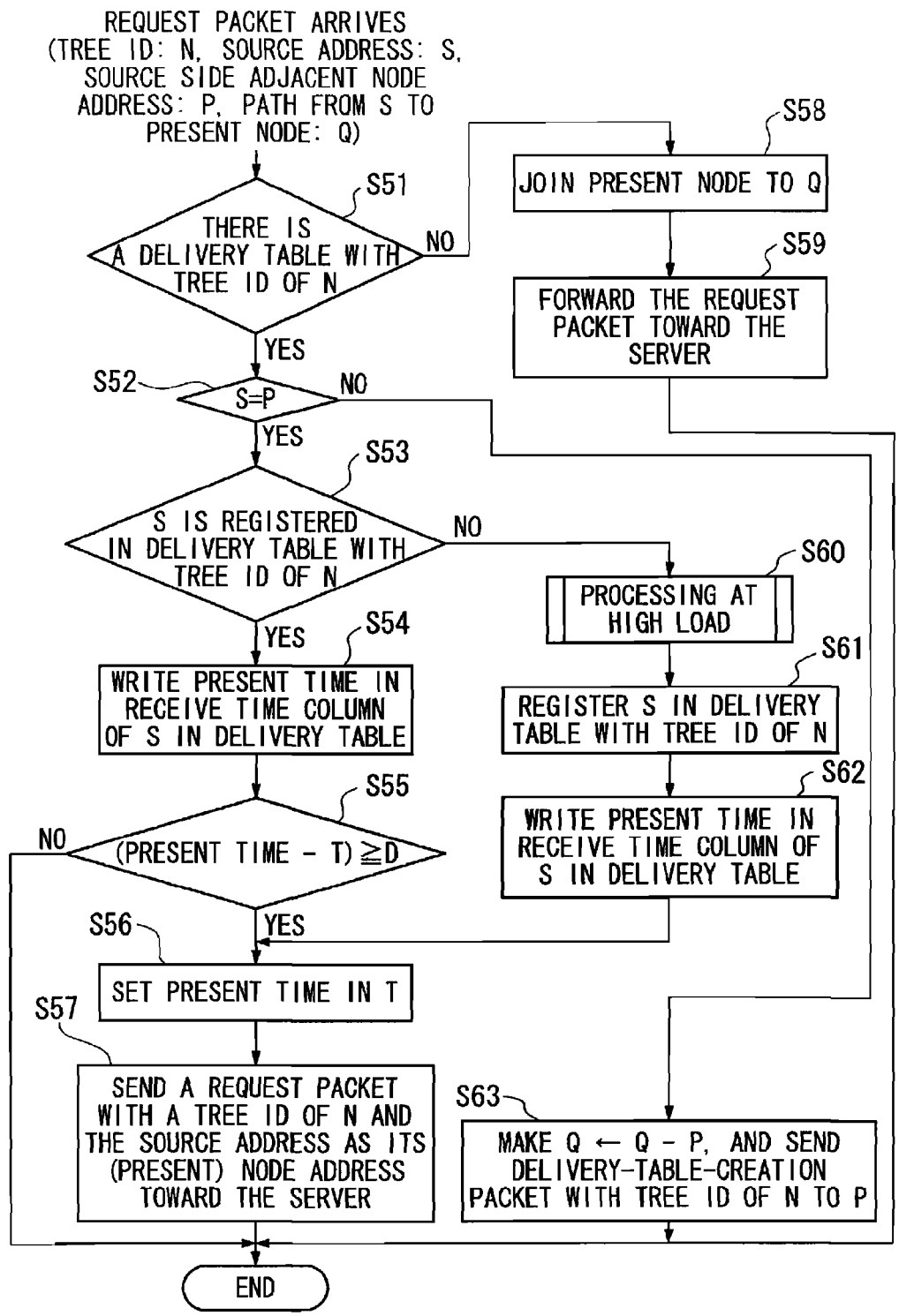
FIG. 23 is a flowchart showing processing when a request packet arrives according to the second embodiment of this invention.
Figure 24:
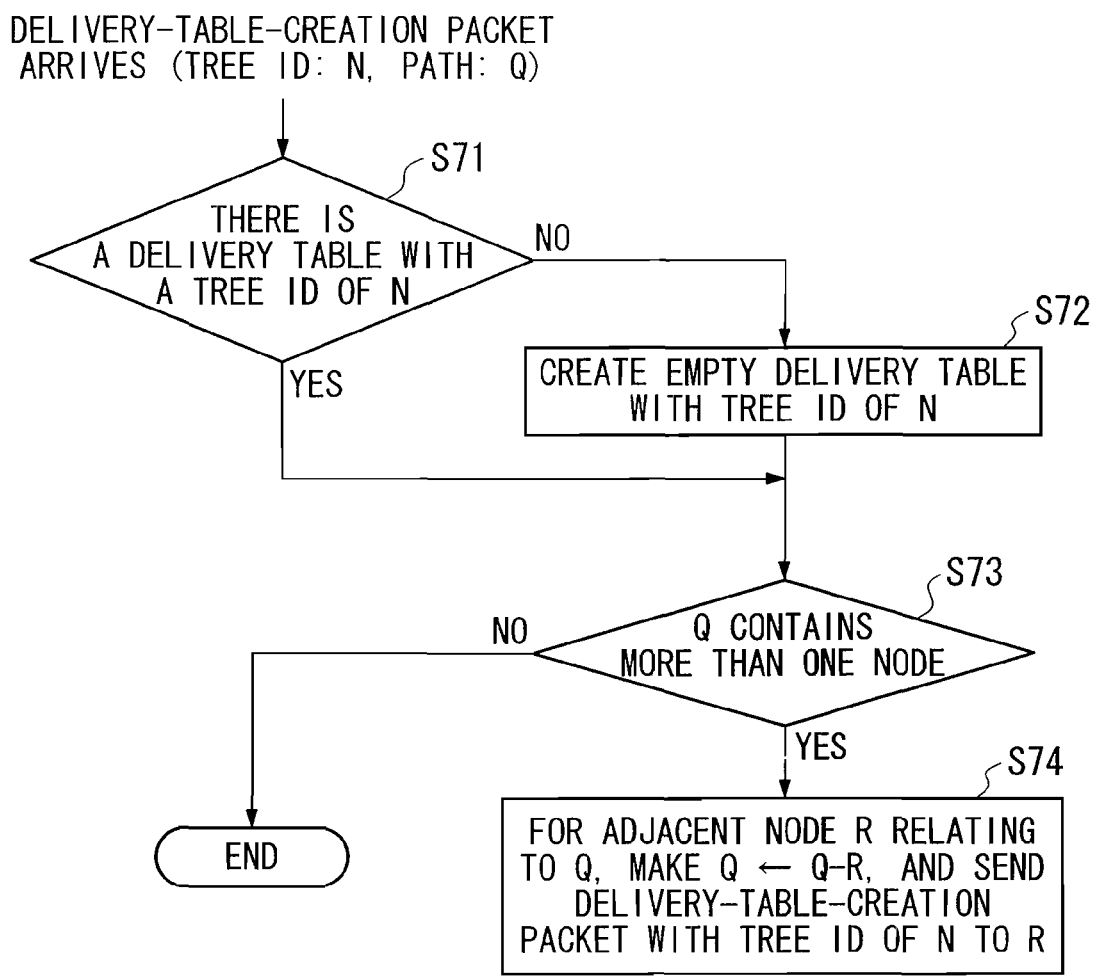
FIG. 24 is a flowchart showing processing when a delivery-table-creation packet arrives according to the second embodiment of this invention.

FIG. 23 shows the processing flow when the request packet has arrived at the node. In FIG. 23, the time interval D is defined in the same way as in the first embodiment. The high load processing in FIG. 23 is the same as in FIG. 13. FIG. 24 shows the processing flow when the delivery-table-creation packet has arrived at the node.

In this embodiment, a delivery table is created only at the node(s) on the path connecting the host which transmitted the request packet and the host which transmitted the delivery packet. For this reason, even when the delivery-table-creation packet is transmitted with a random destination address, the delivery table will not be created unless a node corresponding to this address actually exists. Therefore, concealing the addresses of the nodes in the network makes it difficult to make a node create an unwanted delivery table by using only a delivery-table-creation packet. Since packets other than the delivery-table-creation packet do not have the ability to create delivery tables, they obviously do not create delivery tables at the nodes. Furthermore, even when the host transmitting the delivery-table-creation packet and the host transmitting the request packet cooperate together in attempting to create an unwanted delivery table at a node, such an attack is unlikely to be effective.

Embodiment 3

In a third embodiment, the clients only transmit request packets; in addition, this embodiment is capable of dealing with mistakes in specifying a server.

According to the third embodiment, a request packet is transmitted by a client and arrives at the node, and, when there is no delivery table at the node, the source is changed to the present node and the request packet is forwarded to the server; on the other hand, when a delivery table exists, the source is registered in that delivery table. When a delivery packet from the server arrives at the node, if there is no delivery table at that node, an empty delivery table is created and the delivery packet is later discarded; when there is a delivery table, the delivery packet is duplicated as necessary and forwarded to children who have not timed out, in the same way as in the first embodiment.

When a request packet arrives after an empty delivery table has been created by a delivery packet, nodes which are adjacent to the client side on the path from the client to the present node are registered in the delivery table. This is because the source address of the arrived request packet is a node adjacent to the client side. A subsequently arriving delivery packet is delivered to the node adjacent to the client side, and an empty delivery table is consequently created at the node adjacent to the client side.

In this way, delivery tables are created from the server toward the clients, and the delivery packets are eventually delivered to the clients.

Figure 25:
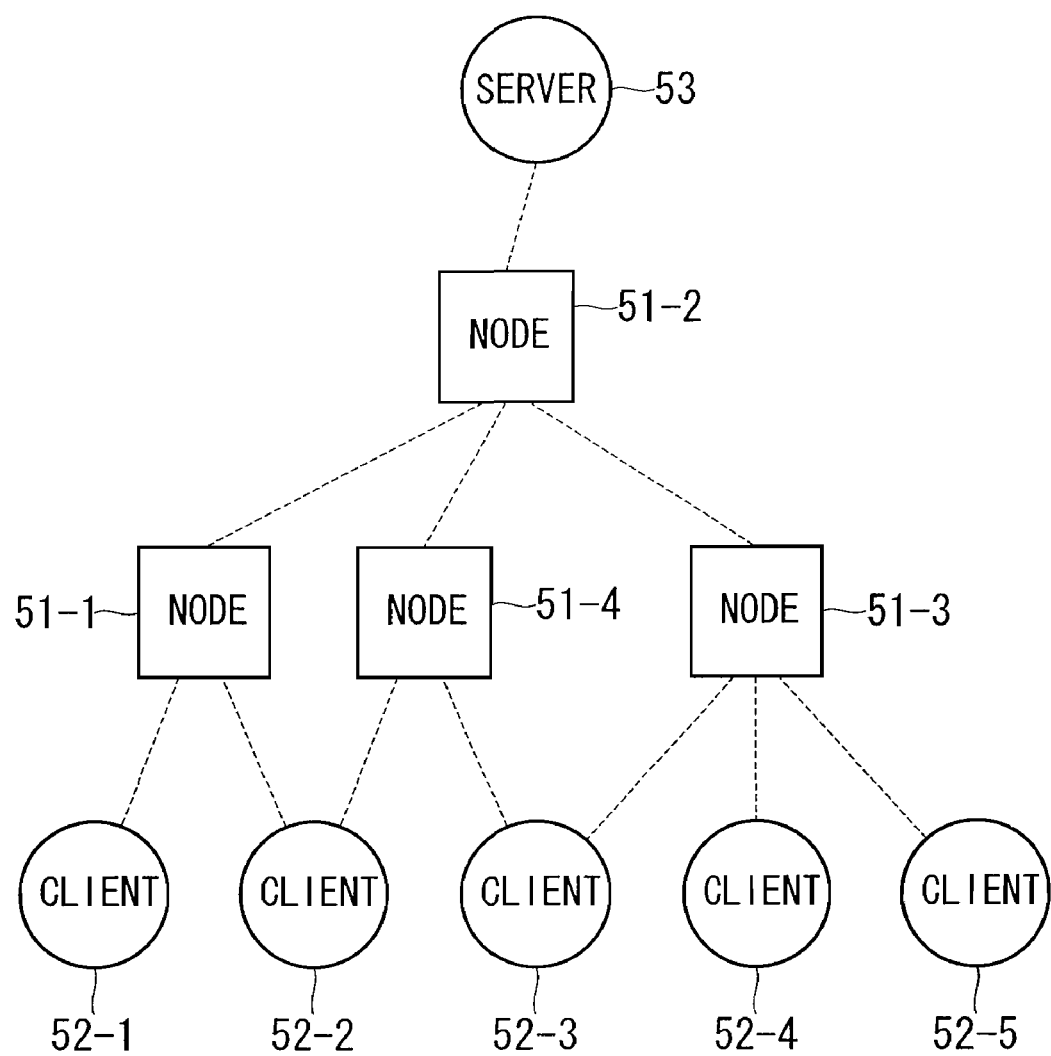
FIG. 25 is a diagram showing one example of the constitution of a network in multicast communication according to a third embodiment of this invention

FIG. 25 shows one example of the constitution of a network in which multicast communication is performed; four nodes 51-1, 51-2, 51-3, and 51-4 are connected to five clients 52-1, 52-2, 52-3, 52-4, and 52-5 and a server 53 via the network.

Figure 26:
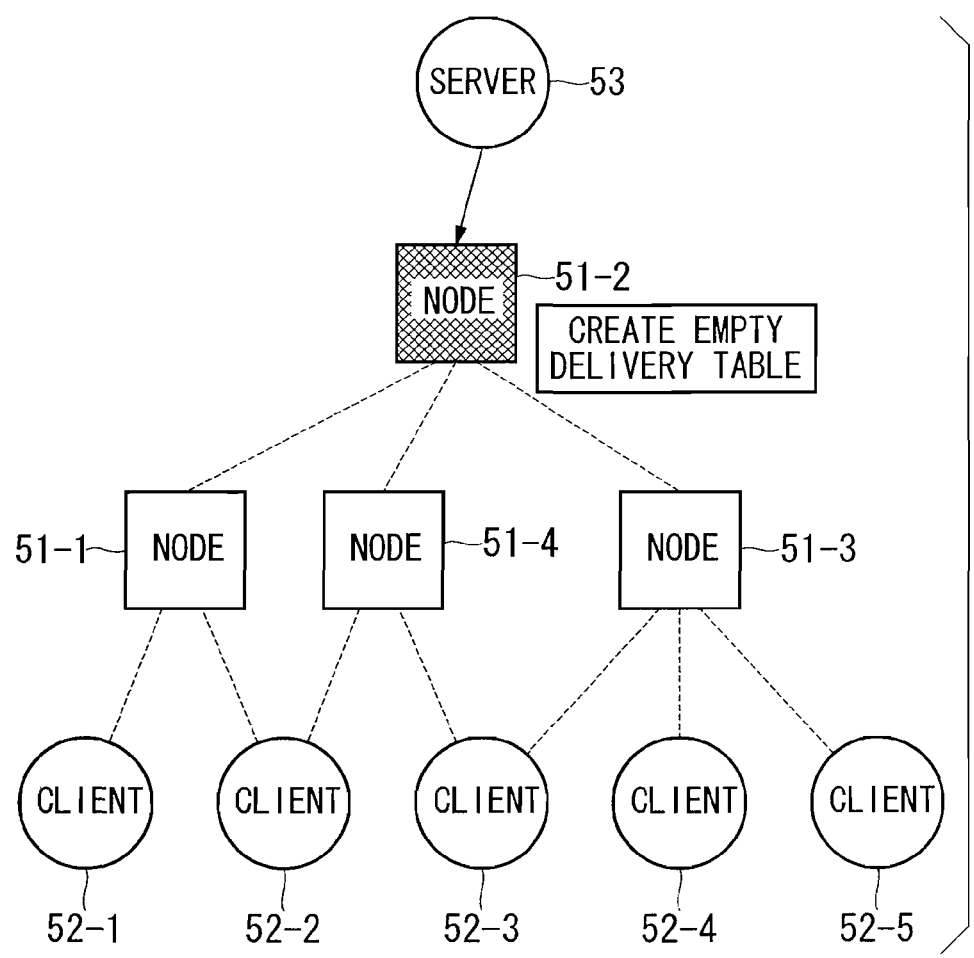
FIG. 26 is a diagram showing a process of forming a multicast tree in the network constitution of FIG. 25.

In the constitution of FIG. 25, when for example a request packet is sent from the client 52-3, the source address in the packet is changed at each node while being forwarded to the server 53. As shown in FIG. 26, since the source of the request packet is the node 51-2, the server 53 sends the delivery packet to the node 51-2. When the delivery packet arrives, since the node 51-2 has no delivery table, an empty delivery table is created.

Figure 27:
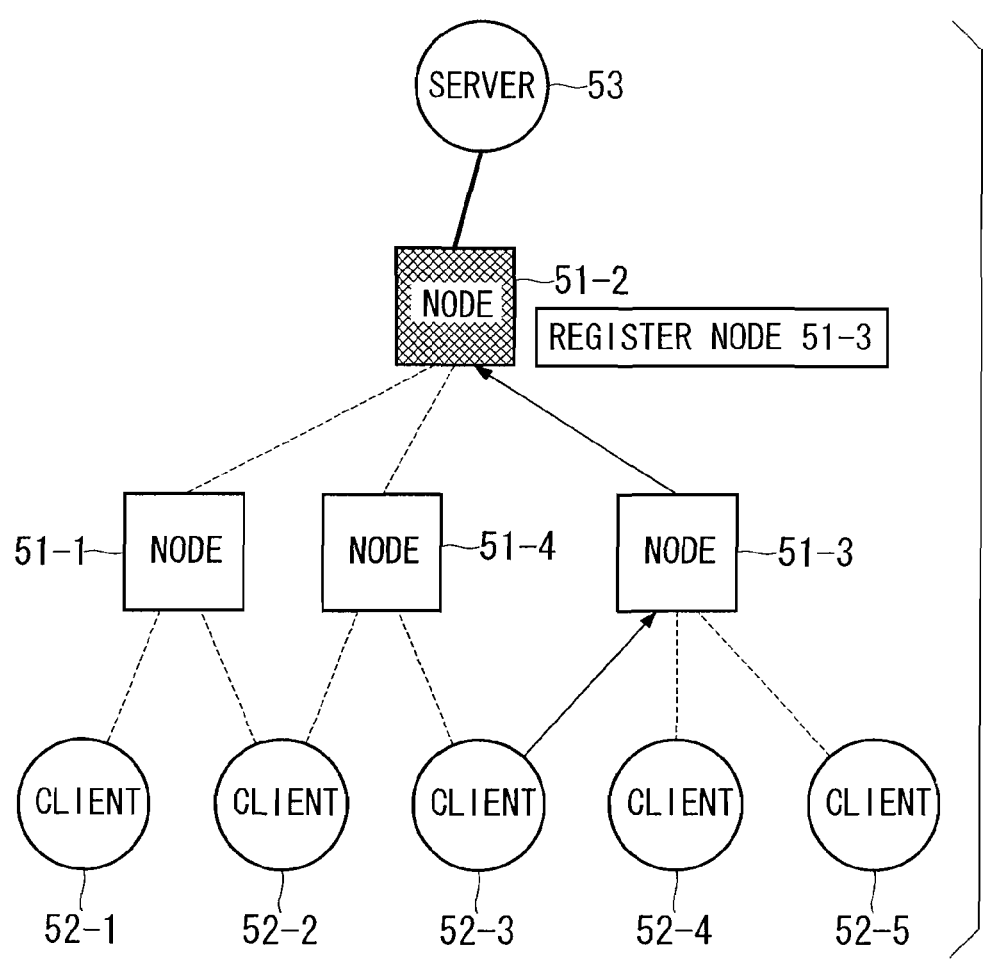
FIG. 27 is a diagram showing a process of forming a multicast tree in the network constitution of FIG. 25.
Figure 28:
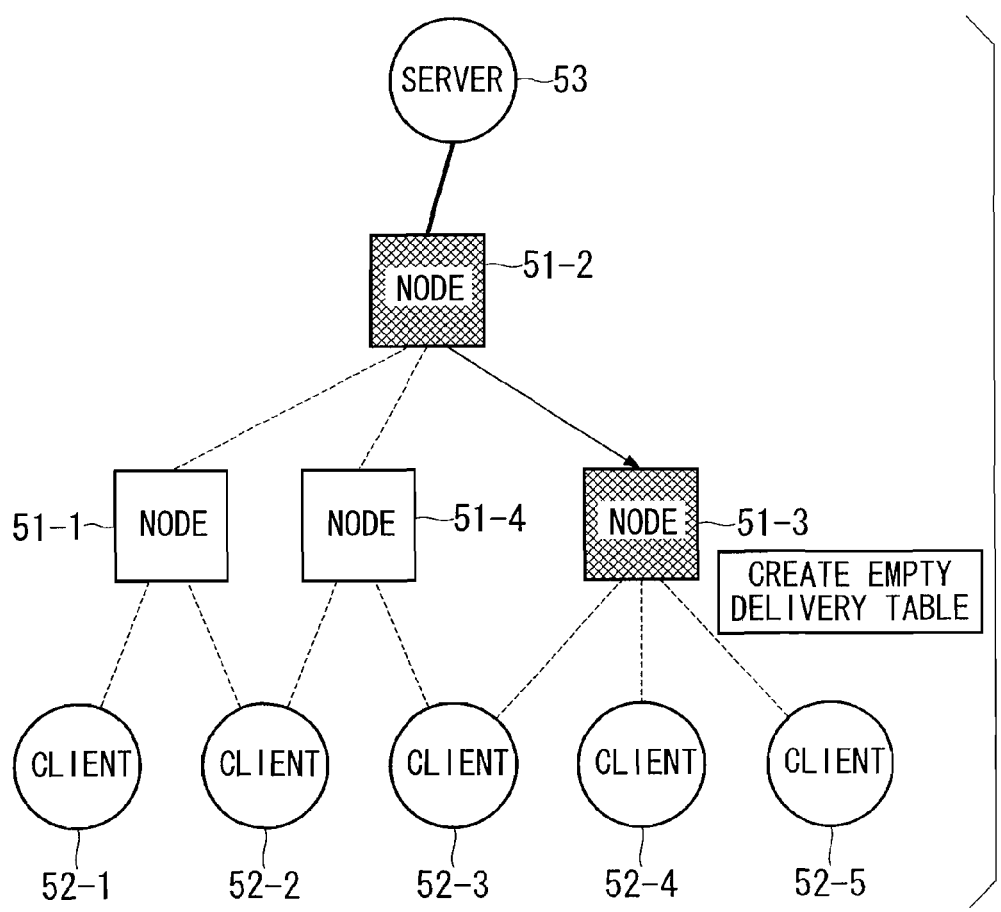
FIG. 28 is a diagram showing a process of forming a multicast tree in the network constitution of FIG. 25.

Thereafter, when a subsequent request packet arrives, the node 51-3, which is the source of the request packet, is registered in the delivery table of the node 51-2, as shown in FIG. 27. Then, as shown in FIG. 28, the delivery packet is sent to the node 51-3 based on the delivery table of the node 51-2.

Figure 29:
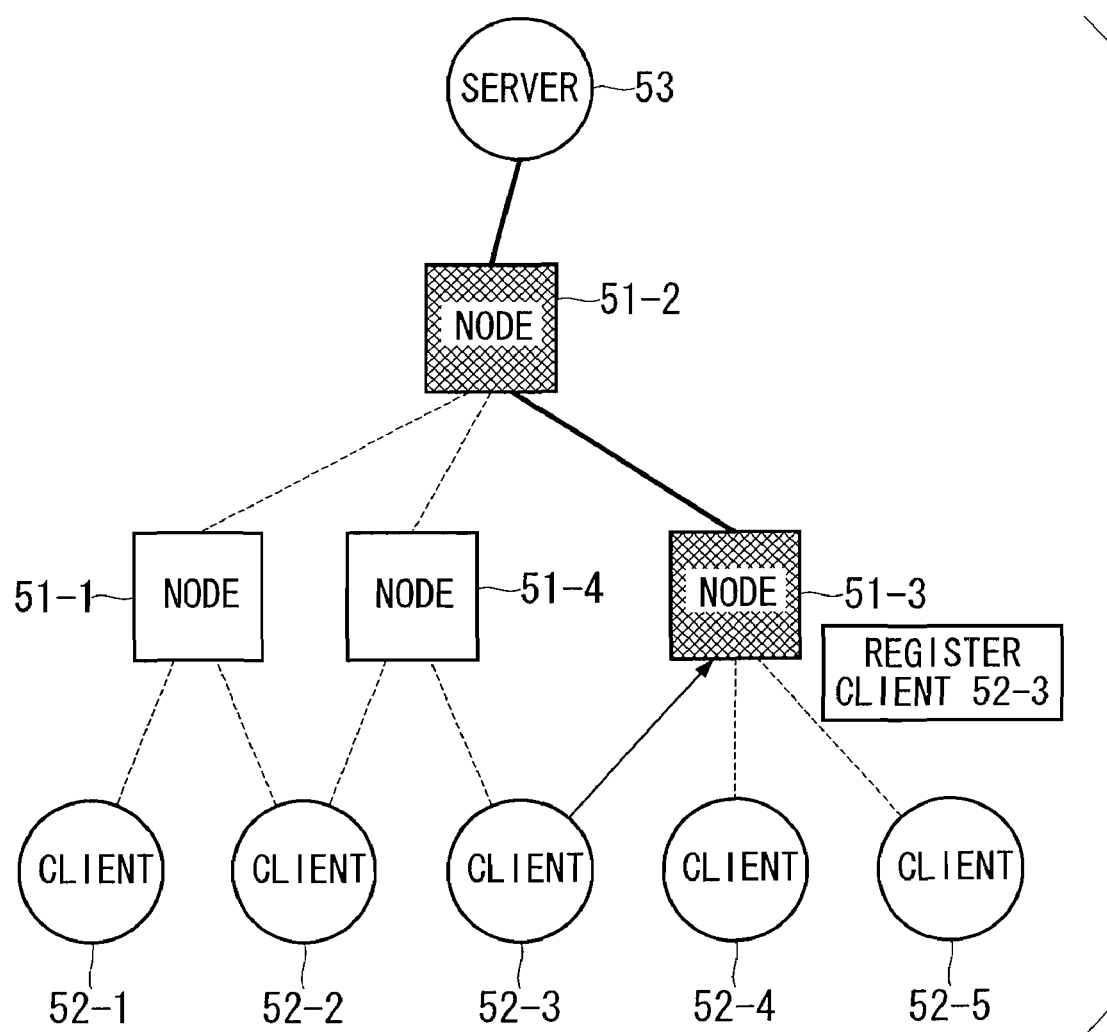
FIG. 29 is a diagram showing a process of forming a multicast tree in the network constitution of FIG. 25.

Similarly, after an empty table has been created at the node 51-3, as shown in FIG. 29, the client 52-3 is registered in the delivery table according to the request packet, and finally, the delivery packet is delivered to the client 52-3.

When the path from the client to the server is different from the path from the server to the clients, the delivery tables are always created on the path from the clients to the server, and the delivery packet travels on the same path; therefore, the nodes or server where the delivery tables are created are never different from the nodes or server where the request packets arrive.

When a delivery-table-creation packet having no path information (equivalent to a delivery packet in this embodiment) has simply been transmitted toward a client, since the destination address is not changed to any node, no delivery table is created at any node.

As in the first embodiment, the third embodiment is useful when the client and server comprise mobile terminals. When the client is a mobile terminal, the client becomes registered at a new accommodating node by continuing to transmit a request packet, and is timed out at its old accommodating node. Conversely, when the server is a mobile terminal, as long as there is a mechanism for allowing unicast transmission to a mobile object such as a mobile IP, a request packet bound for the server is always transmitted to the position where the server is actually located. Consequently, a delivery table is created at a node which newly receives the request packet, and the delivery table at the node where the request packet has stopped arriving times out.

Figure 30:
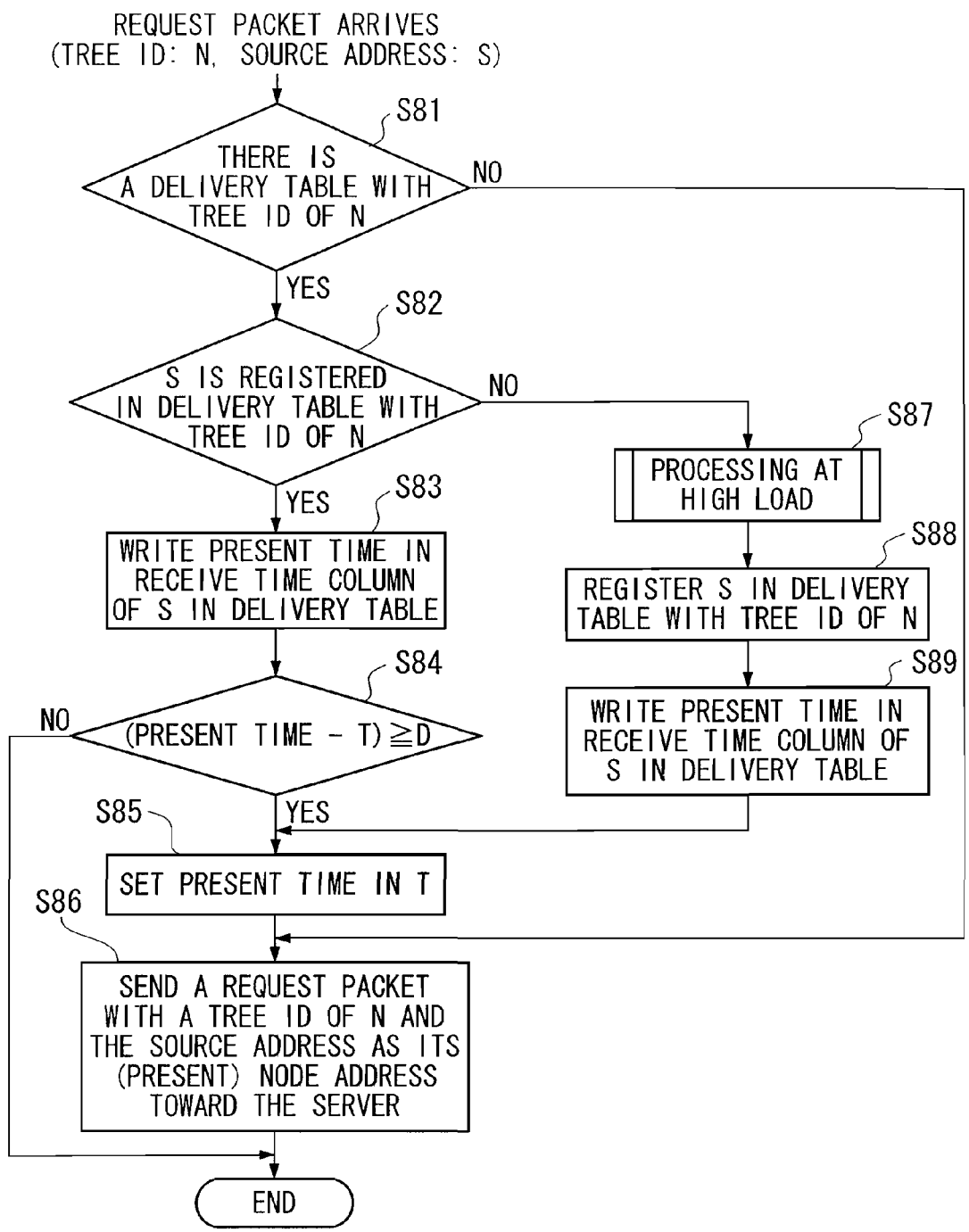
FIG. 30 is a flowchart showing processing when a request packet arrives according to the third embodiment of this invention.
Figure 31:
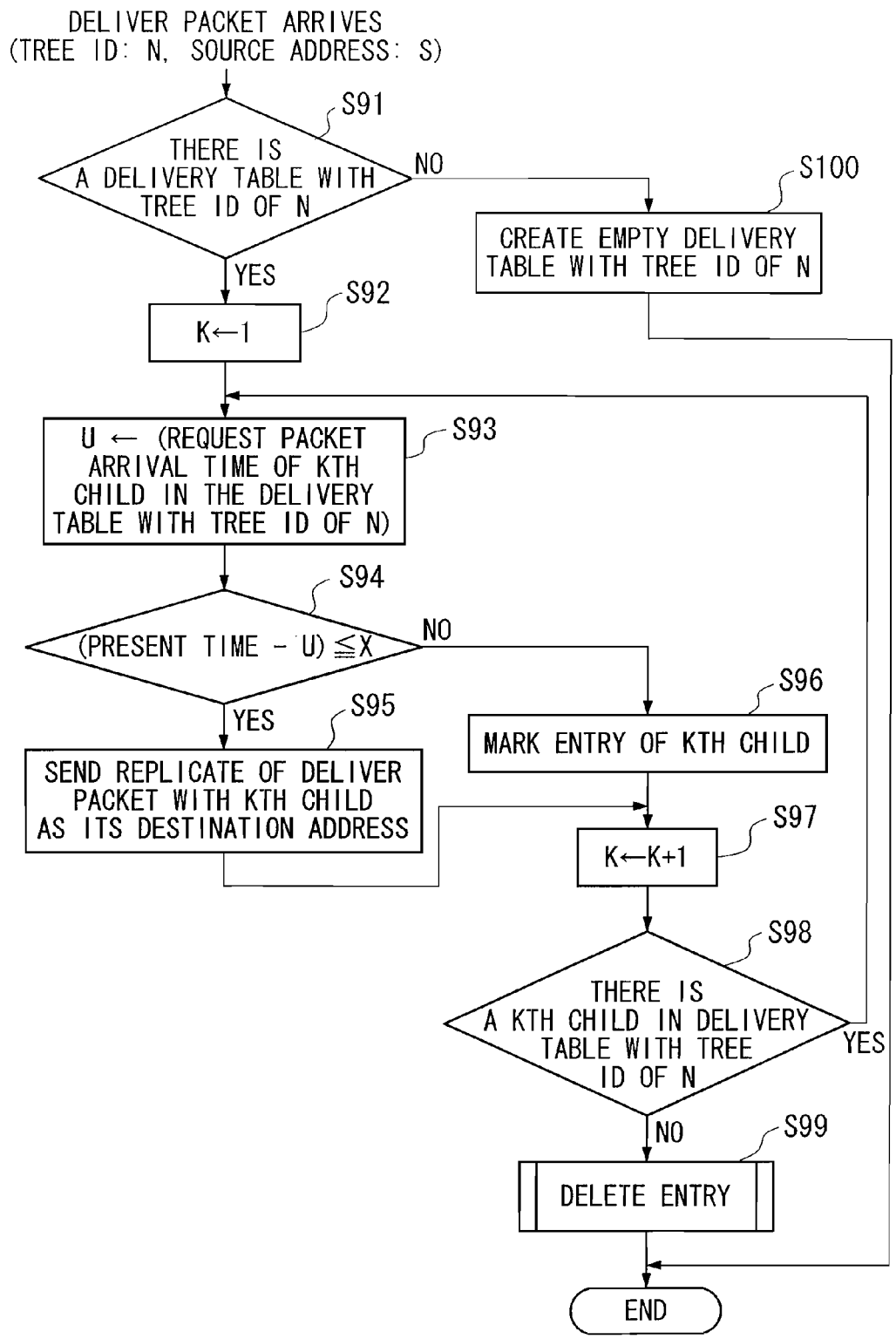
FIG. 31 is a flowchart showing processing when a delivery packet arrives according to the third embodiment of this invention.

FIGS. 30 and 31 respectively show the processing flows when a request packet and a delivery packet have arrived at a node. The high-load processing in FIG. 30 is the same as that of FIG. 13. The entry deletion processing in FIG. 31 is the same as that of FIG. 15. In FIG. 31 it is assumed that X is fixed.

As in the first embodiment, when forwarding a request packet and a delivery packet in the third embodiment, there is no need to consider how many nodes are connected beyond the parent node or the child, thereby ensuring excellent scalability.

In this embodiment, as in the second embodiment, delivery tables are created only at the nodes on the path connecting the host which transmitted the request packet and the host which transmitted the delivery packet. Therefore, as in the second embodiment, when the addresses of the nodes in the network are concealed, unwanted delivery tables cannot be created at the nodes unless the host transmitting the delivery-table-creation packet cooperates with the host transmitting the request packet. Furthermore, according to this embodiment, even when a request packet has been glimpsed on the server side, for example, it is only possible to learn the address of the node adjacent to the server and not any other nodes. Therefore, security is more stable than in the second embodiment.

Node Constitution

Figure 32:
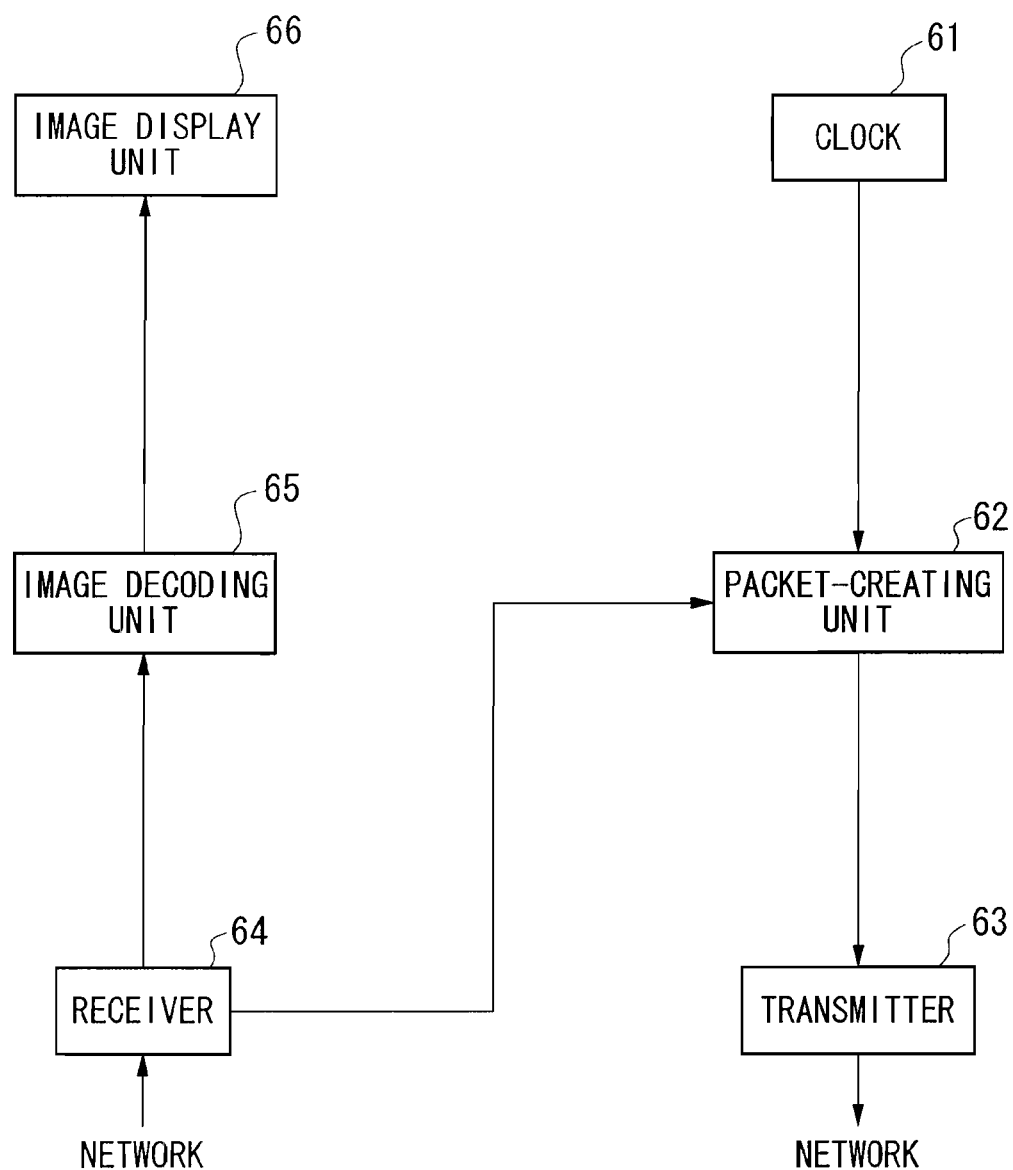
FIG. 32 is a block diagram showing one example of the constitution of a client according to the first to third embodiments of this invention.

FIG. 32 shows the constitution of a client common to the first, second, and third embodiments. In FIG. 32, reference numeral 61 represents a clock, 62 represents a packet-creating unit, 63 represents a transmitter, 64 represents a receiver, 65 represents an image decoding unit, and 66 represents an image display unit.

At the client, the packet-creating unit 62 regularly creates request packets by using the clock 61, and the transmitter 63 transmits them toward the server. When the receiver 64 receives a delivery packet, the image decoding unit 65 decodes image data, carried by the delivery packet, and the image display unit 66 displays the image.

In the case of the client in the first embodiment in particular, the client creates and transmits the request packet only when the client has created a server-probe packet by using the packet-creating unit 62, the transmitter 63 has transmitted it toward the server, and the receiver 64 has received a reply packet.

Figure 33:
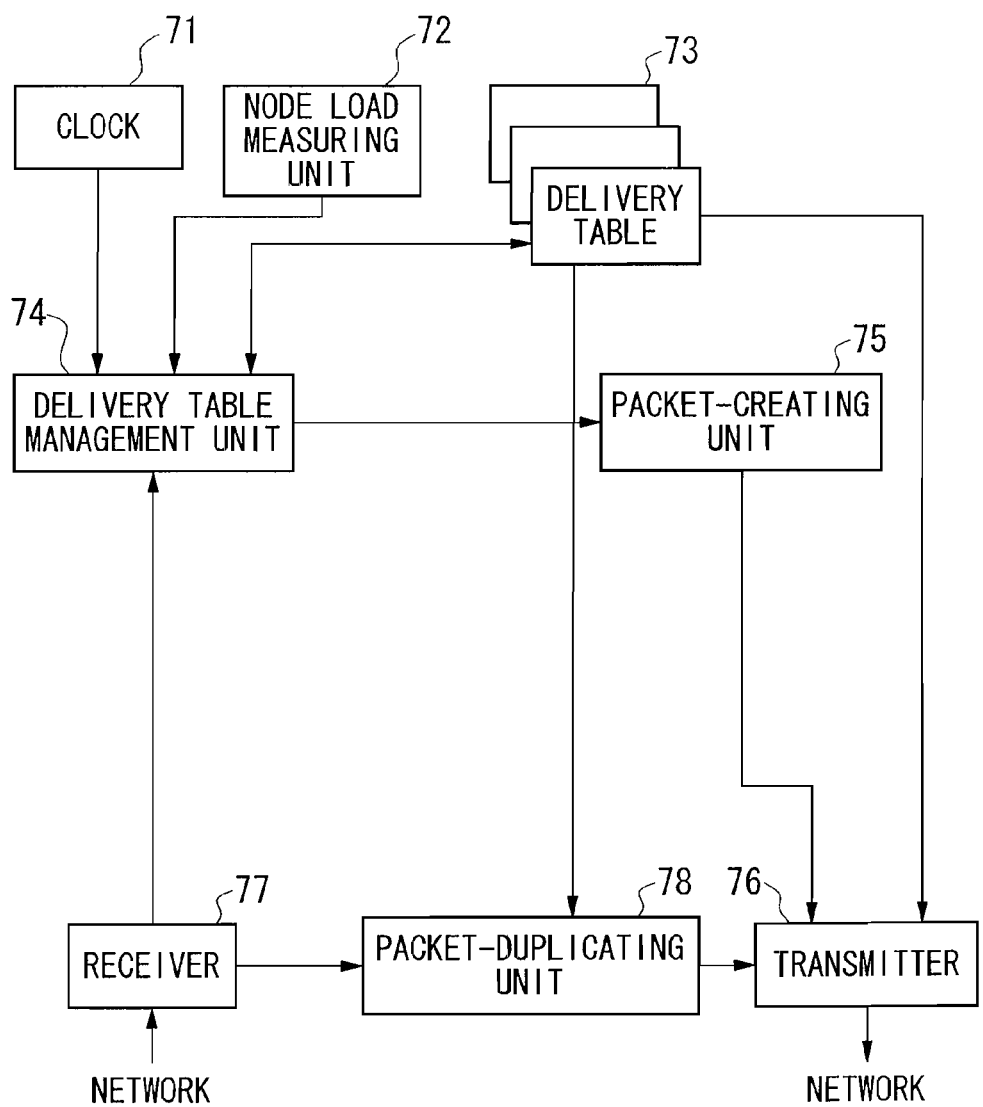
FIG. 33 is a block diagram showing one example of the constitution of a node according to the first to third embodiments of this invention.

FIG. 33 shows the constitution of a node common to the first, second, and third embodiments; reference numeral 71 represents a clock, 72 represents a node load measuring unit, 73 represents a delivery table, 74 represents a delivery table management unit, 75 represents a packet-creating unit, 76 represents a transmitter, 77 represents a receiver, and 78 represents a packet duplicating unit.

At the node, when the receiver 77 receives a request packet, the node load measuring unit 72 measures the load; when the load is not too high, the node consults the clock 71, and the delivery table management unit 74 updates the delivery table as shown in FIG. 12 (first embodiment), FIG. 23 (second embodiment), and FIG. 30 (third embodiment), and (where necessary) the packet-creating unit 75 creates a new request packet, and the transmitter 76 transmits it toward the server. Furthermore, when the receiver 77 receives a delivery packet, as shown in FIG. 14 (first and second embodiments) and FIG. 31 (third embodiment), the packet duplicating unit 78 makes a number of duplicates of the delivery packet which is exactly equal to the number of children registered in the delivery table corresponding to the tree which the delivery packet belongs to, and the transmitter 76 transmits the duplicated packets to the children.

Incidentally, the delivery table management unit 74 creates the delivery table 73 as shown in FIG. 12 (first embodiment), FIG. 24 (second embodiment), and FIG. 31 (third embodiment); furthermore, the delivery table management unit 74 deletes the delivery table 73 and its entries as shown in FIG. 14 (first and second embodiments) and FIG. 31 (third embodiment).

Figure 34:
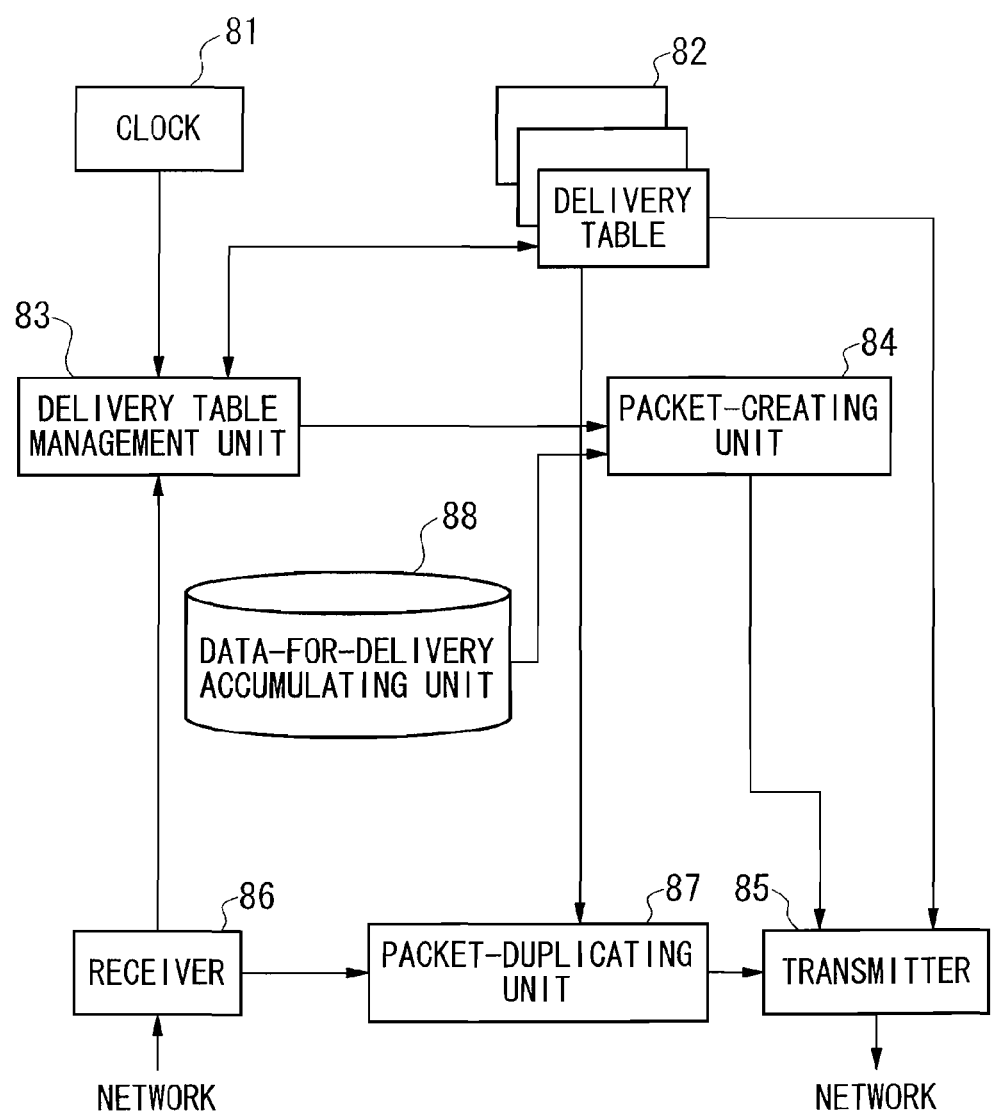
FIG. 34 is a block diagram showing one example of the constitution of a server according to the first to third embodiments of this invention.

FIG. 34 shows the constitution of a server common to the first, second, and third embodiments; reference numeral 81 represents a clock, 82 represents a delivery table, 83 represents a delivery table management unit, 84 represents a packet-creating unit, 85 represents a transmitter, 86 represents a receiver, 87 represents a packet duplicating unit, and 88 represents a data-for-delivery-accumulating unit.

In the same manner as the node, the server stores the sources and arrival times of the request packets in the delivery table 82. The delivery table management unit 83 manages deletion, updating, registration, and the like, of data in the delivery table 82. The server arranges data for delivery, which has been accumulated in the data-for-delivery-accumulating unit 88, into a packet by using the packet-creating unit 84, uses the packet duplicating unit 87 to duplicate the packet in correspondence with the number of children registered in the delivery table 82 which have not timed out, and uses the transmitter 85 to transmit the packets to the children.

Particularly in the case of the server in the second embodiment, the delivery-table-creation packet is created by the packet-creating unit 84 and transmitted by the transmitter 85.

Packet Format

Subsequently, the format of a packet according to the first to third embodiments described above will be explained; prior to this, flow identification will be explained.

Since a mixed variety of packets are forwarded in the network, flow-identification must be performed to the unique packets (request packet, delivery packet, delivery-table-creation packet, server-probe packet) of the embodiments of this invention, to enable the clients, nodes, and server to identify them. There are various methods for flow-identification; in this example, a method using a "well-known port" will be described. There is a similar conventional method known as HTTP (hyper text transfer protocol) which uses port 80.

Figure 35:
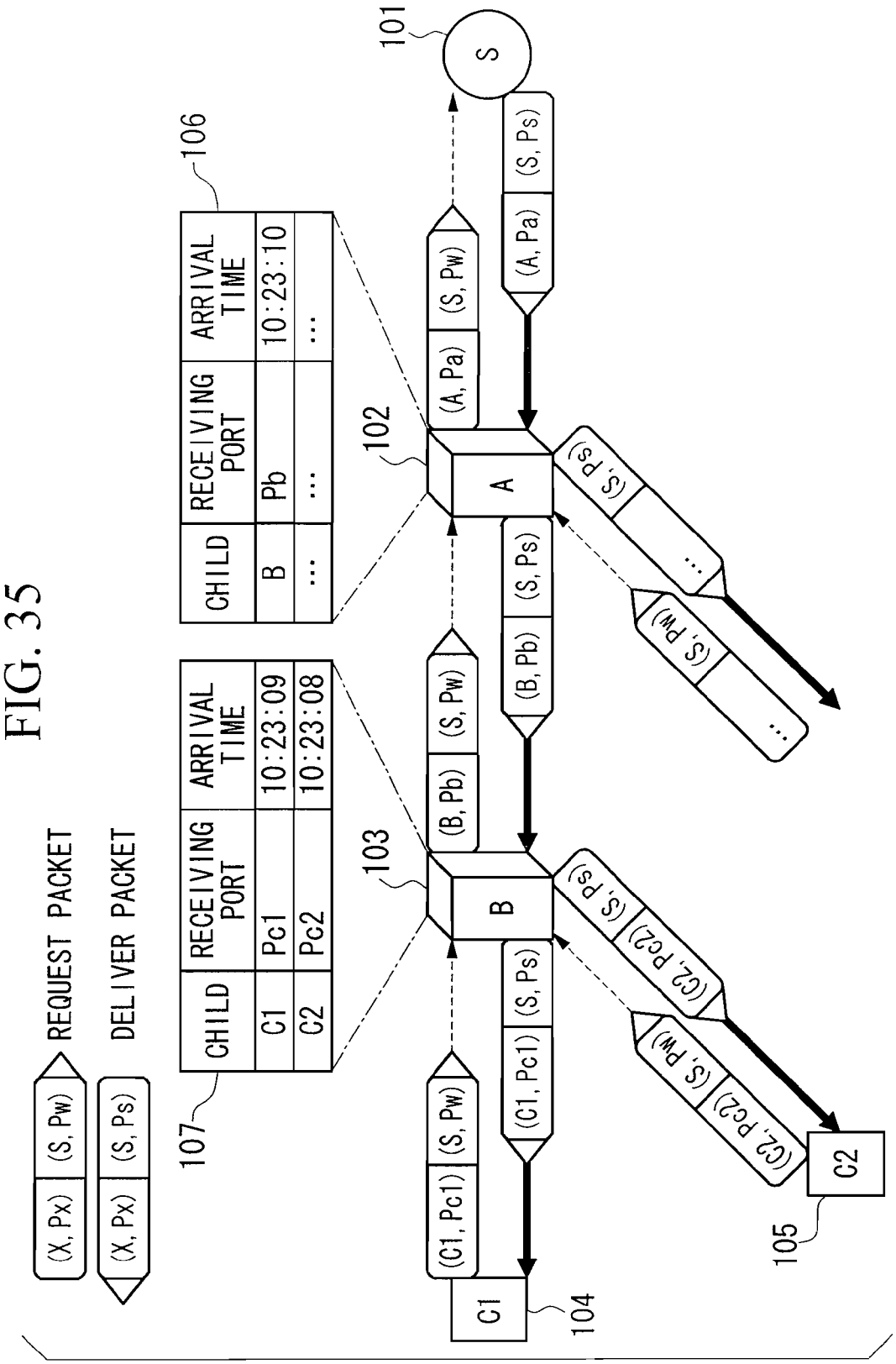
FIG. 35 is a diagram showing the status of flow-identification using a well-known port in the first to third embodiments of this invention.

The protocol used here is assumed to be UDP (user datagram protocol). A well-known port is determined in advance for flow-identification; the port number is consulted, and a packet with this well-known port as its destination is identified as a packet unique to the embodiments of this invention. FIG. 35 shows the state of flow-identification using the well-known port in a network comprising a server 101, nodes 102 and 103, and clients 104 and 105. FIG. 35 shows an example where the source port of the request packet is equivalent to the receiving port of the delivery packet. Letter S represents the address of the server 101, A and B respectively represent the addresses of the nodes 102 and 103, and C1 and C2 respectively represent the addresses of the client 104 and 105.

The destination address of the request packet is address S, the destination port is the well-known port Pw mentioned above, the source address is X (one of A, B, C1, and C2), and the source port is Px (one of Pa, Pb, Pc1, and Pc2 corresponding to the source address X). The destination address of the delivery packet is address X, the destination port is Px, the source address is S, and the source port is Ps. The source address of the delivery packet is the address of the server 101; this is for the reason that, since a delivery table is created for each server, the node determines which server each delivery table corresponds to by consulting the source address of the delivery packet. The fields of the receiving ports, in which the same values as the source ports of the request packets are registered in groups with the fields of the sources ("child" in FIG. 35) and arrival times of the request packets in the delivery tables 106 and 107 of the nodes 102 and 103.

The clients and nodes send request packets from the ports which wish to receive delivery packets to the server 101 by unicast transmission, with the well-known port mentioned above as the destination port of the request packet. For example, the source address of the request packet transmitted by the client C1 is C1, its source port is Pc1, and its destination address and destination port are the same as described above.

At a node where a request packet has arrived, the source address and source port of the request packet are stored in the delivery table. The node consults the delivery table, and unicast transmits the delivery packet, with a group comprising the source address and source port as its destination, to receiving ports of those children which have not timed out. For example, based on the request packet from the client 104, the node 103 groups the source address C1, the source port Pc1, and the arrival time of 10:23:09 together, and stores the group in the delivery table 107. Furthermore, the node 103 sends a delivery packet having a destination address of C1, a destination port of Pc1, a source address and source port with the values S and Ps sent from the server 101 side, to the client 104.

When the node sends the request packet to a parent node, the method is the same as when a client sends the packet. For example, the destination address and destination port in the request packet transmitted by the node 103 are always respectively S and Pw, the source address is B, and the source port is a given port (e.g. Pb). This is for the reason that only the request packet needs to be processed at a node with an address which is different to the destination (server) address. When the source port is Pw, delivery packets with a destination port of Pw flow through the network, and it must be ensured that these delivery packets are not processed at nodes other than the destination.

The server 101, where the request packet has arrived, transmits a delivery packet in which the source address and source port are respectively S and Ps, the destination address and destination port are respectively equivalent to the source address A and source port Pa from the node 102.

It may happen that a plurality of servers concurrently deliver multiple types of stream data on a single host. In such a case, since the well-known port is used in flow-identification as described above, it is impossible to distinguish between the servers on the same host based on the port. Accordingly, information termed "channel ID" is newly provided to identify the plurality of servers on the same host. The channel ID must be set to a unique value on a single host, but values for different servers need not be unique. By coupling the server addresses and channel ID in this way, it is possible to uniquely identify the servers and the multicast tree. In other words, delivery tables are created for each coupling of server address and channel ID in each node. The channel ID may, for example, be mounted on the payload of the packet.

Figure 36:
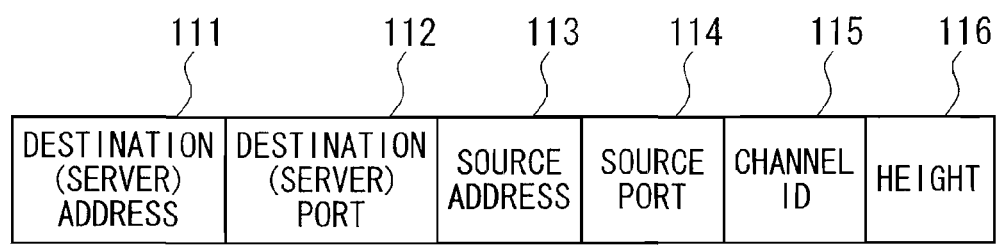
FIG. 36 is a diagram showing one example of a format of a request packet in the first to third embodiments of this invention.

Subsequently, a packet format assuming the flow-identification described above will be explained. FIG. 36 shows one example of the format of a request packet, comprising the fields of a destination (server) address 111, a destination (server) port 112, a source address 113, a source port 114, a channel ID 115, and a height 116. The destination address 111 to the channel ID 115 has already been explained above. The node uses the height 116 to determine the height h in the multicast tree, as described in the first embodiment. Incidentally, as shown in FIG. 35, the destination address 111 and the destination port 112 always define the server.

Figure 37:
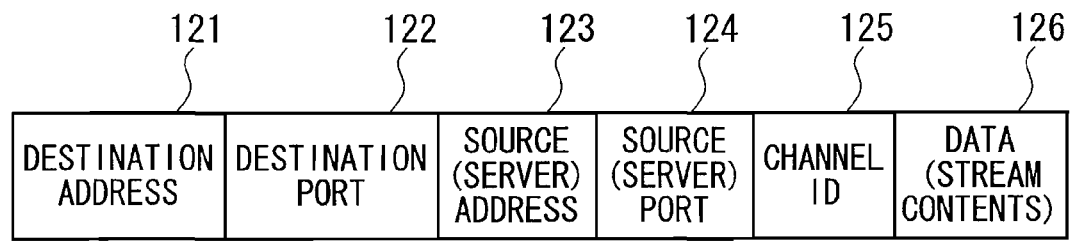
FIG. 37 is a diagram showing one example of the format of a delivery packet in the first to third embodiments of this invention.

FIG. 37 shows one example of the format of a delivery packet, and comprises the fields of a destination address 121, a destination port 122, a source (server) address 123, a source (server) port 124, a channel ID 125, and data 126. The destination address 121 to the channel ID 125 are the same as those already explained above. The data 126 comprises a delivered stream (contents). Incidentally, as shown in FIG. 35, the source address 123 and the source port 124 always define the server.

Applied Example

Subsequently, with regard to the multicast communication described in the first to third embodiments, an applied example with an optional function of transcoding function will be explained. Transcoding signifies changing all or part of the contents data when repeating the contents, such as a stream, through a plurality of nodes. More specifically, transcoding comprises functions such as attaching ad (advertisement) data to the contents data, exchanging ad data which is already attached to the contents data for other ad data, and transforming the data format of the contents data to another format.

Conventionally, when delivering a stream of data with, for example, an ad attached thereto from a server to clients via a multicast tree network, required ad data is attached in advance to the stream data at the server, and then delivered to the clients.

In the above method, more effective ads can be supplied to clients by attaching ad data which matches the preferences of the clients (users) to the stream of data; however, since this requires a vast number of ad-attached stream data to be prepared in accordance with the various preference of the clients, the load at the server increases and scalability deteriorates.

A variety of methods for solving these problems have been proposed in recent years. For example, Japanese Unexamined Patent Application, First Publication No. 2000-29712 discloses a method of selectively attaching advertisements at terminal stations provided in regional amusement arcades and the like, when downloading game programs from a server.

Furthermore, Japanese Unexamined Patent Application, First Publication No. Hei 11-134353 by the applicant of the present application discloses a method in which an ad-attaching server is provided in the network, and extracts stream data from the server in response to a data-extraction request from a client; ad data matching the preferences of the client is attached to the stream data based on statistical data, which is then sent to the client who made the extraction request.

However, the method for selectively attaching an ad at the terminal station has a drawback that, the ad-attachment processing load must be dispersed at every terminal station, which is infeasible when the number of clients has dynamically increased or decreased.

The method for extracting required ad-attached stream data by using the ad-attaching server has a drawback that the clients must request data extraction, not to the server, but to a proxy server, with the consequence that the load becomes concentrated at the ad-attaching server Japanese Unexamined Patent Application, First Publication No. 2001-306611 discloses another method relating to ad delivery which matches client preferences. According to this publication, ads to be delivered to users are determined based on information accumulated in a preference management server, a customer management server, and an ad management server, thereby ensuring the delivery of the ads matching the preferences of the users. However, this publication does not consider the dispersal of the ad-attachments, and cannot be combined with the multicast systems of the first to third embodiments described above.

In view of these circumstances, functions such as the following are attached during multicast communication in this applied example.

effectively attaching or exchanging attachment data, such as ads matching preferences of clients, to contents data.

during the process of delivering the contents data, converting the data format of the contents data to a format which can be received by the clients.

delivering required contents data with consideration for the load status of the nodes themselves, and the load status of the communication link between the nodes.

Furthermore, the explanation of this applied example assumes the following details. Firstly, the multicast protocol is assumed to be an application layer protocol. In IP multicast, anyone who is participating in the multicast tree can transmit stream data, but in this example, only a node such as a server corresponding to the root of the multicast tree are allowed to become the transmitter. It is also assumed that each node in the multicast tree is capable of distinguishing between its own children in order to process them in different ways, and that the children explicitly or implicitly know their parent nodes.

To simplify the explanation, the characteristics features of the transcoding function will be explained first, followed by an explanation of how this function is added in multicast communication. To schematically illustrate the former explanation, we will consider a case where predetermined attachment data, comprising ad data, is attached to stream data being repeated by a plurality of nodes. Then there will be sequentially explained first and second examples of apparatuses based on the schematic explanation, examples of a network system apparatus and method, examples of programs and a recording medium for executing the method; in addition, first and second modifications of the above will be explained in detail, describing a case where the format of the stream data is transformed.

Although the examples of the first apparatus, the first network system apparatus, the first method and the second apparatus, the second network system apparatus, the second method, have different cost models, their basic technological ideas are the same. Therefore, it is possible to selectively implement any one of the first apparatus, the first network system apparatus, the first method and the second apparatus, the second network system apparatus, and the second method. Similarly, either one of the first modification and the second modification can be selectively implemented. Furthermore, any one of the first apparatus, the first network system apparatus, the first method and the second apparatus, the second network system apparatus, the second method, can be simultaneously implemented with either one of the first modification and the second modification.

Summary

This applied example assumes application in the above multicast communication, and considers a case where a stream of data is delivered by multicast from a server to a plurality of clients. In a special case where there is only one client, this applied example can also be applied in one-to-one communication (unicast).

The clients (users) select one or multiple advertising categories from n types of advertising categories. The ad categories need not be selected explicitly by the users, but may, for example, be selected by automatically extracting information relating to preferences of the users from network access histories at the clients.

The nodes are equipped with the function of attaching and exchanging ad data to the stream data at each adjacent node on the leaf side (hereinafter "child node" or simply "child") in a multicast tree network.

In the multicast network comprised of the above nodes, until the stream data sent from the server arrives at the client, each node uses the following means, method, sequence, and procedures to minimize the overall cost of attaching and exchanging ad data in the network, while complying with the basic condition of attaching ads which are preferred by the clients.

(First Apparatus and Network System)

The following examples of the first apparatus, the first network system apparatus, the first method and the second apparatus, the second network system apparatus, and the second method, describe a first example of a transcoding function, which is an optional function in multicast communication.

FIG. 38 is a block diagram showing the internal constitution of a node according to the first apparatus in this applied example.

As shown in FIG. 38, a node N1 according to this apparatus is applied in an unillustrated network, which has a multicast tree-shaped structure for delivering stream data from a single unillustrated server to one or more unillustrated clients; to attach ad data to the stream data during the process of repeating the required stream data, the node N1 basically comprises an ad data memory unit 1011, an ad-attachment-instruction table 1012, a receiver 1013, an ad attach/exchange unit 1014, a transmitter 1015, a preference information extraction unit 1016, a preference information table 1017, and a preference information aggregation unit 1018.

The ad data memory unit 1011 stores in advance ad data, which is to be delivered to clients, the ad data being arranged in a plurality of required categories; the ad-attachment-instruction table 1012 classifies (defines) the categories of the ad data, which is to be forwarded to one or more unillustrated adjacent nodes on the leaf side, for each of the adjacent nodes on the leaf side, based on a preference vector (one aspect of "preference information" in this invention; it will be explained further below) expressing a correlation between preferences of the clients and the cost of attaching ad data.

The receiver 1013 receives the stream data forwarded from an unillustrated adjacent node on the root side, and in addition, receives one or more preference vectors forwarded from one or more adjacent nodes on the leaf side. Incidentally, the receiver 1013 also receives ad data to be registered in the ad data memory unit 1011 in advance from the network.

Furthermore, the ad attach/exchange unit 1014 consults the ad-attachment-instruction table 1012, and selects a category of the ad data to be forwarded to the adjacent nodes on the leaf side in accordance with the mode of the data attachment of the stream data, received by the receiver 1013; in addition, the ad attach/exchange unit 1014 reads ad data, stored in the ad data memory unit 1011 in correspondence with the selected category, and attaches/exchanges it to/for the corresponding stream data.

The transmitter 1015 transmits the stream data, which the ad attach/exchange unit 1014 has attached/exchanged ad data to/for, to the adjacent nodes on the leaf side.

Incidentally, the contents of the ad-attachment-instruction table 1012 can be updated by the preference information extraction unit 1016, the preference information table 1017, and the preference information aggregation unit 1018.

That is, the contents of the ad-attachment-instruction table 1012 can be updated based on the preference information extraction unit 1016, which extracts (i.e., removing unnecessary packet headers and the like) one or more preference vectors received by the receiver 1013, the preference information table 1017, which stores one or more preference vectors extracted by the preference information extraction unit 1016, and the preference information aggregation unit 1018, which aggregatively performs a predetermined calculation to one or more of the preference vectors stored in the preference information table 1017, and thereby obtains a new preference vector.

Incidentally, in constructing a multicast data communication system by using the node N1 having the constitution described above, a multicast tree-shaped network for delivering stream data from a single server to one or more clients is provided, and the node N1 is allocated to a plurality of nodes in the network (the topology of this network is not illustrated in the diagrams, but can be understood from the explanation of the following method examples).

First Method Example

Subsequently, the first method executed by the node N1 and the network system apparatus having the above constitution will be explained.

The example of this method assumes the following cost model. The cost when the node N1 simply forwards a packet from an adjacent node on the root side (hereinafter termed "parent node" or simply "parent") to the adjacent nodes on the leaf side is "0", and the cost of ad data attachment and exchange is "1".

For example, when the node N1 on the network having c children simply forwards the packet to x children, and attaches/exchanges ad data to the packet transmitted to the remaining c-x children, the cost of the node N1 is c-x. Reducing the overall cost of the network according to this cost model can be achieved by reducing the number of attachments/exchanges of ad data.

Firstly, a method for minimizing the cost of the overall network according to this cost model will be explained. This method is realized in two phases termed "request phase" and "delivery phase".

In the request phase, the advertisement category preferred by the client (hereinafter termed "ad category" or simply "category") is transmitted on the network, and based on this, the nodes N1, which will actually perform the ad attachment and exchange, are selected from the plurality of nodes (N1, N1, ...).

In the delivery phase, the appropriate attachment/exchange of ad data is carried out by the node N1, as determined in the request phase. The operation of the request phase and delivery phase will be explained in detail.

In the request phase, the nodes and clients regularly transmit preference vectors, defined below, to the parent node in the multicast tree. When the number of ad categories is n, a preference vector is an n-dimensional vector (n-bit vector) with "1" and "0" as its elements; when the number i bit of the preference vector is "1", this indicates that the i-th ad category is preferred.

When the client desires the i-th ad category, it sends a preference vector with "1" in the i-th bit of the n-bit vector to the parent node. For example, a preference vector of (0, 1, 0) indicates that the second of the three ad categories is the preferred one.

There is a possibility that the client will desire multiple ad categories simultaneously; for example, a preference vector of (1, 1, 0) indicates that the first or second of the three ad categories are the preferred ones. A preference vector of (1, 1, 1) indicates that any category is acceptable.

The processing in request phase based on the preference vector mentioned above will be explained using the diagrams.

Figures 39A, 39B:
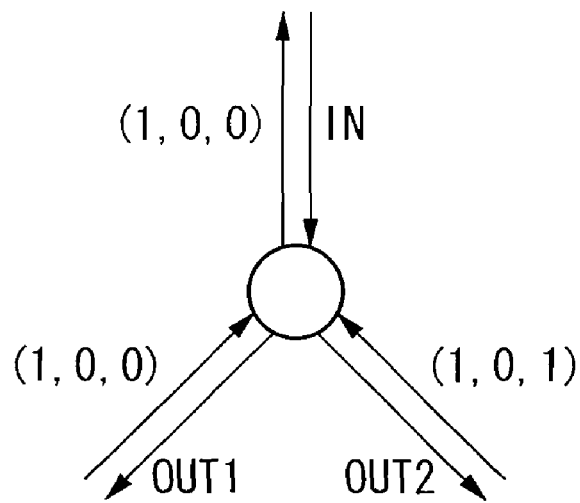
FIGS. 39A and 39B are diagrams showing the schematic constitution of a request phase according to a first example of a method in an applied example of this invention.

FIGS. 39A and 39B schematically show the request phase according to the example of the first method in this applied example.

As shown in FIG. 39A, the node N1 extracts a majority decision of the preference vectors transmitted from the children, sets the element (bit) of the preference vector corresponding to the most requested ad category to "1", and transmits the preference vector to the parent node. At this time, when there is a plurality of most requested ad categories, the node N1 sets all the elements of the preference vector corresponding to these ad categories to "1" (with the other elements as "0") and transmits this preference vector to the parent node.

For example, when there are two children, and the preference vectors sent from the children are (1, 0, 0) and (1, 0, 1) as shown in FIG. 39A, the sum of these values is (2, 0, 1); therefore, a preference vector (1, 0, 0) with the first of these elements set to "1" is transmitted to the parent node. That is, the sum of the preference vectors from all the children is determined, only the bit with the maximum value is set to "1" and the others to "0", and this is sent to the parent node.

As shown in FIG. 39B, in compliance with the preference vector sent from the children, the node N1 creates and stores a table showing the categories of the ad data to be attached/exchanged in the delivery phase (i.e. the ad-attachment-instruction table 1012 mentioned earlier).

In the ad-attachment-instruction table 1012, the "In" column indicates a category of ad data which is attached to the stream data from the parent node; the "Out1", "Out2", ..., columns indicate categories of ad data to be attached to the stream data sent to the first, second, ..., children. Furthermore, "φ" represents the state when no ad data is attached, and "A", "B", and "C" represent the first, second, and third ad categories respectively. For example, stream data with no ad data attached may be sent from the parent node when the server or node which is the parent node is not equipped with the function for attaching ad data to the stream data.

Here, the ad-attachment-instruction table 1012 instructs the ad attach/exchange unit 1014 to attach/exchange a category A ad to the child who transmitted the preference vector (1, 0, 0), and to attach/exchange category A or C ad to the child who transmitted the preference vector (1, 0, 1). In the case of the latter, the ad-attachment-instruction table 1012 is created so that the process is completed, as far as is possible, by forwarding only, in accordance with the category of the ad data attached to the stream data from the parent node.

For example, when category C ad data has been attached to the stream data from the parent node, the category C is selected for the child who transmitted the preference vector (1, 0, 1), enabling the process to be completed merely by forwarding the stream data (when category A has been selected, an exchange of category C to category A is required, consequently increasing the cost; the above process avoids this).

The ad data sent from the parent node should belong to the category which was requested, but there is a possibility that ad data of a different category to that requested from the parent node may arrive due to timing problems when, for example, the client has dynamically changed the preference vector. For this reason, entries for all ad categories that may be sent from the parent node are created in the ad-attachment-instruction table 1012.

Subsequently, delivery phase processing based on the preference vector mentioned above will be explained.

Figure 40:
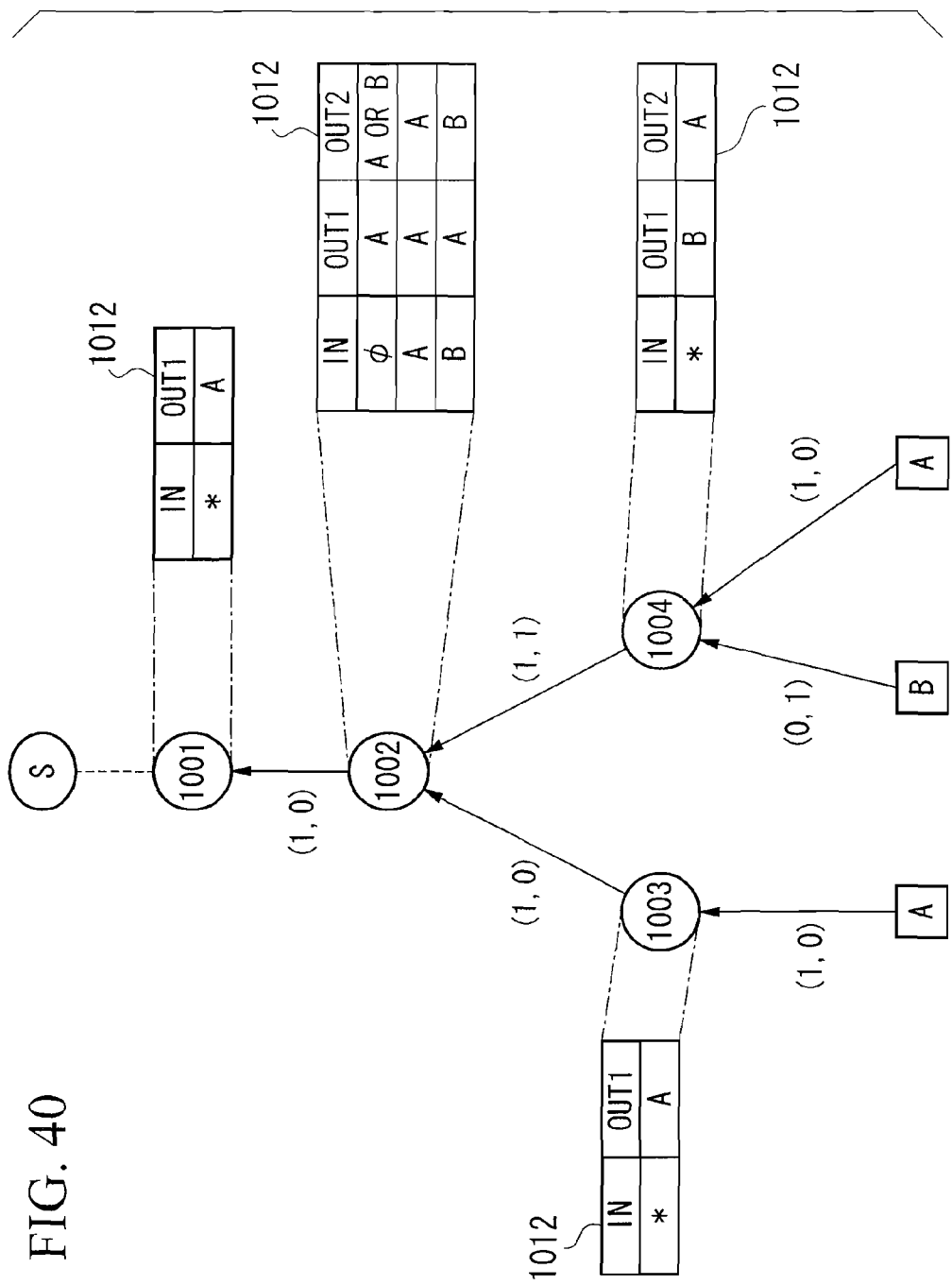
FIG. 40 is a diagram showing an example of a specific operation of a request phase according to a first example of a method in an applied example of this invention.

FIG. 40 shows a specific example of an operation in the request phase according to the first method of the applied example.

In FIG. 40, letters "A" and "B" represent clients, "S" represents the server, and the other represent the node N1 (hereinafter represented by the reference numerals "1001", "1002", "1003", and "1004"). There are two ad categories "A" and "B", and the letters representing the clients ("A" and "B") indicate the ad categories which are preferred by those clients ("A" and "B" respectively representing the first and second ad categories).

Furthermore, of the symbols in each ad-attachment-instruction table 1012, "*" indicates matching to any ad categories (even when no ad data is attached); ("In", "Out1", "Out2", and "φ" have the same meanings as in FIG. 39B, and it is assumed that the children are numbered in sequence from the left as "1, 2, 3, . . . ").

As shown in FIG. 40, the client who prefers ad category A sends a preference vector (1, 0) to the parent node, and the client who prefers ad category B sends a preference vector (0, 1) to the parent node.

At this time, the node 1003 receives the preference vector (1, 0) from its child, and, in the request phase, irrespective of the category of the ad data attached to the stream data sent from the parent node (node 1002), the node 1003 creates an ad-attachment-instruction table 1012 such that ad data belonging to the ad category A is attached or exchanged, and transmits the preference vector (1, 0), received from the child, unaltered to the parent node.

On the other hand, since the preference vectors (0, 1) and (1, 0) sent from the two children arrive at the node 1004, irrespective of the category of the ad data attached to the stream data from the node 1002, an ad-attachment-instruction table 1012 is created so that ad data belonging to ad category B is attached/exchanged to the child on the left of FIG. 40, and ad data belonging to ad category A is attached/exchanged to the child on the right of FIG. 40, and a new preference vector (1, 1) is created in compliance with the stipulations above, and is sent to the node 1002.

As a result, preference vectors (1, 0) and (1, 1) from the two children are sent to the node 1002, which, irrespective of the category of the ad data attached to the stream data from the parent node (node 1001), creates an ad-attachment-instruction table 1012 such that ad data belonging to ad category A is attached/exchanged to the child on the left (node 1003), and ad data belonging to either one of ad categories A and B (whichever has the lower cost) is attached/exchanged to the child on the right (node 1004).

That is, in the example shown in FIG. 40, whether ad data of ad category A or ad category B is attached to the stream data from the node 1001, the stream data is forwarded unchanged to the node 1004. However, when no ad data is attached to the stream data, the node 1002 selects one of the ad categories A and B, attaches ad data of the selected category to the stream data, and transmits it to the node 1004 (the operation of the node 1001 is the same as that of the node 1003 already described above).

In the delivery phase, ad data is attached and exchanged based on ad-attachment-instruction tables created and configured in this way.

Incidentally, since the nodes 1001, 1002, 1003, and 1004 do not necessarily receive preference vectors from their children simultaneously, the preference vectors sent from the children are stored in the preference information table 1017, and, once the preference vectors from all the children have been stored, a majority is determined for obtaining a new preference vector. In order to deal with changes to the preference vectors, clients who join and leave the multicast tree, and such like, the operation of determining a required majority decision should be performed when a preference vector from a child has been changed, or at predetermined time intervals.

Figure 41:
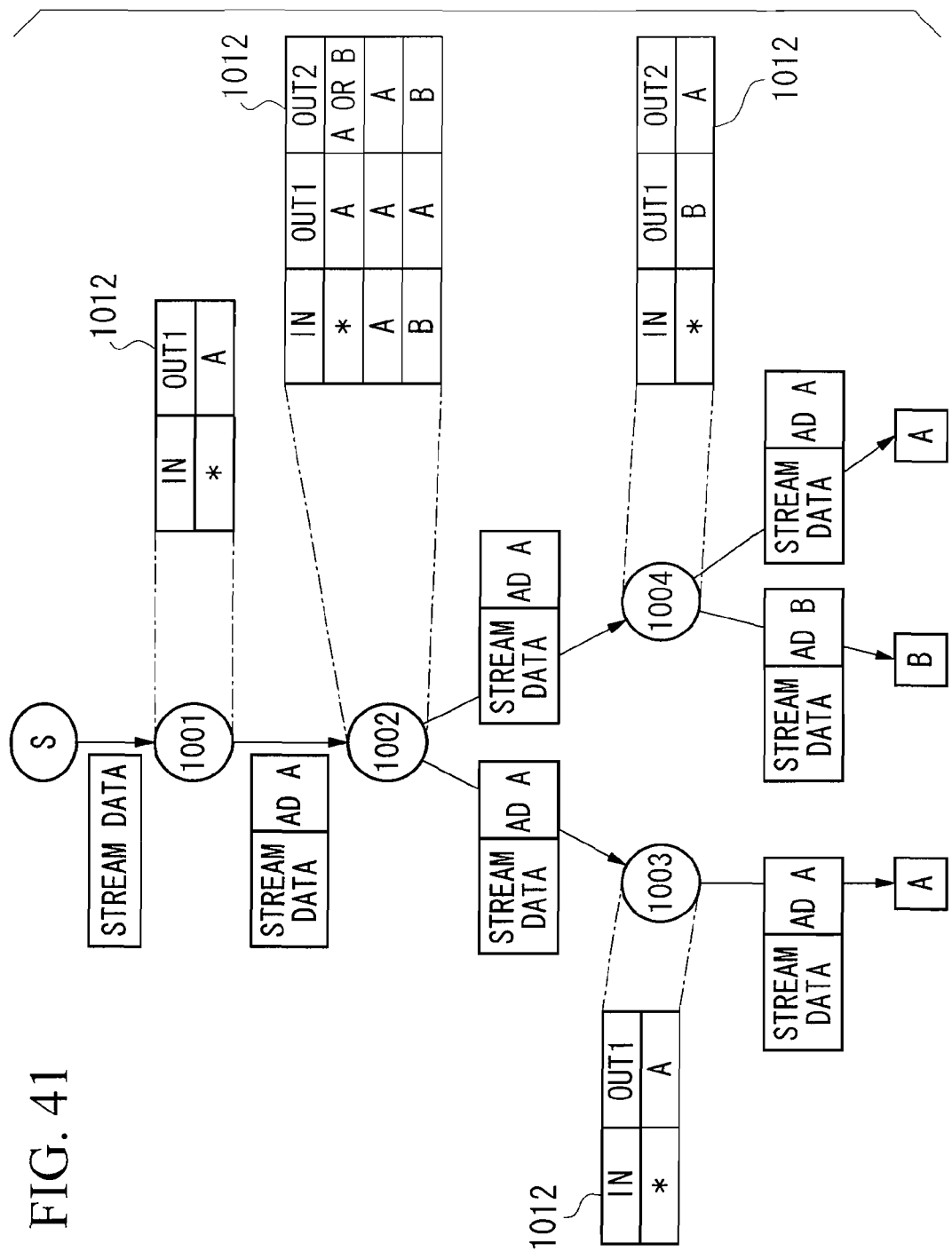
FIG. 41 is a diagram showing an example of a specific operation of a delivery phase according to a first example of a method in an applied example of this invention.

FIG. 41 shows a specific example of an operation in the delivery phase according to the first method in the applied example (corresponding to the request phase shown in FIG. 40).

As shown in FIG. 41, nodes 1001, 1002, 1003, and 1004 determine attachment/exchange processing of actual ad data, based on ad data attached to stream data sent from a parent node. Consequently, even when, due to deviation in the timing of table updates in the request phase, the parent node has transmitted a stream data which has ad data belonging to categories contradicting the preference vector sent to the parent node, a function termed "attach ad in accordance with preference of the client" ensures that there is no break-up.

Therefore, the request phase and delivery phase can operate independently, and, provided that the time interval at which the ad-attachment-instruction tables 1012 are updated in the request phase is sufficiently long, data can be delivered at minimum cost based on the above cost model.

Figure 42:
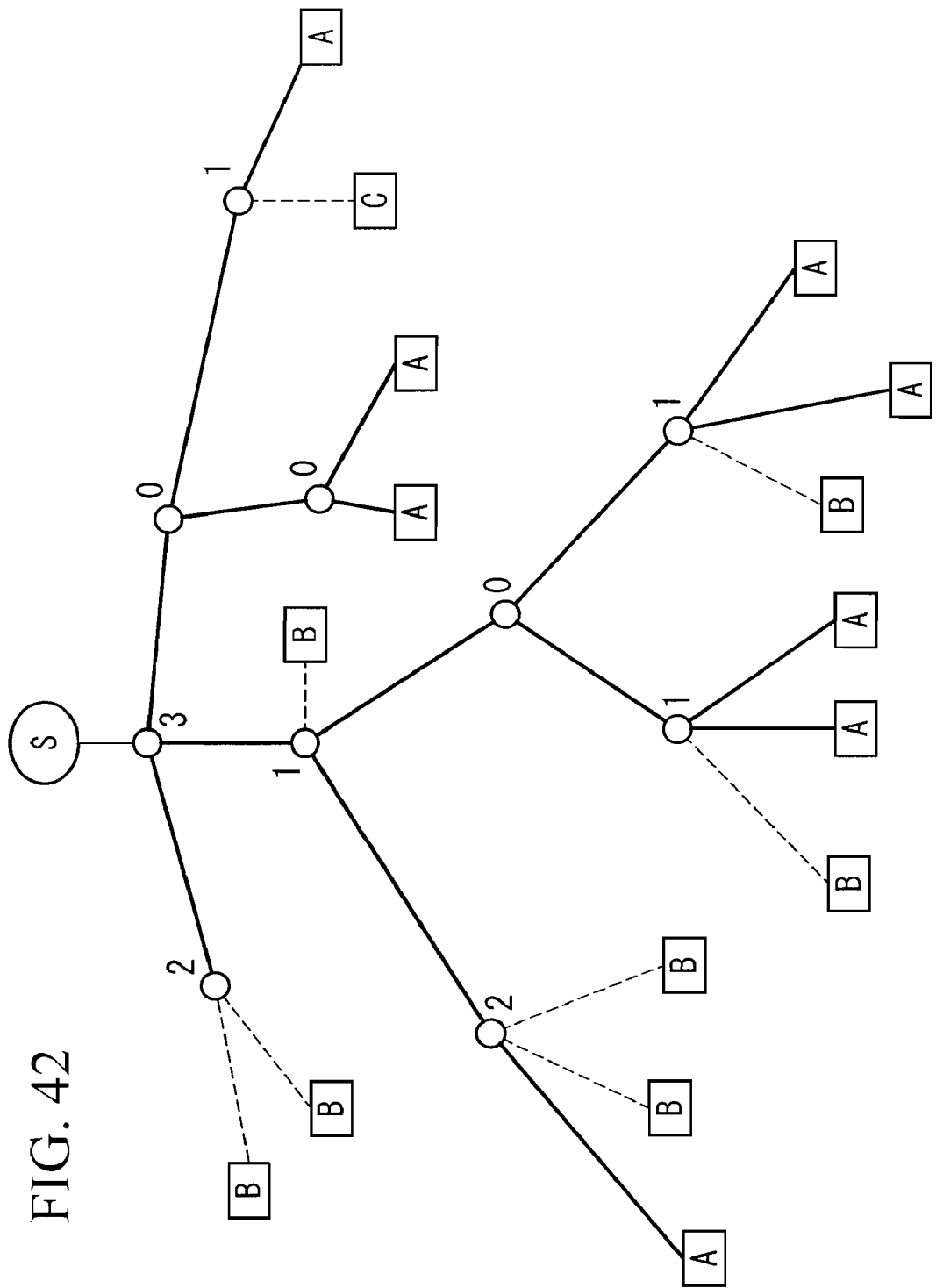
FIG. 42 is a diagram showing an example of costs when attaching/exchanging required ad data by a conventional method.

FIG. 42 shows one example of costs when a required attach/exchange process has been executed to the ad data by a normal method. The numerals in FIG. 42 represent the cost of each node.

As shown in FIG. 42, it is assumed that each of the clients which comprise the leaves of the multicast tree prefers one of ad categories "A", "B", and "C". The thick solid lines, dotted lines, and broken line in FIG. 42 respectively represent communication links which stream data, with ad data of categories A, B, and C attached, travel along; the numerals near the nodes represent the cost of the nodes.

Based on the fact that most clients prefer category A ad data, the node immediately below the server attaches category A ad data to the stream data, and nodes adjacent to the clients exchange ad data so as to match the preferences of those clients.

When ad data has been exchanged in the manner described above, it can be seen that the cost of the overall multicast network is "11", this being the sum of the costs at the nodes.

Figure 43:
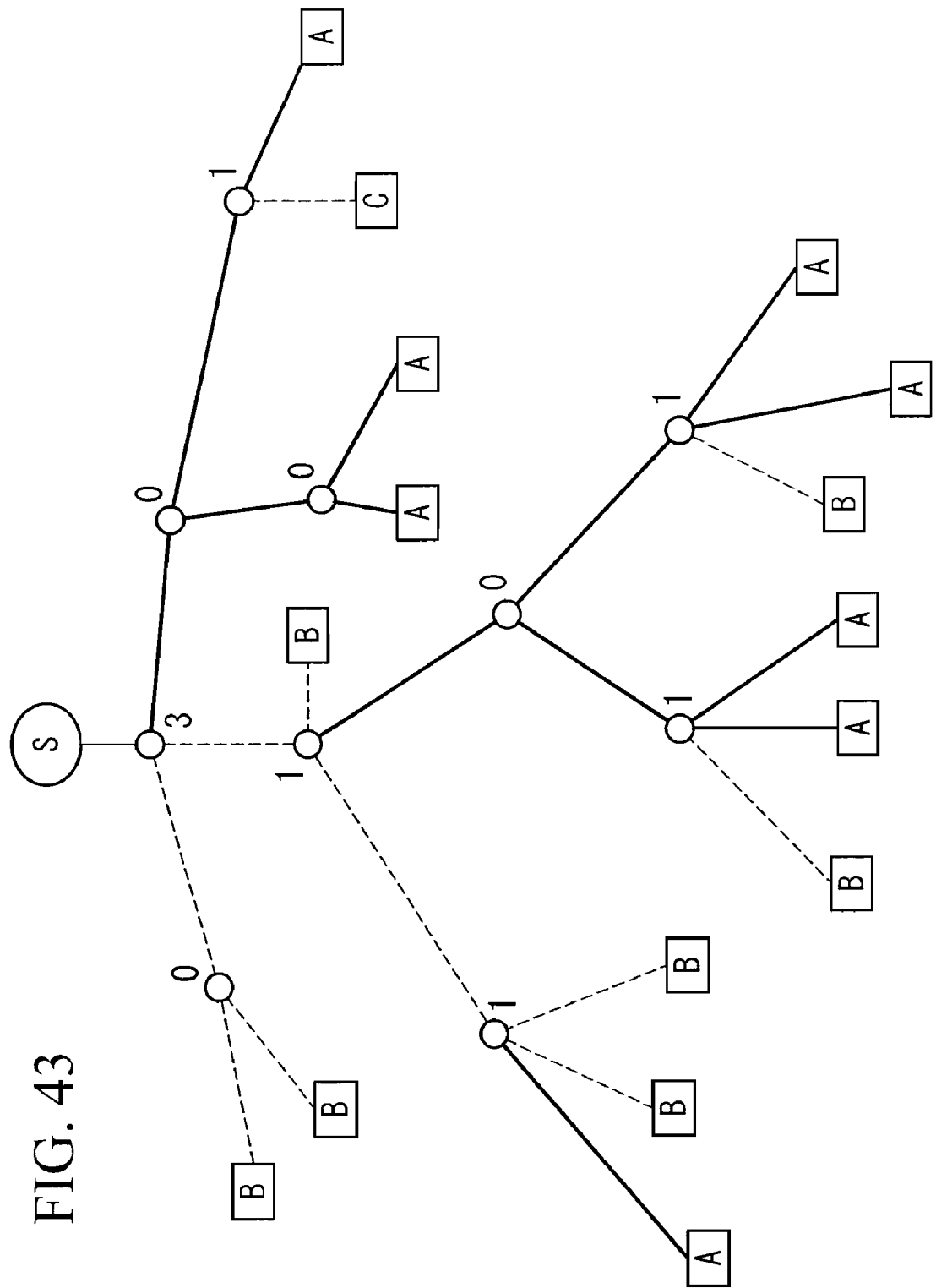
FIG. 43 is a diagram showing an example of costs when attaching/exchanging required ad data by the first example of the method according to the applied example of this invention.

FIG. 43 shows a second cost example in the case where ad data has been attached/exchanged according to the first method in this applied example. The numerals in FIG. 43 represent the costs of nodes.

As shown in FIG. 43, when ad data has been exchanged according to this method, the cost of the overall multicast network is "8", thereby enabling attachment/exchange of required ad data to be carried out at a lower cost than when using the normal method.

(Examples of Second Apparatus and Network System Apparatus)

Figure 44:
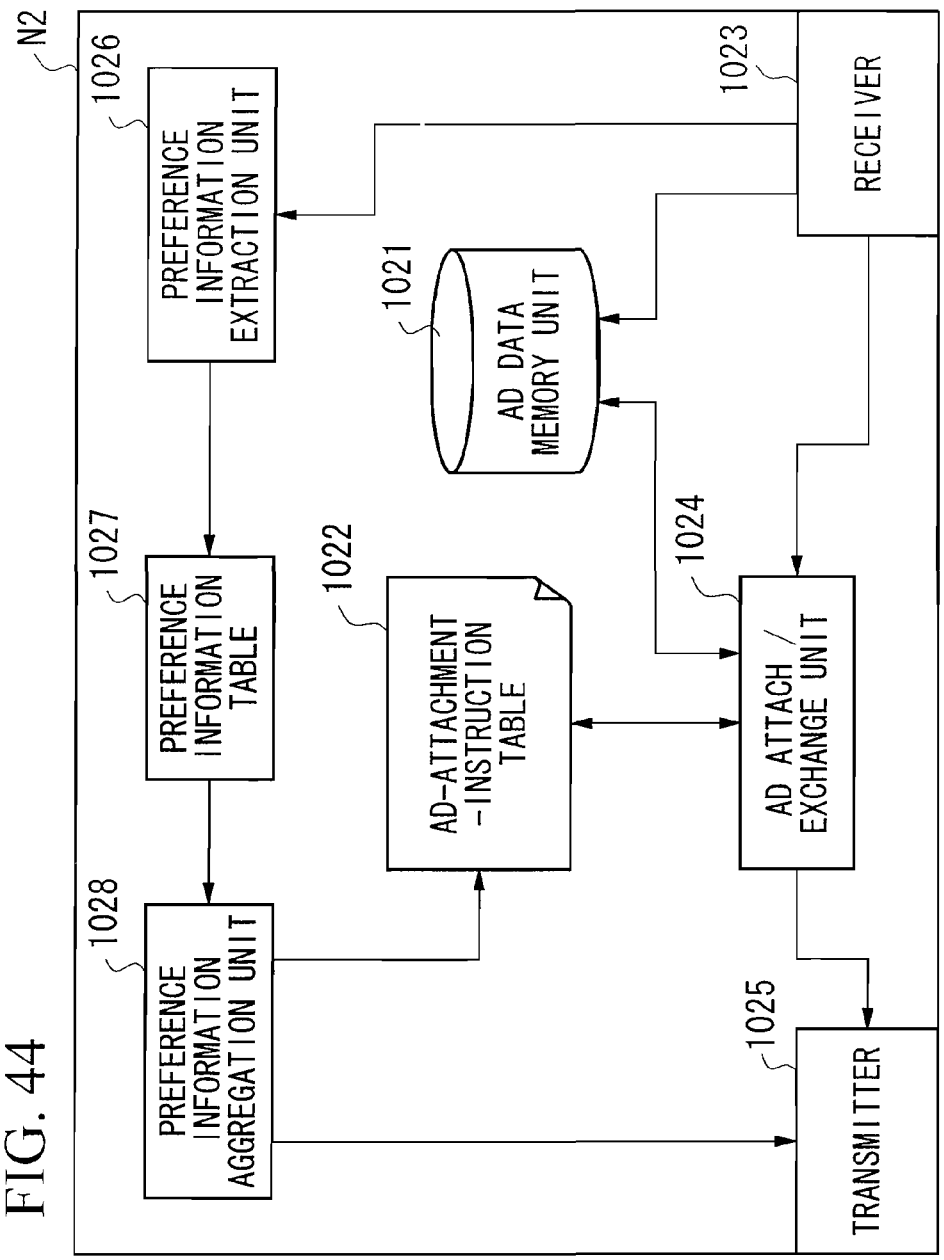
FIG. 44 is a block diagram showing the internal constitution of a node according to a second apparatus example in an applied example of this invention.

The examples of the second apparatus and network system apparatus differ from the first apparatus and network system in respect of the definition of preference vectors, the specific method for calculating the cost required for attaching/exchanging ad data, and the format of the preference vector transmitted by clients. FIG. 44 is a block diagram showing the internal constitution of a node according to the second apparatus in this applied example.

As shown in FIG. 44, similarly in the first apparatus, the node N2 according to this apparatus is applied in an unillustrated network, which has a multicast tree-shaped structure for delivering stream data from a single unillustrated server to one or more unillustrated clients; to attach ad data to the stream data during a process of repeating the required stream data, the node N2 basically comprises an ad data memory unit 1021, an ad-attachment-instruction table 1022, a receiver 1023, an ad attach/exchange unit 1024, a transmitter 1025, a preference information extraction unit 1026, a preference information table 1027, and a preference information aggregation unit 1028.

An ad data memory unit 1021, an ad-attachment-instruction table 1022, a receiver 1023, an ad attach/exchange unit 1024, and a transmitter 1025 are the same as those in the example of the first apparatus, and will not be explained further.

Incidentally, the contents of the ad-attachment-instruction table 1022 can be updated by the preference information extraction unit 1026, the preference information table 1027, and the preference information aggregation unit 1028.

That is, the contents of the ad-attachment-instruction table 1022 are updated based on a preference information extraction unit 1026 which extracts one or more preference vectors (one aspect of "preference information" in this invention; it will be explained later) received by the receiver 1023, and a preference information table 1027 which stores one or more preference vectors, extracted by the preference information extraction unit 1026. A preference information aggregation unit 1028 aggregatively performs a predetermined calculation to one or more of the preference vectors stored in the preference information table 1027, and thereby obtains a new preference vector.

Incidentally, in constructing a multicast data communication system by using the node N2 having the constitution described above, a multicast tree-shaped network for delivering stream data from a single server to one or more clients is provided, and the node N2 is allocated to a plurality of nodes (the topology of this network is not illustrated in the diagrams, but can be understood from the explanation of the following method examples).

Second Method Example

Subsequently, a second example method, executed by the node N2 and the network system apparatus having the above constitution, will be explained based on another general cost model.

Figure 45:
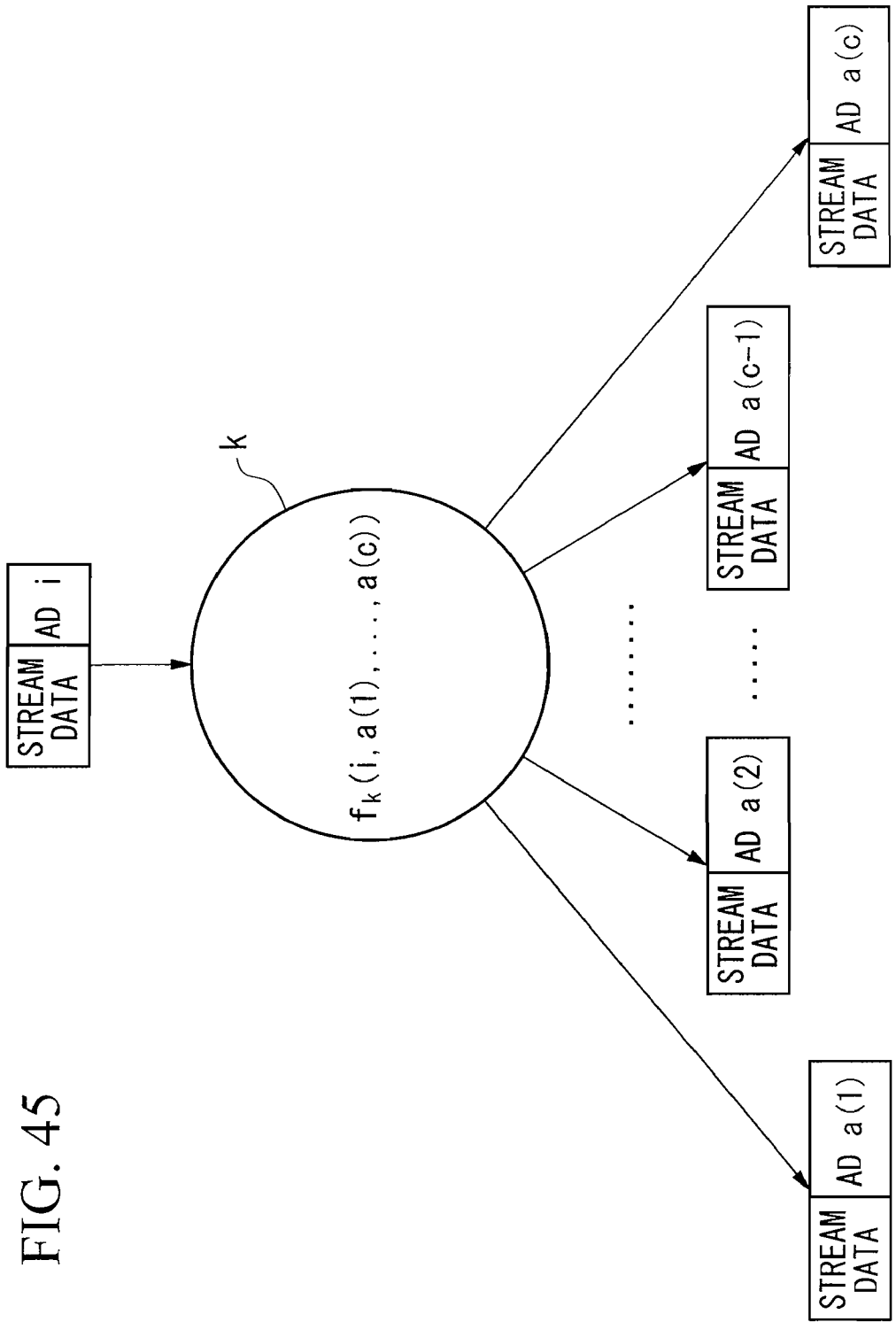
FIG. 45 is a diagram schematically showing a cost model in the second example of the method in the applied example of this invention.

FIG. 45 schematically shows a cost model according to the second method example in this applied example.

As shown in FIG. 45, this example assumes that a node N2 (hereinafter represented by the reference symbol "k") has c children, and that, when ad data of the i-th category has been attached to the stream data transmitted from the parent node, this ad data is replaced with ad data belonging to the a(j)-th category for the j-th child.

As shown in FIG. 45 the cost of attaching/exchanging the ad data at the node k at this time is $f_k(i, a(1), a(2), \ldots, a(c))$. The state where no ad data is attached to the stream data sent from the parent node is treated as one category of ad data; the following explanation will consider only the exchange of ad data. The cost of exchanging ad data belonging to the same ad category is assumed to be the same. When this is not the case, the category is further partitioned so as to satisfy the above conditions.

For example, in a case where the ad data categories "A", "B", and "C" are further partitioned into "$A_1$" and "$A_2$", "$B_1$" and "$B_2$", and "$C_1$" and "$C_2$", when the categories with significance for the clients are "A", "B", and "C", the categories are partitioned into "A", "B", and "C" on the user interface, so that when a client prefers, for example, ad category A, this is interpreted as signifying that the client prefers ad category $A_1$ or $A_2$, and processing is carried out accordingly.

An ad data exchanging method for minimizing the cost of the overall network according to this cost model will be explained. As in the example of the first method already described, this method is realized in two phases termed "request phase" and "delivery phase".

In the request phase, information showing that the cost is "0" when the ad data which a client prefers is attached to the stream data, and that the cost is infinite "∞" when other ad data is attached, is sent to the parent node. When this information is expressed as an n-dimensional vector (preference vector) for n ad categories, a preference vector from a child who prefers the ad data of the fourth category would be (∞, ∞, ∞, 0, ∞, ∞, ..., ∞).

Thus the preference vector of this apparatus example and the preference vector of the first apparatus example described above are defined differently due to differences in the cost models being assumed. The elements of the preference vector in the example of the first apparatus are set to "1" or "0" in accordance with whether the client prefers the individual ad categories. In contrast, in the example of the second apparatus, the elements of the preference vector are set to "0" or "infinity" in accordance with whether data preferred by the client is attached to the stream data sent from the server side.

Based on the preference vector sent from the children and the function $f_k(i, a(1), a(2), \ldots, a(c))$ expressing the cost of exchanging the ad data, when ad data belonging to the i-th category is attached to the stream data received from the parent node, each of the nodes k, k, ... determines the minimum cost of a sub tree having the node k as its root for each i, and sends a preference vector representing this to the parent node.

That is, when ad data belonging to the i-th category is attached to the stream data received from the parent node P(k) by the node k, the sub tree having the node k as its root is expressed as T(k), and the minimum cost that can be obtained by T(k) at that time is $v^k_i$, the node k transmits an n-dimensional preference vector $V_k=(v^k_1, v^k_2, \ldots, v^k_n)$ to the parent node P(k).

The above preference vector is calculated from the preference vector sent from the child node and the function $f_k(i, a(1), a(2), \ldots, a(c))$ (the calculation method will be explained in detail later); for example, when $V_k$ is (10, 23, 41), there are three ad categories, and the achievable minimum costs of T(k) when ad data belonging to the first, second, and third categories was attached to the stream data from the parent node P(k) are "10", "23", and "41" respectively. Preference vectors are calculated and transmitted sequentially in this way from the leaves to the root.

At each node k, to achieve $v^k_i$ for each i (i=1, 2, ..., n), the category of the ad data to be exchanged for each stream data sent to each child can be determined in the $v^k_i$ calculation process; therefore, these categories are stored as an ad-attachment-instruction table 1022, which is used in exchanging ad data during the delivery phase in the same way as in the first method example.

Subsequently, the method for calculating the preference vector will be explained. Let us assume that a node k with c children exchanges ad data attached to a stream data for ad data of the (j)-th category for the j-th child (j=1, 2, ..., n).

When the stream data with the i-th ad data attached arrives from the parent node P(k), the cost relating to exchanging the ad data at the node k is expressed by the function $f_k(i, a(1), a(2), \ldots, a(c))$.

When the n-dimensional preference vector sent to the node k from the j-th child is $U_j=(u^j_1, u^j_2, \ldots u^j_n)$, and the j-th child is node $C_k(j)$, the minimum cost of the sub tree $T(C_k(j))$ when the stream data, which the a(j)—the ad data is attached to, is transmitted from the node k, is $u^j_{a(j)}$.

Therefore, the minimum cost of the sub tree T(k) in this case becomes $f_k(i, a(1), a(2), \ldots, a(c))+u^1_{a(1)}+ \ldots +u^c_{a(c)}$. Accordingly, the element $v^k_i$ of the preference vector $V_k=(v^k_1, v^k_2, \ldots, v^k_n)$ should be set to the minimum value of $f_k(i, a(1), a(2), \ldots, a(c))+u^1_{a(1)}+ \ldots +u^c_{a(c)}$ in all combinations of a(1), a(2), ..., a(c).

This calculation is performed for each i to obtain $V_k=(v^k_1, v^k_2, \ldots, v^k_n)$, and each combination of a(1), a(2), ..., a(c) which achieves $v^k_i$ is stored in the ad-attachment-instruction table 1022 at each node k.

Figure 46:
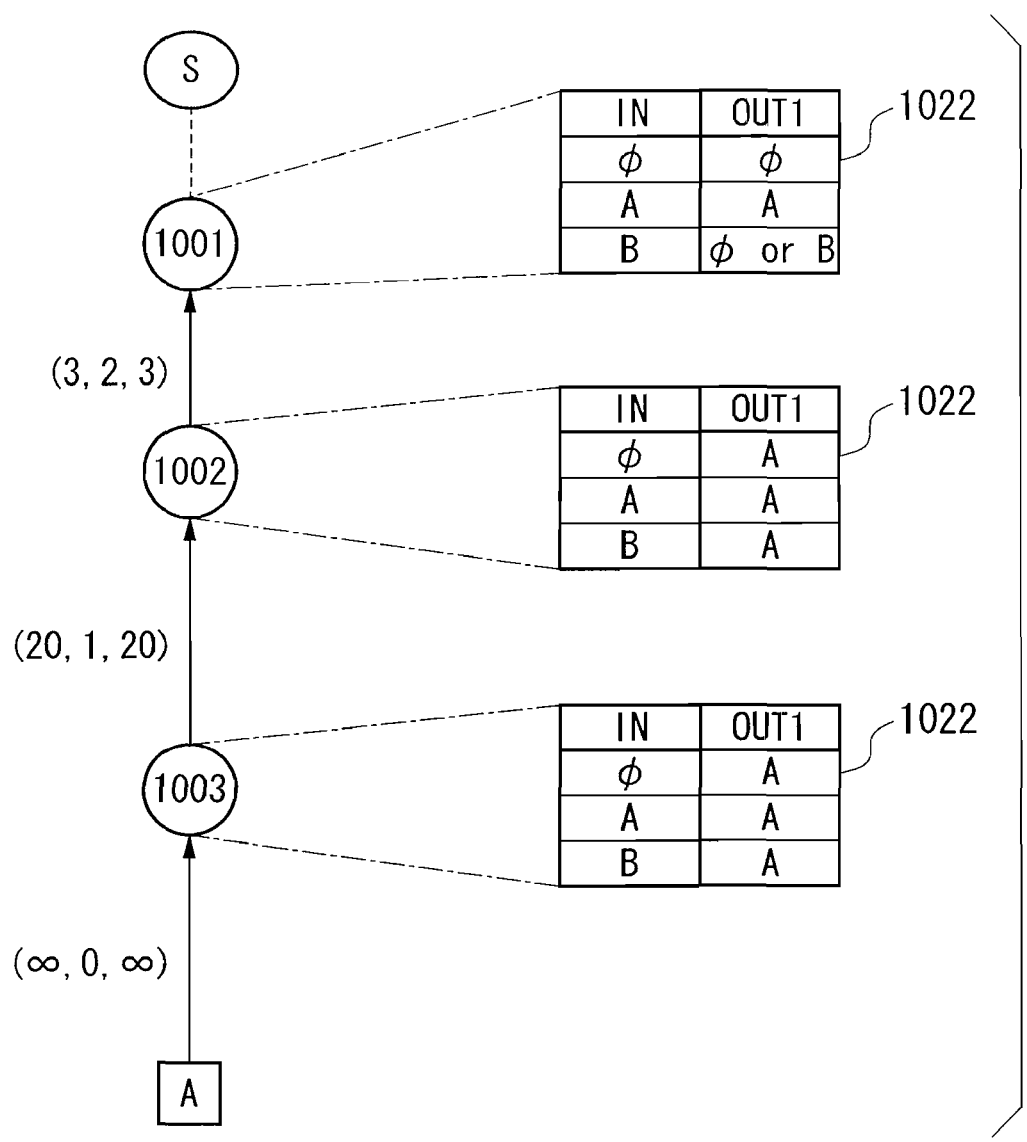
FIG. 46 is a diagram showing an example of a specific operation of a request phase according to the second example of the method in the applied example of this invention.

FIG. 46 shows one example of a specific operation in the request phase according to the second method in this applied example, and FIGS. 47A to 47C show specific examples of cost functions.

As shown in FIG. 46, in this example there are three nodes between the server and the client, and the cost function for the nodes k (1001, 1002, and 1003) can be analyzed as $f_k(i, a(1), a(2), \ldots, a(c))=g_k(i, a(1))+g_k(i, a(2))+ \ldots +g_k(i, a(c))$.

That is, at any one of the nodes k, the cost of exchanging ad data to each child is completely independent, while the cost functions remain equivalent to each other.

The left columns in FIGS. 47A to 47C show a cost function $g_k$ in each node by way of example. In FIGS. 47A to 47C, each row of the cost function $g_k$ represents an ad category prior to exchange, each column represents an ad category after exchange, "φ", "A", and "B" respectively represent first, second, and third categories. The state of no ad data being attached is itself treated as an ad category.

For example, at the node 1001 in FIG. 46, the cost $g_{1001}(\phi, A)$ needed in shifting from a state where no ad data is attached to an attachment of ad data A is "10" (the preference vector and ad-attachment-instruction table 1022 is created and transmitted during the request phase based on the cost functions shown in the left column of FIGS. 47A to 47C).

Figure 48A:
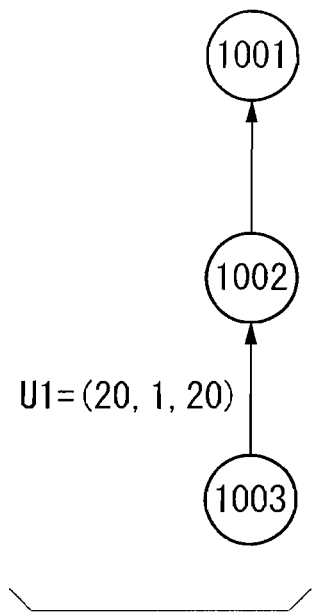
FIGS. 48A and 48B are diagrams showing part of an example of a specific operation of a request phase according to the second example of the method in the applied example of this invention.
Figure 48B:
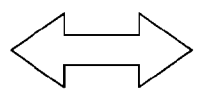

FIGS. 48A and 48B partially show examples of specific operations in the request phase according to the second method in this applied example, FIGS. 49A and 49C shows examples of cost function calculations, and FIG. 50 partially shows another example of a specific operation in the request phase.

As shown in FIG. 48A, when the node 1002 has received a preference vector $U_1=(20, 1, 20)$ from its child, node 1003, the preference vector to be transmitted to the node 1001 and the ad-attachment-instruction table 1022 to be created at the node 1002 are calculated by the method shown in FIGS. 49A to 49C.

When the $g_i$ table is viewed as a matrix, the matrix of children is expressed as $G_i$ (see the right column in FIGS. 47A to 47C). Since $g_{1002}$ only expresses the processing cost at the node 1002, the matrix with the cost values of the sub tree T(2) as its elements can be obtained by calculating:

$$G_{1002} + \begin{pmatrix} U_1 \\ U_1 \\ U_1 \end{pmatrix} \quad \text{(equation 1)}$$

(see FIG. 49A).

The minimum value in the i-th row of this equation expresses the minimum cost attained by of the sub tree T(2) when ad data of the i-th category was attached to the stream data from the parent node. In any case, it should be clear that category A ad data has been exchanged and transmitted to the child in order to minimize the cost (see FIG. 49B).

As shown in FIG. 49C, when the preference vector to be sent to the node 1003 and the ad-attachment-instruction table 1022 to be created at the node 1002 have been obtained by the method described above, the request phase processing at the node 1002 ends; then, as shown in FIG. 50, the same processing is performed sequentially at the nodes 1003, 1002, and 1001 until ad-attachment-instruction tables 1022 have been created at all the nodes. In the delivery phase explained below, the attachment and exchange of ad data is performed in compliance with these ad-attachment-instruction tables 1022.

Figure 51:
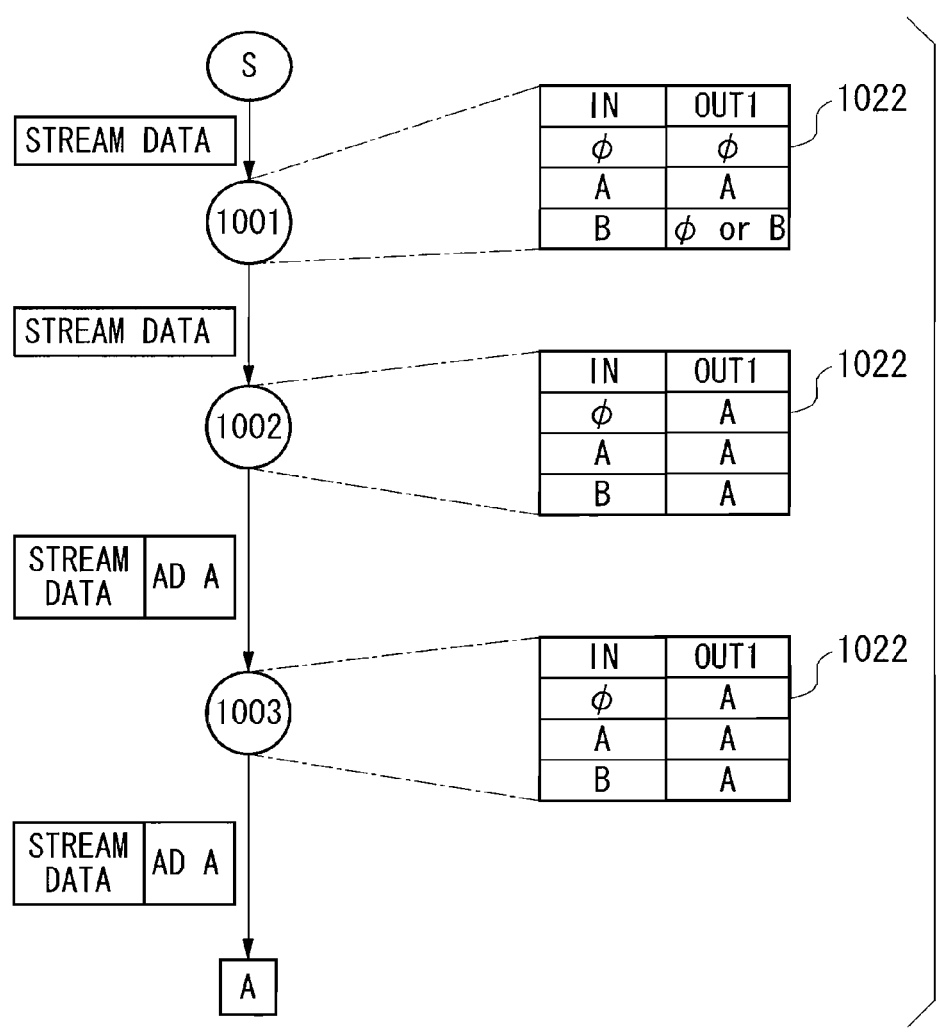
FIG. 51 is a diagram showing an example of a specific operation of a delivery phase according to the second example of the method in the applied example of this invention.

FIG. 51 shows an example of a specific operation in the delivery phase according to the second method in this applied example.

As shown in FIG. 51, stream data sent from the server is processed in compliance with ad-attachment-instruction tables 1022 for the nodes 1001, 1002, and 1003. At the node 1001, the stream data is forwarded without attaching any ad data, at the node 1002, the stream data is forwarded with category A ad data attached, and at the node 1003, since the category A ad data is already attached to the stream data, it is simply forwarded.

This method minimizes the cost of the overall network. In the example of FIG. 46, ad data is attached only at the node 1002, since $G_{1002}$ has a smaller element value than $G_{1001}$ and $G_{1003}$ as shown in FIGS. 47A to 47C. For example, load can be dispersed by reflecting the load status of the node in the cost value.

Figure 52:
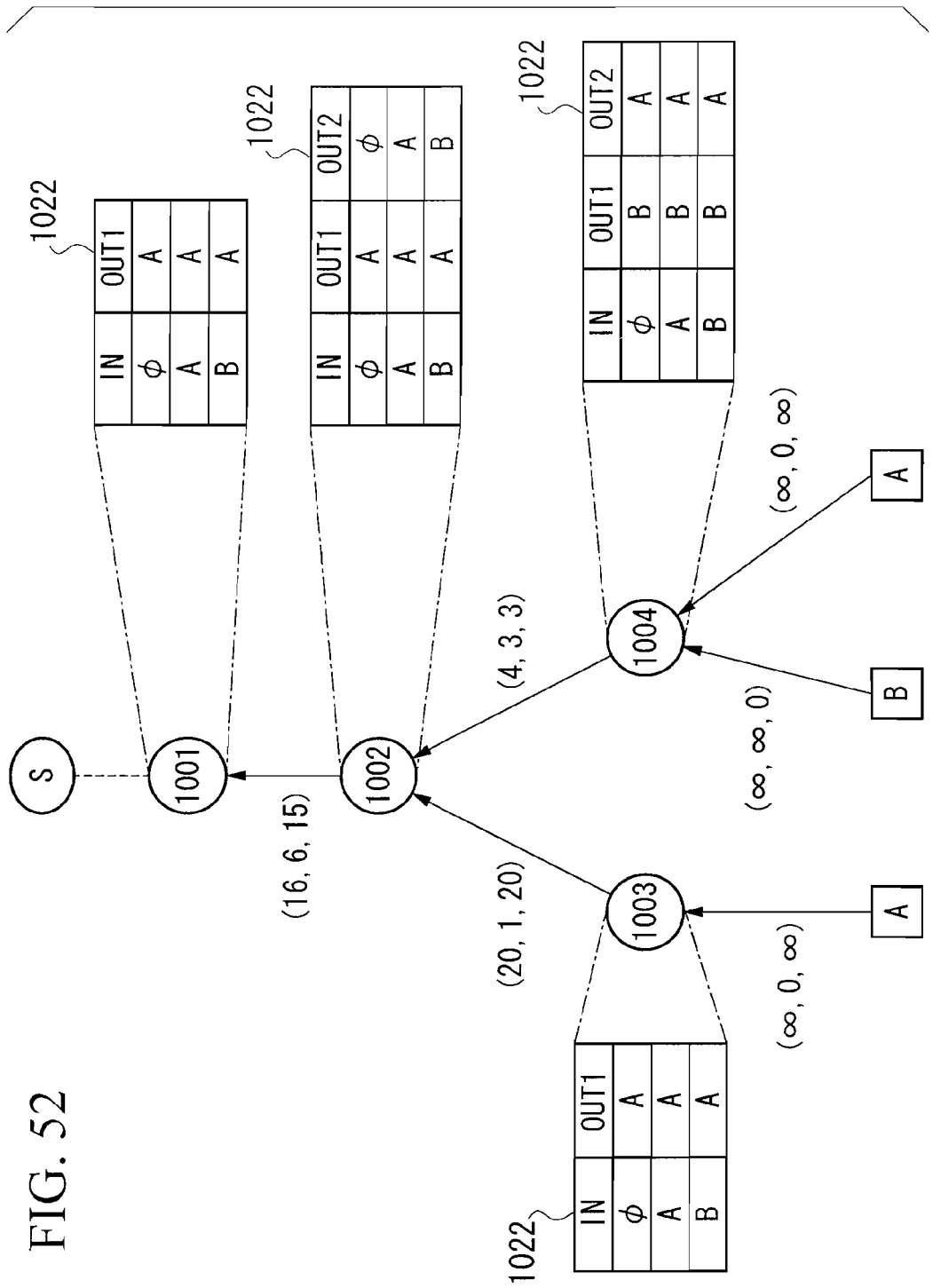
FIG. 52 is a diagram showing an example of a specific operation of another delivery phase according to the second example of the method in the applied example of this invention.
Figures 53A, 53B, 53C, 53D:
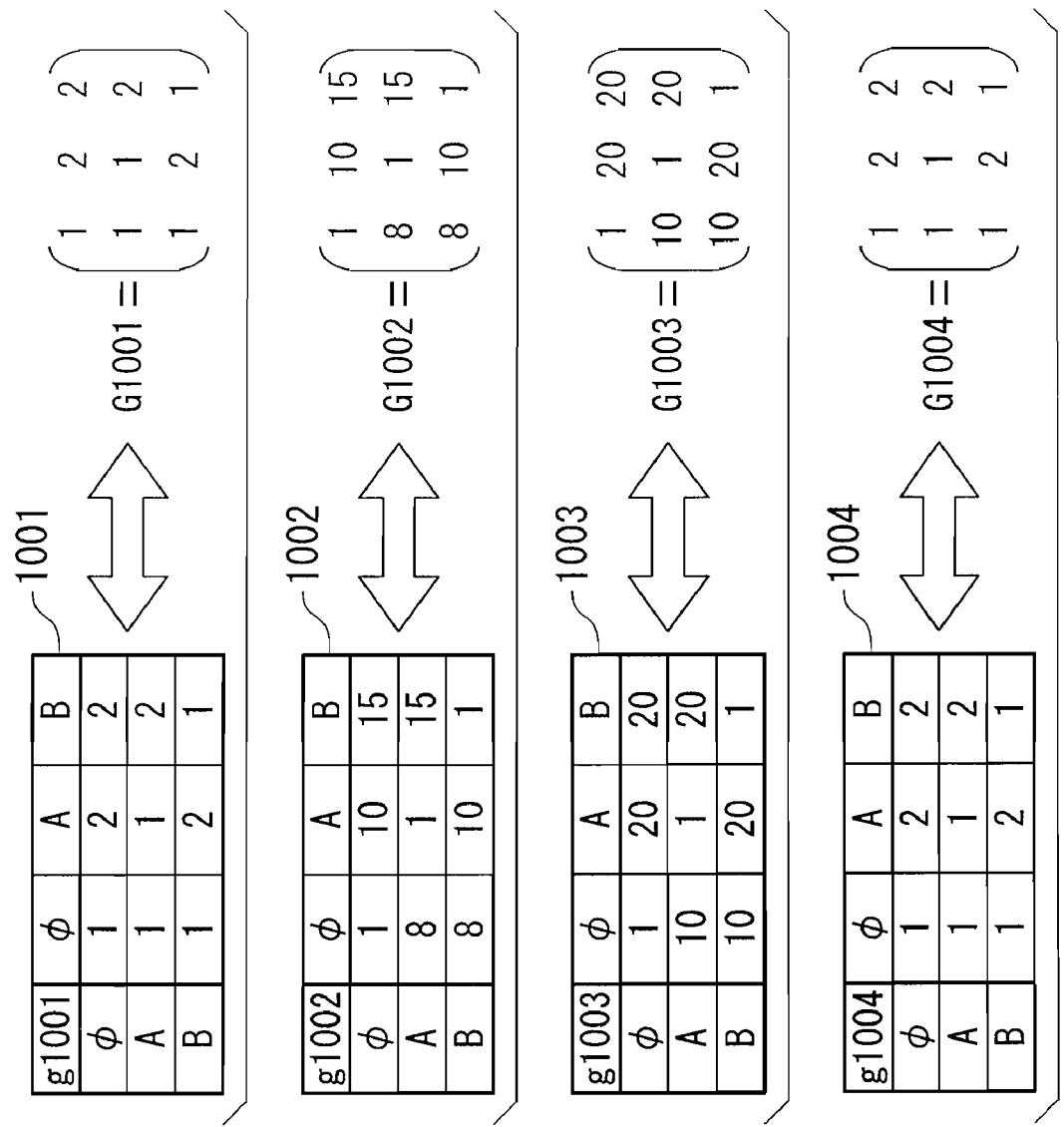
FIGS. 53A to 53D are diagrams showing other example calculations of cost functions according to the second example of the method in the applied example of this invention.

FIG. 52 shows a specific example of another operation in the request phase according to the second method in this applied example, and FIGS. 53A to 53D shows examples of calculations of other cost functions.

As shown in FIG. 52, when delivering stream data to a plurality of clients by multicast, since some nodes, such as the nodes 1002 and 1004, have a plurality of children, assuming that the cost function for such nodes can be analyzed as $f_k(i, a(1), a(2), \ldots, a(c))=g_k(i, a(1))+g_k(i, a(2))+ \ldots +g_k(i, a(c))$, as in the example shown in FIG. 46, then the function for the preference vector $U_j=(u^j_1, u^j_2, \ldots, u^j_n)$ from the j-th child (j=1, 2, ..., c) becomes $f_k(i, a(1), a(2), \ldots, a(c))+u^1_{a(1)}+u^2_{a(2)}+ \ldots +u^c_{a(c)}=(g_k(i, a(1))+u^1 a_{(1)})+(g_k(i, a(2))+u^2_{a(2)})+ \ldots +(g_k(i, a(c))+u^c_{a(c)})$.

Therefore, by determining the minimum value of $g_k(i, a(j))+u^j_{a(j)}$ for each j and calculating the sum of these values, it is possible to determine the minimum value of $f_k(i, a(1), a(2), \ldots, a(c))+u^1_{a(1)}+u^2_{a(2)}+ \ldots +u^c_{a(c)}$ (the preference vector and ad-attachment-instruction tables 1022 shown in FIG. 52 were transmitted and created in the request phase when $g_k$ had the aspect shown in the left columns of FIGS. 53A to 53D). Since the nodes 1001 and 1003 each have one child, their preference vectors and ad-attachment-instruction tables 1022 are calculated by the same method as shown in FIG. 46.

Figures 54A, 54B:
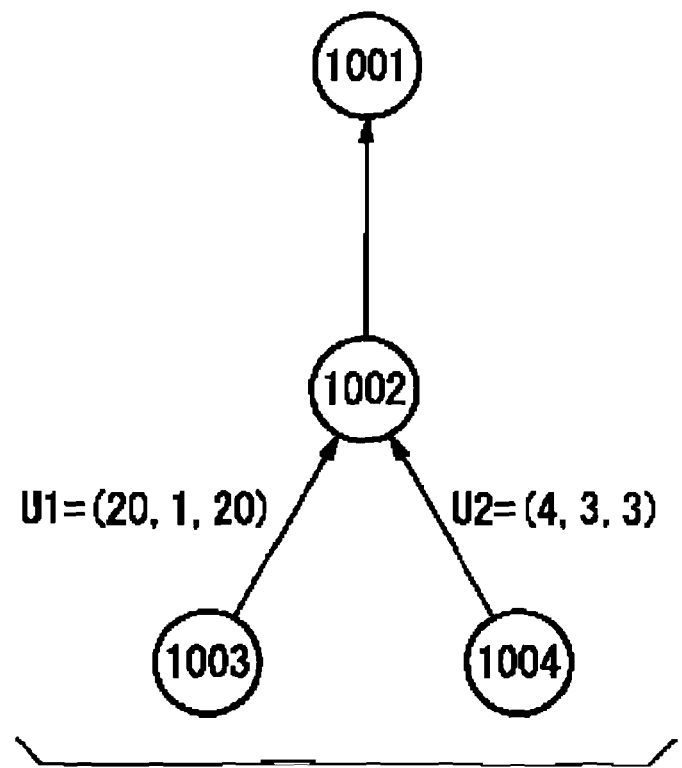
FIGS. 54A and 54B are diagrams showing portions relating to the node 1002 of FIG. 52.
Figures 56, 58:
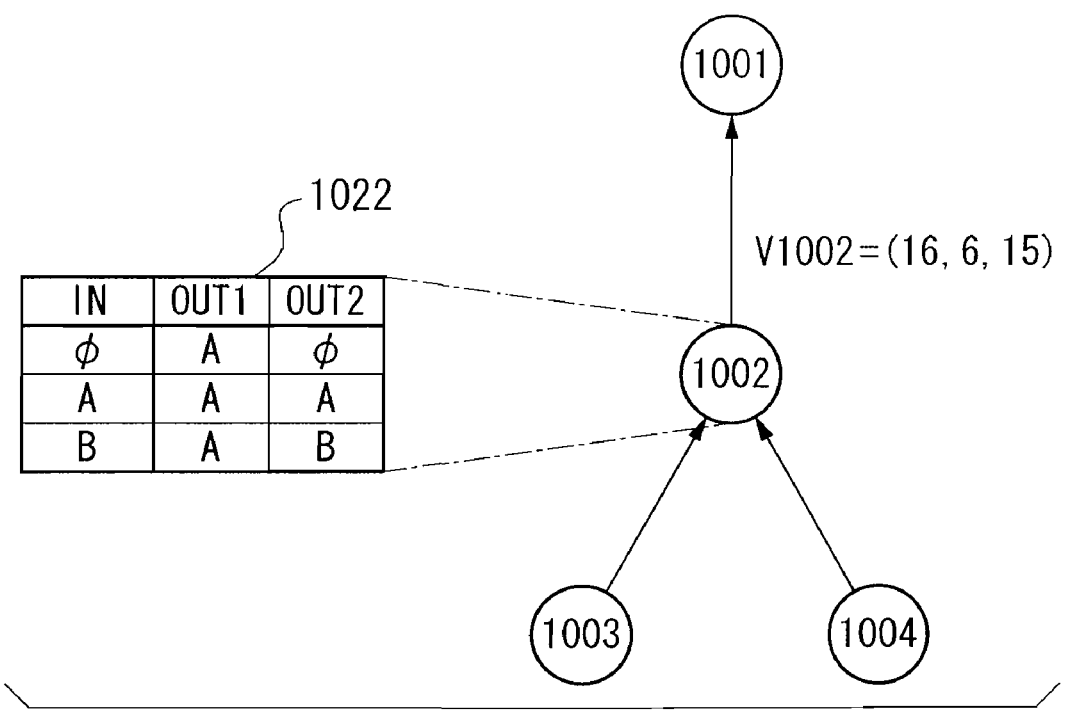
FIG. 56 is a diagram showing the node 1002 of FIG. 52 transmitting a preference vector.
FIG. 58 is a diagram showing a number of viewers-advertisement category lookup table which can be applied in the second example of the method in the applied example of this invention.

FIGS. 54A and 54B show a section relating to the node 1002 shown in FIG. 52, FIGS. 55A to 55D shows examples of calculations of the node 1002 in FIGS. 54A and 54B, and FIG. 56 shows the node 1002 transmitting the preference vector.

Firstly, let us suppose that a preference vector $U_1$=(20, 1, 20) from the node 1003, and a preference vector $U_2$=(4, 3, 3) from the node 1004, have arrived at the node 1002 as shown in FIGS. 54A and 54B.

The results shown in FIGS. 55A to 55C are obtained by performing the calculations shown in FIGS. 47A to 47C to the preference vectors $U_1$ and $U_2$ and the matrix $G_{1002}$ which expresses $g_{1002}$; furthermore, as shown in FIG. 55D, the preference vector $V_{1002}$=(16, 6, 15) to be sent to the node 1001 is obtained by calculating the sum of the minimum values for each child. Then, as shown in FIG. 56, when the request phase processing at the node 1002 is completed, the category of the ad data to be exchanged in order to obtain a minimum value is simultaneously set in the ad-attachment-instruction table 1022 of the node for each child, and, based on this, a required process of attaching/exchanging ad data is performed in delivery phase, explained below.

Figure 57:
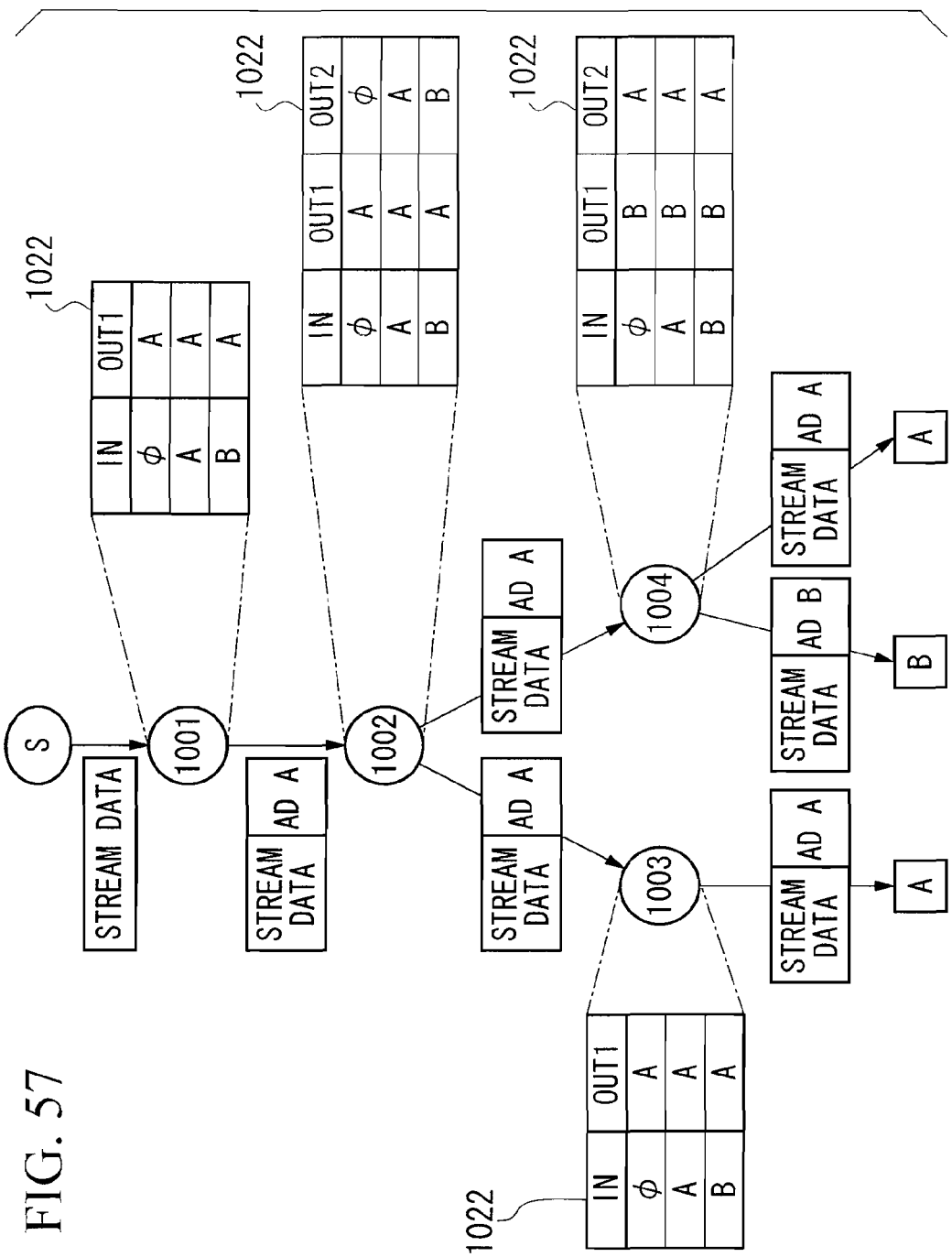
FIG. 57 is a diagram showing an example of a specific operation of another delivery phase according to the second example of the method in the applied example of this invention.

FIG. 57 shows a specific example of another operation in the delivery phase according to the second method in this applied example.

As shown in FIG. 57, stream data sent from the server is processed in compliance with ad-attachment-instruction tables 1022 of the nodes 1001, 1002, 1003, and 1004. At the node 1001, the stream data is forwarded with category A ad data attached; at the node 1002, since the category A ad data is already attached to the stream data, it is simply forwarded; at the node 1003, the stream data is simply forwarded for the same reason; at the node 1004, the ad data of the child on the left is exchanged for category B ad data, while it is simply forwarded to the child on the right.

That is, the nodes 1001 and 1004 perform a required process of exchanging ad data, but the nodes 1002 and 1003 simply forward the stream data. This reflects the fact that the values of the elements of matrixes $G_{1001}$ and $G_{1004}$ are relatively smaller than those of the matrixes $G_{1002}$ and $G_{1003}$, as shown in FIGS. 53A to 53D. Consequently, as in the example shown in FIG. 46, the load of the overall network can be dispersed by reflecting the load statuses of the nodes 1001, 1002, 1003, and 1004 in $g_k$.

It may be envisaged that attaching ad data to the stream data noticeably increases the amount of traffic; in such a case, of the communication links which form the multicast tree, it is more effective not to attach ad data when stream data passes through communication links with a narrow usable bandwidth.

To achieve this, in the case of congestion on the communication link in the tree connecting, for example, the node k and the j-th child, by setting a high value for the cost function $f_k(i, a(1), a(2), \ldots, a(c))$ when $a(j)\neq\phi$, this communication link can be altered so that ad data is not attached, if possible, when stream data passes through.

On the other hand, when information relating to the number of viewers and the type of stream data, or scenes which vary over time, and the like, is attached to the stream data sent from the server separately from the ad data, it becomes possible for the node to select predetermined ad data in accordance with the above information, such as the number of viewers, from the ad data belonging to the category preferred by the client, and to perform attaching/exchanging processes.

FIG. 58 shows a number of viewers-ad category lookup table which can be applied in the second method in this applied example.

In the number of viewers-ad category lookup table 1029 shown in FIG. 58, the rows represent the number of viewers, and the columns represent ad categories; "A1", "A2", and "A3" represent ad data belonging to ad category A, "B1", "B2", and "B3" represent ad data belonging to ad category B, and "C1", "C2", and "C3" represent ad data belonging to ad category C.

The number of viewers-ad category lookup table 1029 is provided at each of the node N2 in addition to the ad-attachment-instruction table 1022, thereby making it possible to update the ad data to be attached/exchanged in accordance with the number of viewers.

For example, when the ad-attachment-instruction table 1022 created in the request phase indicates an instruction to attach (or exchange for) category B ad data, if the number of viewers information, attached to the stream data from the server, is "5000", the "B2" ad data should be attached (exchanged). This method makes it possible to supply advertisements which reflect the wishes both of advertisers and sponsors of the stream data, and of users.

(Example of Program and Recording Medium)

Subsequently, a program and recording medium which are applied in the first and second methods described above will be explained.

As mentioned at the end of the first embodiment, the nodes N1 and N2 comprise computers which transmit and receive the stream data in the form of packets. Therefore, the examples of the first and second method described above can be arranged in programs to execute these processes sequentially.

In this case, a required program should execute, for example, (a) a step of selecting a category of ad data, previously defined in ad-attachment-instruction tables 1012 and 1022 at each of one or more adjacent nodes on the leaf side when stream data has been forwarded from an adjacent node on the root side of the node, based on a preference vector showing a correlation between preferences of the clients and the cost of attaching ad data; (b) a step of forwarding the ad data, previously registered in the ad data memory units 1011 and 1021 in correspondence with the selected category, to the adjacent nodes on the leaf side in the case where no ad data is attached to the forwarded stream data; (c) a step of exchanging ad data, which is already attached to the forwarded stream data but differs from the selected category, for ad data previously registered in the ad data memory units 1011 and 1021 in correspondence with the selected category, and forwarding the ad data to the adjacent nodes on the leaf side; and (d) a step of forwarding the stream data unaltered to the adjacent nodes on the leaf side when the ad data, which is already attached to the forwarded stream data, is the same as the selected category.

Furthermore, a sequence of the steps comprising the above program can be written in a recording medium, and entered at the nodes N1 and N2 (all the nodes forming the network) prior to execution, enabling the processes relating to required ad data attachment functions to be executed.

The examples of the first and second apparatuses, the network apparatus and method, the program and recording medium have been described above in a case where ad data is attached to the stream data as required attachment data, but this is merely one example of the application of this invention, which can be similarly applied in the attachment of other types of data.

(First Modification)

Next, two modifications, in which the data format of stream data is transformed, will be explained as modifications of the first and second apparatuses, the network apparatus and method, the program and recording medium described above. These modifications constitute a second example of a transcoding function, which is an optional function in multicast communication. Incidentally, the first modification may be applied in a case (reversible case) where the format of the stream data can be transformed into all existing types, and in a case where this is not possible.

Figure 59:
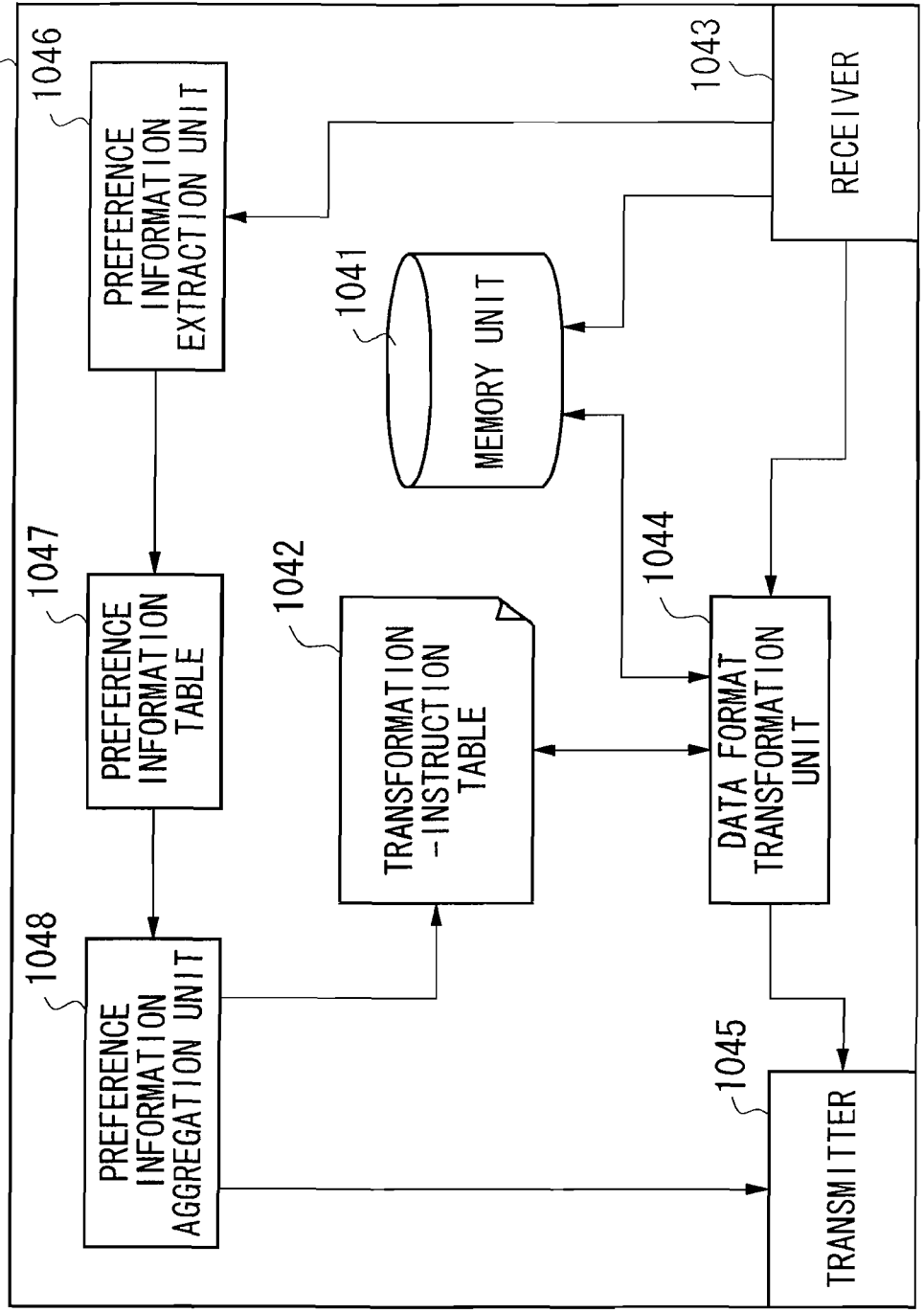
FIG. 59 is a block diagram showing the internal constitution of a node according to a first modification in an applied example of this invention.

FIG. 59 is a block diagram showing the internal constitution of a node according to this modification. When transforming the data format of the stream data, in the new constitution of the node N3, the ad data memory unit (1011 and 1021) in the examples of the first and second apparatuses is substituted with a memory unit 1041, the ad-attachment-instruction table (1012 and 1022) is substituted with a transformation-instruction table 1042, and the ad attach/exchange unit (1014, 1024) is substituted with a data format transformation unit 1044; in addition, the node N3 comprises a receiver 1043, a transmitter 1045, a preference information extraction unit 1046, a preference information table 1047, and a preference information aggregation unit 1048, which correspond to those in the apparatuses described earlier.

The memory unit 1041 stores the data format transformation unit 1044 for transforming the data format of the stream data to be delivered to the clients to one which the clients can receive, in correspondence with a plurality of required categories beforehand; the transformation-instruction table 1042 defines categories of the data format transformation unit 1044 to be used at one or more adjacent nodes on the leaf side, based on preference vectors expressing a correlation between the preferences of the clients and the cost of transforming the data format of the stream data, for each of the adjacent nodes on the leaf side.

Furthermore, in accordance with the data format of the stream data received by the receiver 1043, the data format transformation unit 1044 consults the transformation-instruction table 1042 and selects a category for the data format transformation unit 1044 to be used at the adjacent nodes on the leaf side; in addition, the data format transformation unit 1044 reads the data format transformation unit 1044 which is stored in the memory unit 1041 in correspondence with the selected category, and transforms the data format of the stream data by using the read data format transformation unit 1044.

Incidentally, in constructing a multicast data communication system by using nodes having the constitution described above, a network is created in the shape of a multicast tree for delivering stream data from a single server toward one or more clients, and the above node is allocated to a plurality of nodes provided in the network.

Furthermore, in carrying out the method, the categories A, B, and φ of the ad data, described in the examples of the first and second methods, can be interpreted as inter-translatable languages, with the nodes being equipped with a translation function. The server transmits a stream data written in the language φ, and nodes on the path leading to the client translate the stream data, thereby enabling stream data written in a language requested by the client to be delivered to him.

For example, assuming that a translation of image data as an example of the stream data, the translation can be interpreted as encoding format transformation or media transformation. Since this type of transcoding can often only be used in one direction, the characteristics of this type of transcoding is taken into consideration in the application of the method of this modification.

Figure 60:
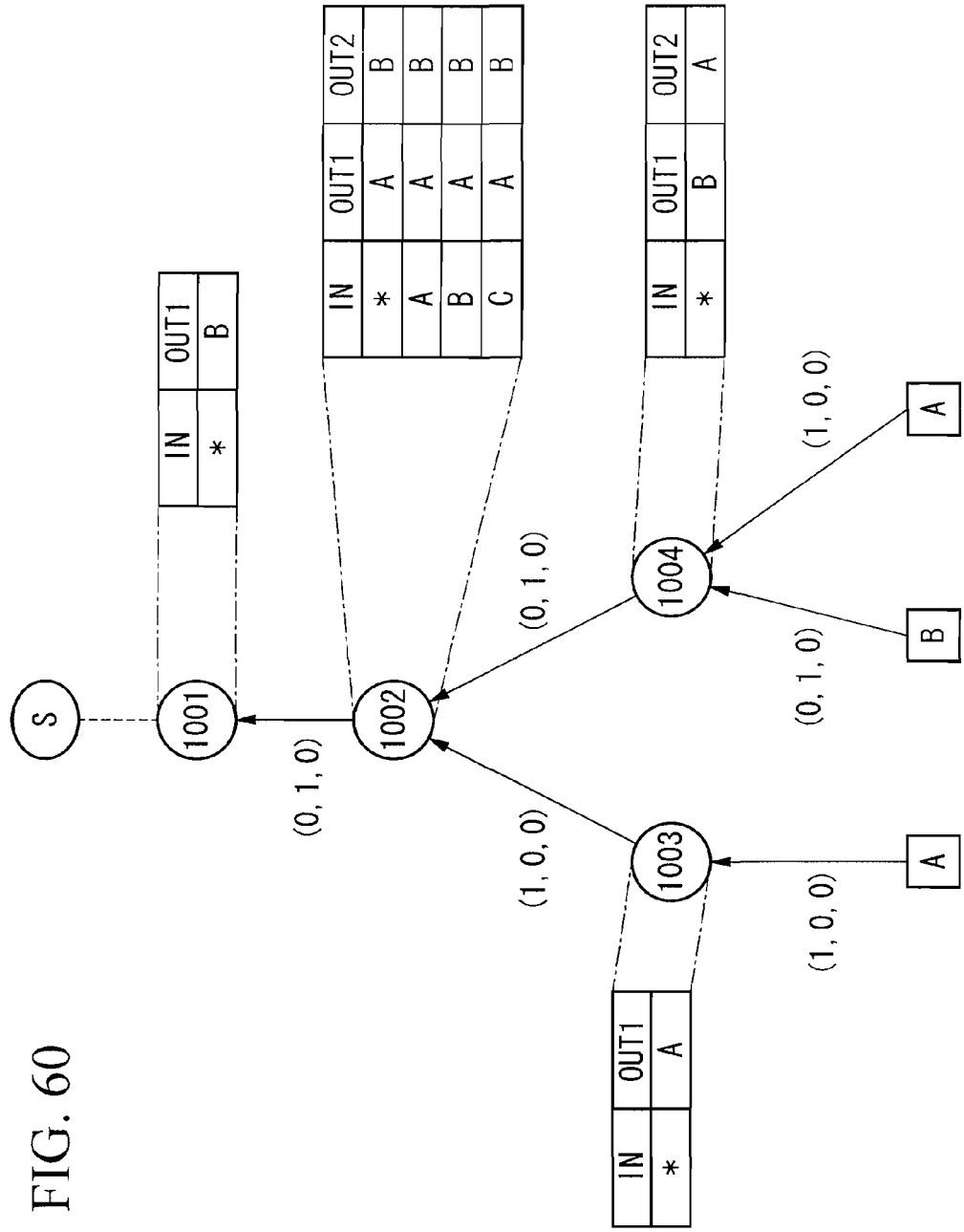
FIG. 60 is a diagram showing a specific operation of a request phase applied in the first modification in an applied example of this invention.
Figure 61:
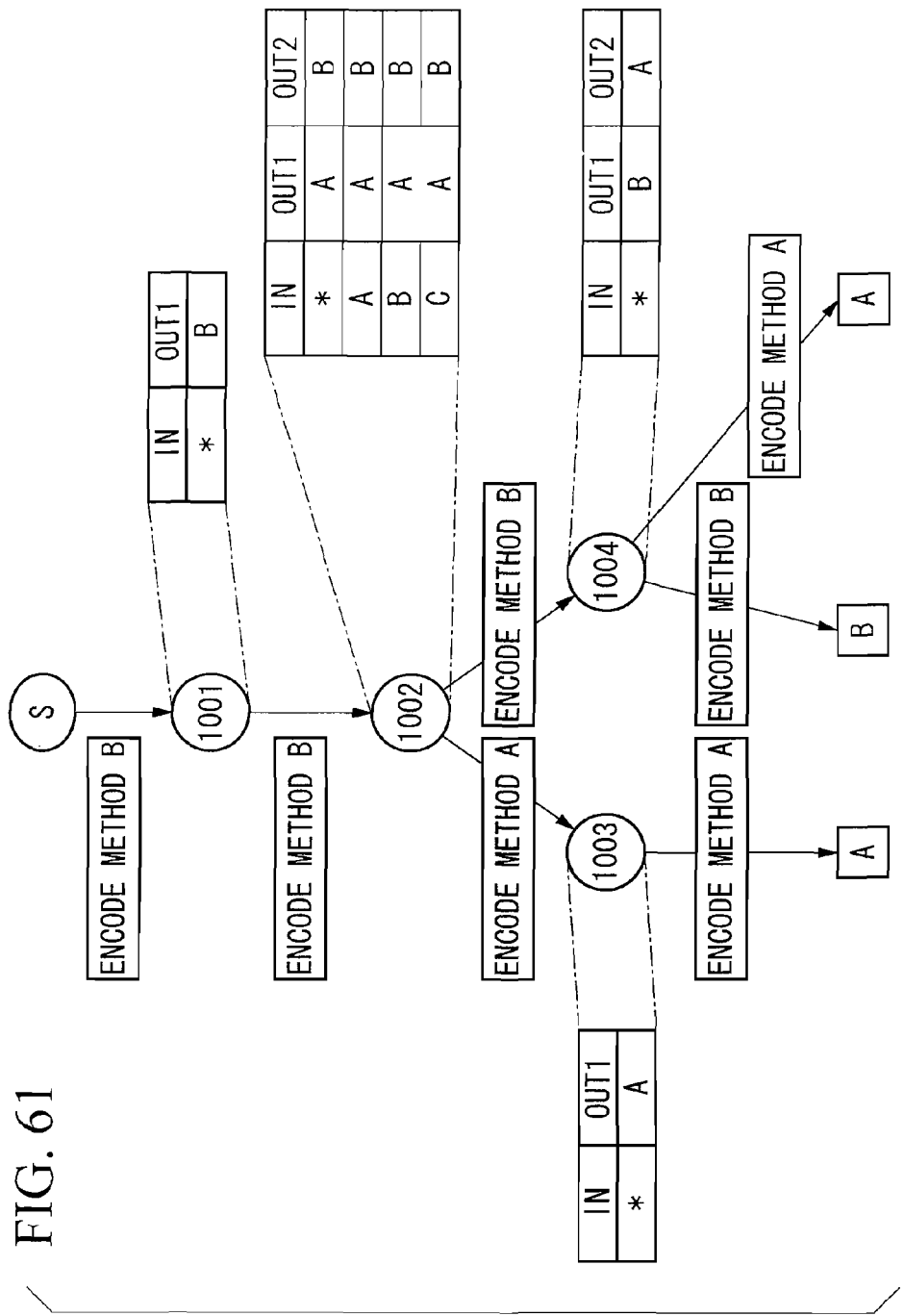
FIG. 61 is a diagram showing a specific operation of a delivery phase applied in the first modification in an applied example of this invention.

FIG. 60 shows a specific example of an operation in the request phase according to the first modification in this applied example, and FIG. 61 shows a specific example of an operation in the delivery phase in the same modification.

As shown in FIG. 60, the server transmits required stream data in an encoding format C, and three clients receive the stream data in different encoding formats A or B. Let us assume that it is possible to transform data from format B to format A, but not from A to B (this is expressed as "B ⊃ A"). Although this explanation uses the same cost model as that in FIG. 40 for the purpose of simplification, this example can be expanded to the general cost model shown in FIG. 46.

With "A", "B", and "C" respectively representing first, second, and third encoding formats, the node 1004 receives preference vectors (0, 1, 0) and (1, 0, 0) from two children, but, due to the fact that B ⊃ A, the node 1004 cannot request an encoding format A from the node 1002, and for this reason transmits a preference vector of (0, 1, 0).

The node 1002 receives preference vectors (1, 0, 0) and (0, 1, 0) from two children, but, due to the fact that B ⊃ A, transmits a preference vector of (0, 1, 0) to the node 1001.

As a result, in the request phase, the transformation-instruction tables shown in FIG. 60 are set at the nodes 1001, 1002, 1003, and 1004, and, in the delivery phase, the encoding formats are transformed as shown in FIG. 61. The format of the data sent from the server is here assumed to be transformable to encoding format B (the above service cannot operate when this is not the case).

In constructing a program in this modification, the program should, for example, comprise (a') a step performed when stream data has been forwarded from an adjacent node on the root side, the step comprising selecting a category of the data format transformation unit, defined in advance as a transformation-instruction table for each of one or more adjacent nodes on the leaf side, in order to transform the data format of the stream data into one which can be received by the client, based on a preference vector showing the correlation between the preferences of the clients and the cost of transforming the data format of the stream data; (b') a step performed when the data format transformation unit for obtaining the data format of the forwarded stream data is different from the selected category, the step comprising transforming the stream data by using the data format transformation unit which was registered in advance in the memory unit in accordance with the category, and forwarding it to the adjacent nodes on the leaf side; (c') a step performed when the data format transformation unit for obtaining the data format of the forwarded stream data is the same as the selected category, the step comprising forwarding the stream data unaltered to the adjacent nodes on the leaf side.

Furthermore, a sequence of the steps comprising the above program can be written in a recording medium, and entered at the nodes (all the nodes forming the network) prior to execution, thereby enabling processing relating to required transcoding functions to be executed.

(Second Modification)

Subsequently, another example of a case where the data format of the stream data cannot always be transformed to all existing types (some are non-reversible) will be explained based on the first and second methods described above. In the following explanation, it is assumed that there is at least one data format which can be transformed to any data format requested by the client (when this assumption is ignored, it becomes impossible to accommodate all the clients in a single multicast tree).

Figure 62:
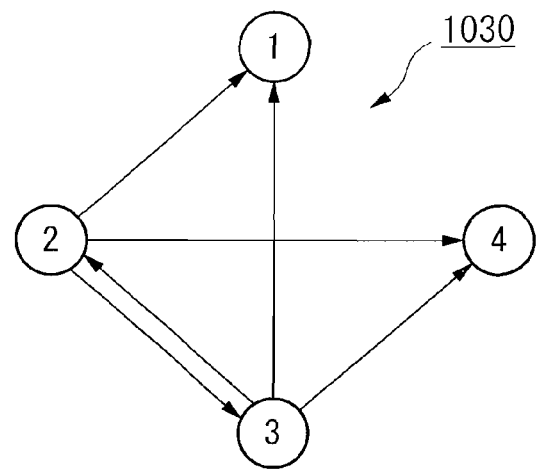
FIG. 62 is a diagram showing a transformation-constraint graph (directed graph) specifying constraints relating to transformation of data formats of stream data shown in the first example of the method, in a second modification of the applied example of this invention.

FIG. 62 shows a transformation-constraint graph (directed graph) stipulating constraints relating to transformation between data formats in stream data described in the first method, according to the second modification of this applied example.

In the transformation-constraint graph 1030 shown in FIG. 62, the numerals shown at the nodal points represent types (a total of four types) of all existing data formats; when it is possible to transform from data format i to data format j, there is an arc (i, j) from the nodal point i to the nodal point j. Actually transforming from data format i to data format j is defined as "it is possible to transform from data format i to data format j", even when there is a need to pass through one or more other intermediate data formats.

The reason for this is that, in the cost model described in the first method, since a given data format transformation is performed at a cost of "1", there is no significance in whether the data format can be transformed directly or not. Therefore, provided that there is a directed path from the nodal point i to the nodal point j, there will always be an arc (i, j).

Incidentally, the transformation-constraint graph 1030 shown above may be held in advance by the preference information aggregation unit 1018 of the node N1 shown in the first apparatus which the first method is applied in, or attached as data to the preference vector forwarded from one or more adjacent nodes on the leaf side via the receiver 1013.

Figure 63:
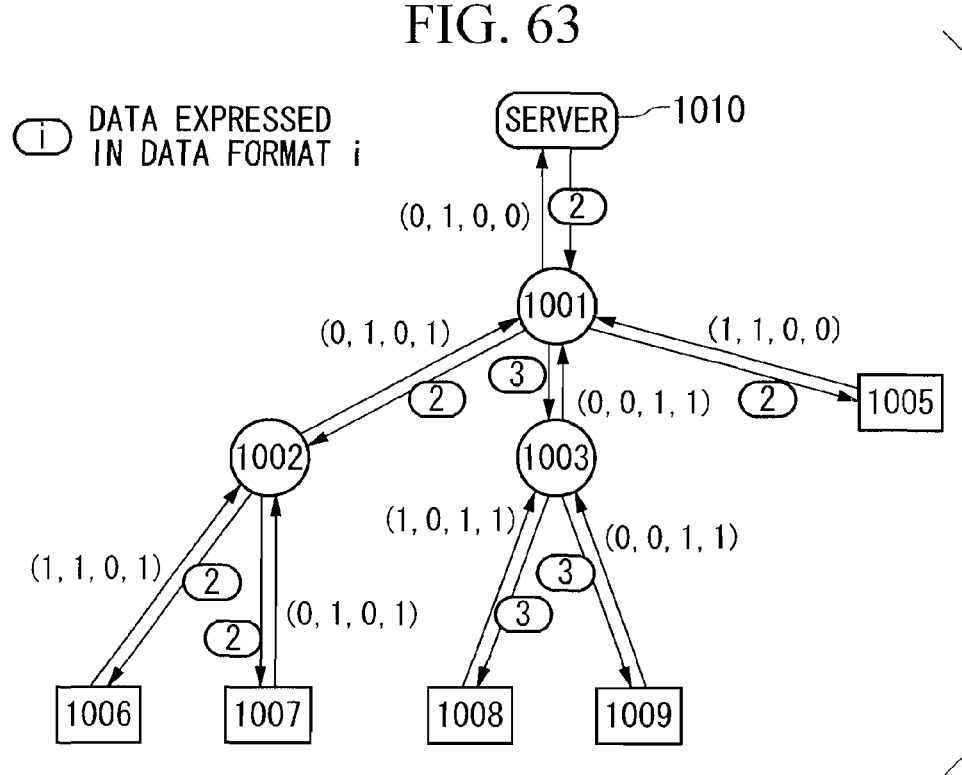
FIG. 63 is a diagram showing one example of the relationship between a preference vector, output from a node and a client, and stream data, delivered in accordance with the preference vector, when the transformation-constraint graph of FIG. 62 was applied.

FIG. 63 shows the relationship between the preference vector, transmitted by the nodes or the clients when the transformation-constraint graph 1030 of FIG. 62 is supplied, and the stream data which is delivered in correspondence with the preference vector.

The preference vector is defined in the same way as in the first method. That is, when the total number of data formats is expressed as n, the preference vector is an n-dimensional vector (n-bit vector) with "1" and "0" as its elements; when the i-th bit of the n-bit preference vector is "1", this indicates that the i-th data format is being requested.

The method of aggregating the preference vectors will be explained using the node 1001 as an example. The preference vector indicates that the node 1002 is requesting the second and fourth data formats. To transmit stream data from the node 1001 to the node 1002 in these data formats, the stream data must be in the second, third, or fourth data formats, as stipulated in the transformation-constraint graph 1030.

In this way, when Sj represents the set of data format in the stream data from the parent node which can be transformed to a data format requested by the node (or client) j, $S_{1002}=\{2, 3, 4\}$, $S_{1003}=\{2, 3, 4\}$, and $S_{1005}=\{1, 2, 3\}$ (there is no j=4).

Now, in order to satisfy requests from all the child nodes, the data format of the stream data from the parent node must be $S_{1002} \cap S_{1003} \cap S_{1005}=\{2, 3\}$. Therefore, the second and third data formats are requested from the parent node.

Furthermore, since the sum of the preference vectors from all the child nodes is (1, 2, 1, 2), the transformation cost at the node 1001 is lower when the stream data from the parent node is in the second data format. Therefore, the node 1001 sends (0, 1, 0, 0) to the parent node (server 1010 in FIG. 63).

The preference vectors (0, 1, 0, 1) and (0, 0, 1, 1) created at the nodes 1002 and 1003 can be determined from $S_{1006}=\{1, 2, 3, 4\}$, $S_{1007}=\{2, 3, 4\}$, $S_{1008}=\{1, 2, 3, 4\}$, and $S_{1009}=\{2, 3, 4\}$. The product set of Sj is never the empty set, since there is at least one data format which can be transformed to a given data format.

The method of aggregating the preference vectors at the nodes can be summarized as follows.

1. Sj is calculated from the transformation-constraint graph 1030 and the preference vector from each of the nodes j
2. The sum $(s_1, s_2, \ldots, s_n)$ of the preference vectors from each child j is calculated.
3. i is the element of the product set of Sj, and the set of the maximum i in the set $s_i$ is made I.
4. The preference vector sent to the parent node is $(b_1, b_2, \ldots, b_n)$. However, if i' is an element of I, then $b_{i'}'=1$; otherwise $b_{i'}'=0$.

As in the first method, transformation-instruction tables are created at the nodes to ensure that the stream data is transformed into data formats which satisfy the preference vectors from the clients. When stream data from the parent node has momentarily arrived in a data format other than the requested one due to the timing when updating the preference vector, where possible the stream data is transformed to a data format requested by the child; when such a transformation is not possible, the delivery packet itself should be discarded.

This is not a serious problem in a stable network where the packet sequence is not shifting. This is because, while the clients and nodes continuing to regularly transmit the same preference vectors, stream data in a data format other than the requested one does not arrive from the parent node; the reason for this is as follows.

The parent node always calculates a preference vector which will satisfy the request of its child node, and consequently, even when a child of the parent node other than the client and node has changed its preference vector, the stream data, determined by the preference vector newly created by the parent node, can be transformed to the data format requested by the child or the node.

It is conceivable that there may be a special transformation constraint such that $i_1<i_2$, making it possible to transform from the $i_2$-th data format to the $i_1$-th data format, but not vice versa. In this case, the calculation of the preference vector can be simplified as follows.

When the preference vector from the node (or client) j is $(b'_1, b'_2, \ldots, b'_n)$, the minimum value of an subscript i satisfying $b'_i=1$ is expressed as min(j), and the maximum value of min(j) throughout all the children j is T, then the product set Sj for all the children j is a set $\{i|i \geq T\}$.

Figure 64:
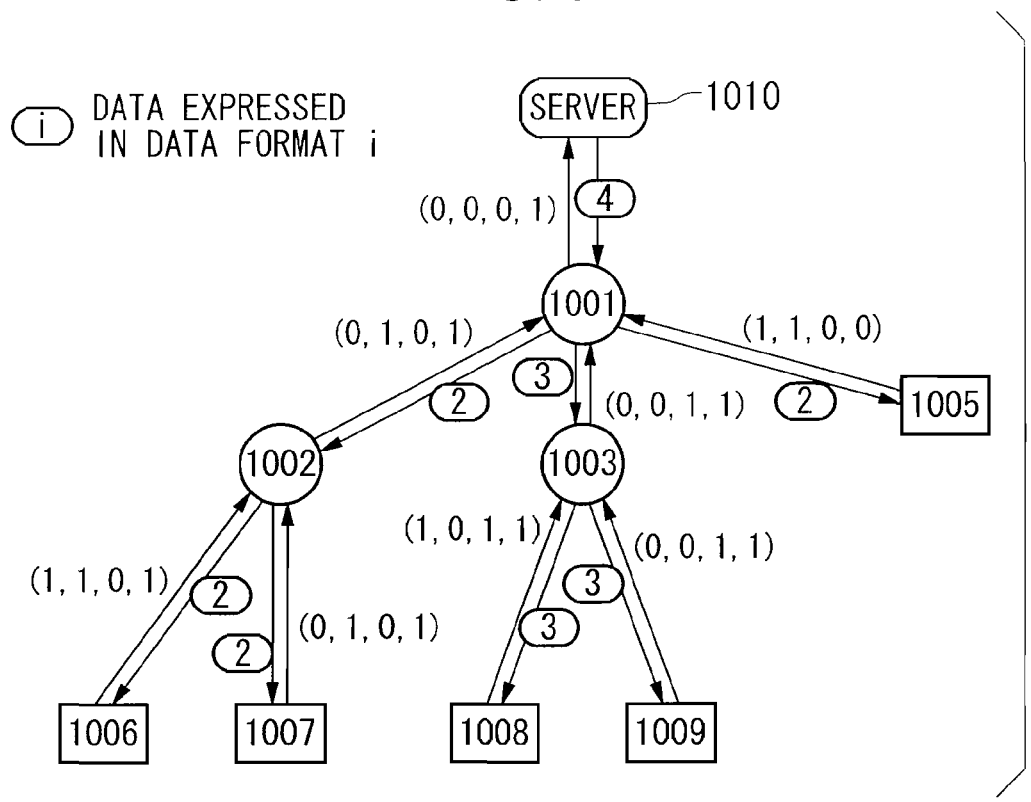
FIG. 64 is a diagram showing one example of the relationship between a preference vector, output from a node and a client, and stream data, delivered in accordance with the preference vector, when there is a special transformation constraint, i.e. there is a constraint stipulating that when $i_1 < i_2$, it is possible to transform the $i_2$-th data format to the $i_1$-th data format, but not vice versa.

For example, in the node 1001 shown in FIG. 64 (an example where there is a special transformation constraint), min(2)=2, min(3)=3, min(5)=1 (there is no j=4), and therefore, T=3, and $S_{1002} \cap S_{1003} \cap S_{1005}=\{3, 4\}$. At this time, since the sum of the preference vectors from the three children is (1, 2, 1, 2), the node 1001 transmits (0, 0, 0, 1) to the parent node (server 1010 in FIG. 64).

The above example describes a method for handling transformation constraints based on the cost model of the first method, but it is also possible to handle required transformation constraints based on the cost model of the second method by setting the values of the function $f_k(i, a(1), a(2), \ldots a(c))$ as follows.

When the a(1), a(2), . . . , a(c) includes a data format which cannot be transformed from the data format i, the function $f_k(i, a(1), a(2), \ldots a(c))$ is set to ∞ (infinity), excluding such a combination of (i, a(1), a(2), . . . , a(c)). Furthermore, differences in the transformation cost of the data formats can be reflected in the values of the $f_k(i, a(1), a(2), \ldots a(c))$.

Figure 65:
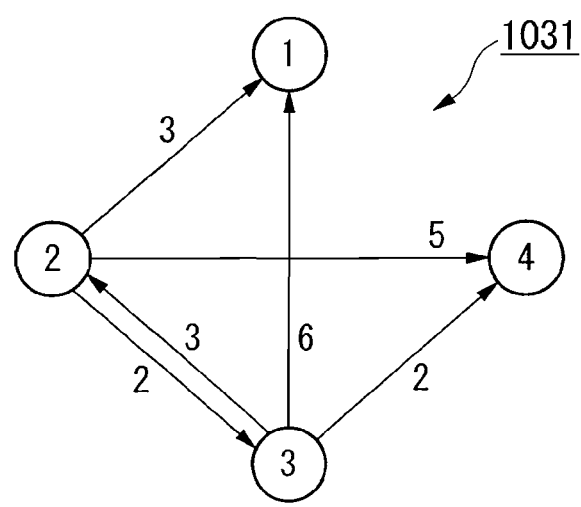
FIG. 65 is a diagram showing a transformation-constraint graph (directed graph) specifying constraints relating to transformation of data formats of stream data shown in the second example of the method, in a second modification of the applied example of this invention.

FIG. 65 is a transformation-constraint graph (directed graph) stipulating constraints relating to transformation between data formats in stream data described in the second method, according to the second modification of this applied example. Labels attached to the arcs indicate transcoding costs.

When the transformation-constraint graph 1031 of FIG. 65 is applied, as in the second method example, the cost function can be analyzed as $f_k(i, a(1), a(2), \ldots, a(c)) = g_k(i, a(1)) + g_k(i, a(2)) + \ldots + g_k(i, a(c))$; furthermore, if $g_k(i, a(j))$ is defined as a label of the arc (i, a(j)), the function is calculated as $f_k(2, 1, 1, 3) = g_k(2, 1) + g_k(2, 1) + g_k(2, 3) = 3 + 3 + 2 = 8$.

By reflecting the cost of transforming from one data format to another in the values of (i, a(1), a(2), . . . , a(c)) in this way, the transformation costs of the overall multicast tree can be minimized more strictly.

Incidentally, according to the above modification, it is also possible to reflect the load status of the nodes, and the usable bandwidth of the communication links, in the value of $f_k(i, a(1), a(2), \ldots, a(c))$, as described in the second method example.

To reflect the load statuses of the nodes, at nodes with a heavy load, the value of the function $f_k(i, a(1), a(2), \ldots, a(c))$ is set to a value greater than the value of functions at other nodes, avoiding transformation processing at the nodes with a heavy load, as described in the second method example.

In reflecting the usable bandwidth of the communication links, when there is congestion at the communication links between the node and the parent node, the cost of transforming a data format which requires a wide bandwidth to another data format is increased, thereby reducing the possibility that stream data in the data format which requires a wide bandwidth will traverse the congested communication links.

(Application in Multicast Communication)

Figure 66:
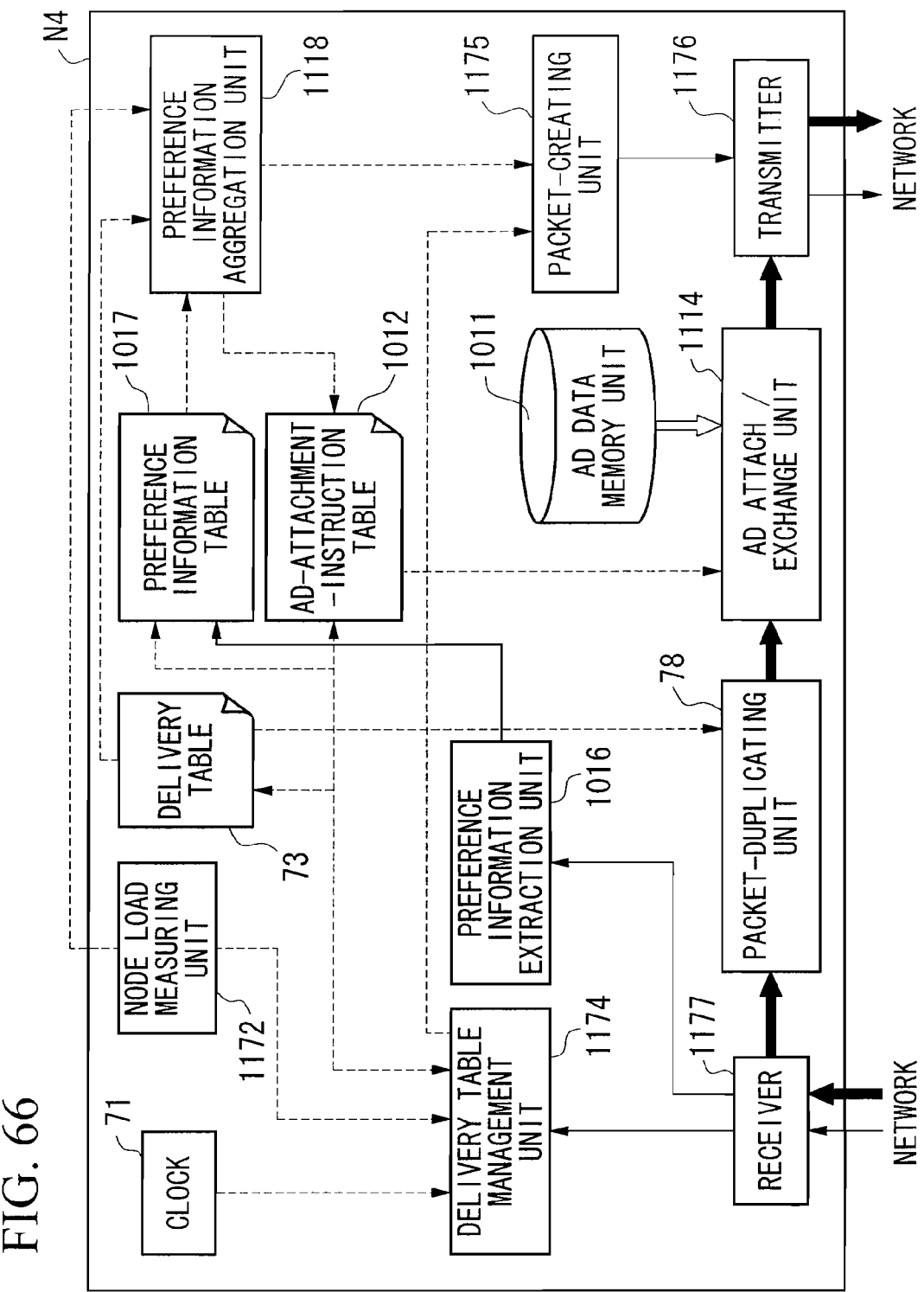
FIG. 66 is a block diagram showing the internal constitution of a node according to an applied example of this invention equipped with a transcoding function.

Subsequently, the overall constitution of a node in this applied example will be explained. FIG. 66 is a block diagram showing the detailed overall constitution of the node N4, the same elements as those in FIGS. 33 and 38 being represented by the same reference symbols. In FIG. 66, the thick solid lines represent the flow of a delivery packet, the thin solid lines represent the flow of request packets, and the dotted lines represent the flow of control signals.

As shown in FIG. 66, the overall constitution of the node is basically a combination of the elements of FIGS. 33 and 38. There are, however, several differences, such as the fact that the receiver 77 and transmitter 76 of FIG. 33 are respectively incorporated into the receiver 1013 and transmitter 1015 of FIG. 38; the altered parts will be explained.

A delivery table management unit 1174 manages (creates, updates, and deletes) not only the delivery table 73, but also the ad-attachment-instruction table 1012 and the preference information table 1017. A node load measuring unit 1172 also transmits measurements of the load to the preference information aggregation unit 1118, so that the load status of the node will be reflected in the cost. The preference information aggregation unit 1118 determines whether the load of its own node is high based on a load status received from the node load measuring unit 1172; when the load is high, the preference information aggregation unit 1118 instructs the packet-creating unit 1175 to forward the request packet unaltered from the child node to the parent node. Furthermore, at the time of aggregatively performing a predetermined calculation of the preference vectors, the preference information aggregation unit 1118 consults a delivery table 73, in order to remove children which have timed out from the aggregation of the preference information. The packet-creating unit 1175 receives this instruction from the preference information aggregation unit 1118, changes the source address of the request packet to the address of the present node, and forwards it to the parent node.

FIG. 67 shows a format of a request packet in this applied example, the same fields as FIG. 36 being represented by the same reference symbols. FIG. 67 differs from FIG. 36 in having an additional field for preference vector 117. That is, in this applied example, the preference vector is provided in the request packet. As mentioned earlier in the first to third embodiments, request packets are transmitted regularly, and delivery packets are delivered along a path which is the reverse of that which the request packets traverse. On the other hand, in this applied example, data format transformation of data in the delivery packet is determined based on a packet carrying the preference vector, which must traverse the same path as that of the delivery packet. Furthermore, in order to deal with changes in the preference vector which correspond to changes in the preferences of clients, when at least one preference vector has changed, the packet carrying the preference vector must be retransmitted. This similarity between multicast delivery and the transcoding function is utilized in effectively realizing transcoding by placing the preference vector in the request packet.

FIG. 68 shows a format of a delivery packet in this applied example, the same fields as FIG. 37 being represented by the same reference symbols. FIG. 68 differs from FIG. 37 in that fields for data format control information 127 and data format 128 are inserted between the channel ID 125 and the data 126. The data format control information 127 is used when partially transforming the data 126 (when attaching or exchanging ad data), and shows the position of the part of the data to be transformed. For example, when exchanging ad data, the data format control information 127 shows the part which is to be exchanged.

The data format 128 shows the name of the data format in which the data 126 is written. The processes of attaching/exchanging ad data, and transforming the data format, can both be performed in one multicast tree. Therefore, the data format 128 may be a coding method (e.g. MPEG1 and MPEG2) for the stream data, or it may be the name of the data showing ad data and the like attached to the stream, or it may represent both of these simultaneously. The nodes have transformation processing routines for every possible value for the data format 128, and the data format control information 127 is consulted in these transformation processing routines. When attaching/exchanging ad data, the data 126 includes ad data in addition to the stream data.

The operation of the node shown in FIG. 66 is as follows. When a request packet arrives at the node N4, the request packet is passed via a receiver 1177 to the delivery table management unit 1174, where the multicast communication operation described in the first to third embodiments is carried out. At this time, the creation/deletion of the preference information table 1017 and the ad-attachment-instruction table 1012, and the creation/deletion of entries in the preference information table 1017 and the ad-attachment-instruction table 1012, are carried out in synchronism with the creation/deletion of the delivery table, and the creation/deletion of entries in the delivery table 73.

The request packet is also passed via the receiver 1177 to the preference information extraction unit 1016, and is processed as in this applied example. When aggregatively performing a predetermined calculation of the preference vectors in the preference information table 1017, the preference information aggregation unit 1118 consults the delivery table 73, and excludes from the aggregation the preference vectors of children who have timed out.

On the other hand, a delivery packet is passed via the receiver 1177 to the packet duplicating unit 78, where the multicast communication process described in the first to third embodiments is performed; then, the delivery packet is passed to the ad attachment/exchange unit 1114, processed in the manner described in this applied example, and is transmitted from the transmitter 1176.

Figure 69:
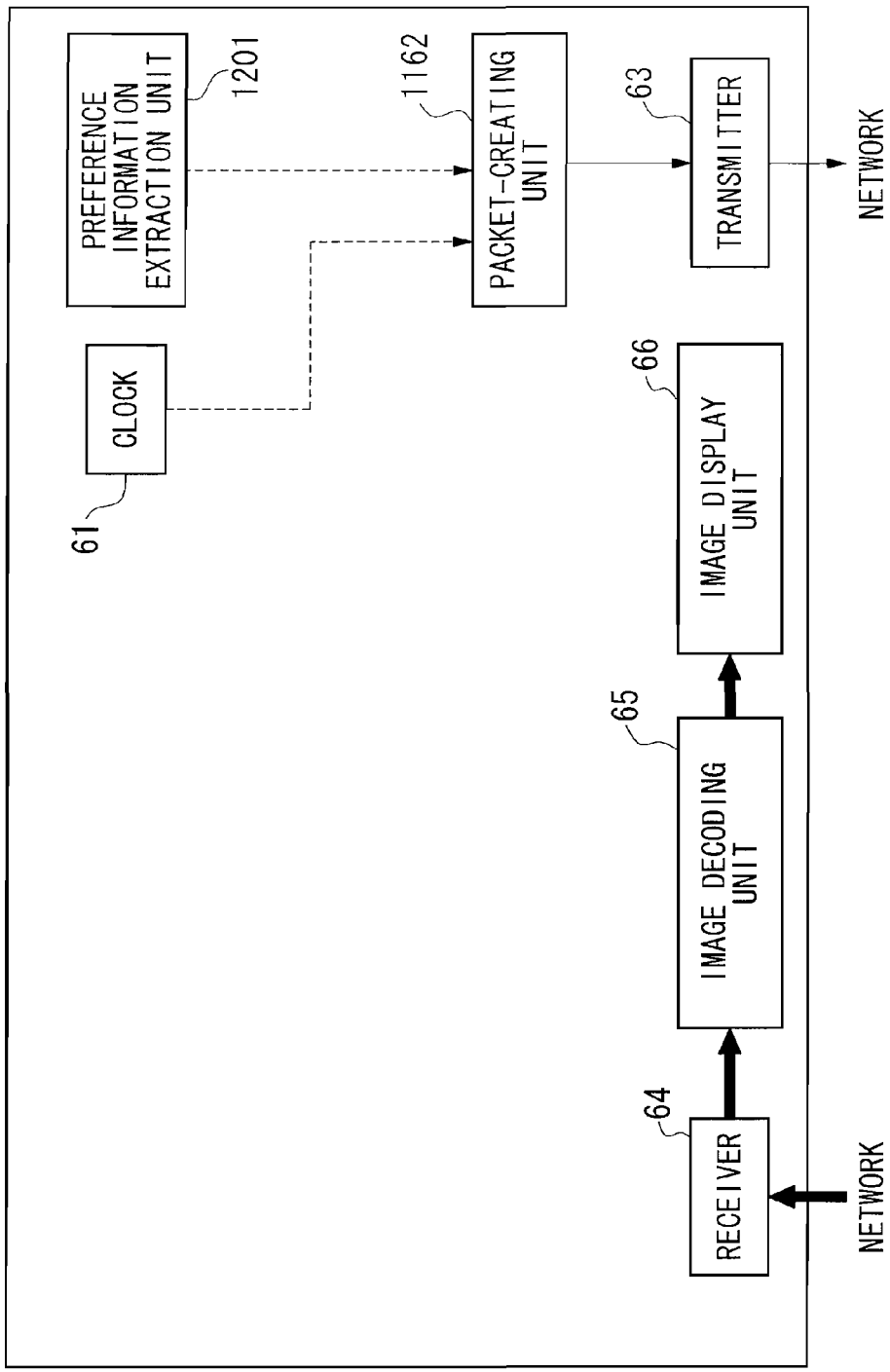
FIG. 69 is a diagram showing the internal constitution of a client in a multicast data communication system according to the applied example of this invention equipped with a transcoding function.

FIG. 69 is a block diagram showing the internal constitution of a client according to this applied example, the same parts as those of FIG. 32 being represented by the same reference symbols. In this applied example, a preference information extraction unit 1201 for extracting information relating to the preferences of users to create a preference vector is added to the constitution of FIG. 32. Then, when a packet-creating unit 1162 uses the clock 61 to regularly create a request packet, the preference vector from the preference information extraction unit 1201 is mounted on the request packet. In FIG. 69, the thick solid lines represent the flow of the delivery packet, the thin solid lines represent the flow of the request packet, and the dotted lines represent the flow of control signals.

In FIG. 66, the delivery table 73, the ad-attachment-instruction table 1012, and the preference information table 1017 comprise separate tables, but it is more efficient to unite them in a single table. FIG. 70 shows an example of an integrated delivery table. As shown in FIG. 70, the integrated delivery table arranges fields relating to child number, address, port, request packet arrival time, preference vector, and ad, into groups.

The fields for "Child number", "Address", "Request packet arrival time" are the same as those shown in FIG. 2. The "port" field corresponds to the "receiving port" field in the delivery table shown in FIG. 35. The "preference vector" field stores preference vectors sent from the children. The "Ad" field stores, for each child, categories of ad data transmitted to the children (e.g. corresponding to "Out1" or "Out2" in FIG. 39B) for each of the categories $\phi$, A, B, and C, of ad data which can be transmitted from the parent node (e.g. corresponding to "In" in FIG. 39B).

According to the applied example of this invention, attachment data, such as advertisements, which match the preferences of clients, can be effectively attached to contents data; in addition, when delivering the contents data, the format of the contents data can be transformed to one which the clients can receive, and required contents data can be delivered with due consideration given to the load status of the nodes themselves, and the load status of the communication links of the nodes.

This invention is not limited to the means, methods, sequences and procedures in the embodiments described above, and can be modified within the scope of the effects described below while achieving its objects.

For example, the preceding explanation refers to stream data as an example of contents data, but this invention is not limited to this, and can be similarly applied when using other types of contents data.

What is claimed is:

1. A multicast data communication system which multicasts data using only unicast communication via one or more repeaters provided on a unicast delivery path from a transmitter to a plurality of receivers, each of the one or more repeaters, the transmitter, and the plurality of receivers being a node, the transmitter being a root of a multicast tree of delivery paths from the transmitter to the plurality of receivers, each of the plurality of receivers comprising a unit for transmitting a reception request message for requesting receipt of multicast data with the transmitter as the destination at a time interval which is shorter than a predetermined value, the transmitter comprising: a unit which determines whether a node adjacent to a receiver side is continuing to request receipt of the data, based on whether a receive interval of the reception request message is shorter than a predetermined time interval; and a unit which transmits the data toward the plurality of receivers when it has been determined that the node adjacent to the receiver side is continuing to request receipt of the data, and each of the one or more repeaters comprising: a unit which creates a delivery table for registering one or more nodes adjacent to the receiver side where the data should be delivered to only a) after the reception request message has been received from the node adjacent to the receiver side and b) when the multicast data or a delivery-table-creation packet is received from a node adjacent to a transmitter side; a unit which registers the node adjacent to the receiver side which transmitted a reception request message after the delivery table was created, in the delivery table; a unit which determines whether the node adjacent to the receiver side is continuing to request receipt of the data, based on whether a receive interval of the reception request messages is shorter than a predetermined time interval; and a unit which, when it has been determined that the node adjacent to the receiver side is continuing to request receipt of the data, transmits a reception request message with the transmitter as the destination at a time interval which is shorter than a predetermined value, and in addition, replicates the data, sent from the node adjacent to the transmitter side, and delivers replicated data to the node adjacent to the receiver side, which is registered in the delivery table, wherein each of the plurality of receivers and one or more repeaters spontaneously transmit every reception request message.

2. The multicast data communication system according to claim 1, wherein each of the one or more repeaters further comprises a unit which determines whether a respective delivery table has been created;

and, in the case where the respective delivery table has not been created, a respective repeater updates a source of the reception request message, sent from the node adjacent to the receiver side, to itself, and forwards the reception request message toward the transmitter, and in addition, creates the respective delivery table when the data has been sent from the node adjacent to the transmitter side, and discards the data; and in the case where the respective delivery table has been created, the respective repeater registers the node adjacent to the receiver side, which transmitted the reception request messages, in the respective delivery table.

3. The multicast data communication system according to claim 2, each of the one or more repeaters further comprising:

a unit which determines whether each of the one or more repeaters itself has reached a high load state, exceeding a predetermined load; and a unit which, while the high load state has been determined, forwards the reception request message with the transmitter as the destination without registering a node adjacent to the receiver side, which is not registered in the respective delivery table, in the respective delivery table when the reception request message is sent from the node adjacent to the receiver side.

4. The multicast data communication system according to claim 2, wherein the reception request message contains preference information representing a correlation between a preference of a plurality of users corresponding to the plurality of receivers and a cost of transforming the data, and each of the one or more repeaters further comprising:

a transformation information memory unit which stores in advance transformation information, needed for transforming data delivered to the receivers, over a plurality of required categories;

a transformation-instruction table which defines in advance categories of the transformation information, relating to the node adjacent to the receiver side based on the preference information in reception request messages sent from the node adjacent to the receiver side;

a transformation unit which consults the transformation-instruction table and selects categories of the transformation information to be used relating to the node adjacent to the receiver side, in accordance with the data sent from the node adjacent to the transmitter side, reads the transformation information stored in the transformation information memory unit in correspondence with the selected categories, and transforms the data by using the transformation information which is read; and a transmitting unit which transmits the data, which is transformed by the transformation unit, to the node adjacent to the receiver side.

5. A multicast data communication method which multicasts data using only unicast communication via one or more repeaters provided on a unicast delivery path from a transmitter to a plurality of receivers, each of the one or more repeaters, the transmitter, and the plurality of receivers being a node, the transmitter being a root of a multicast tree of delivery paths from the transmitter to the plurality of receivers, the method comprising the steps of:

each of the plurality of receivers transmitting a reception request message for requesting receipt of multicast data with the transmitter as the destination at a time interval which is shorter than a predetermined value;

each of the one or more repeaters creating a respective delivery table for registering one or more nodes adjacent to a receiver side where the data should be delivered to only a) after the reception request message has been received from a node adjacent to the receiver side and b) when the multicast data or a delivery-table-creation packet is received from a node adjacent to a transmitter side;

the transmitter determining whether the node adjacent to the receiver side is continuing to request receipt of the data, based on whether a receive interval of the reception request messages is shorter than a predetermined time interval, transmitting the data to the node adjacent to the receiver side which is continuing to request receipt of the data, and terminating the delivery of the data to the node adjacent to the receiver side which has stopped requesting receipt of the data;

each of the one or more repeaters registering the node adjacent to the receiver side which transmitted a reception request message after the respective delivery table was created, in the respective delivery table; and each of the one or more repeaters determining whether the node adjacent to the receiver side is continuing to request receipt of the data, based on whether a receive interval of the reception request messages is shorter than a predetermined time interval; and, when it has been determined that the node adjacent to the receiver side is continuing to request receipt of the data, transmitting a reception request message with the transmitter as the destination at a time interval which is shorter than a predetermined value, replicating the data, sent from the node adjacent to the transmitter side, and delivering replicated data to the node adjacent to the receiver side, which is registered in the respective delivery table, wherein each of the plurality of receivers and one or more repeaters spontaneously transmit every reception request message.

6. The multicast data communication method according to claim 5, further comprising the steps of:

a first repeater, which has not created a respective delivery table and is located on the path from one of the plurality of receivers to a second repeater which has created a delivery table, updating a source of the reception request message, sent from the node adjacent to the receiver side, to itself, and forwarding the reception request message toward the transmitter;

when the reception request message arrives at the second repeater, the second repeater registering the node adjacent to the receiver side, which transmitted the reception request messages, in the delivery table of the second repeater, and transmitting the data to the node adjacent to the receiver side; and the first repeater receiving the data, transmitted from the node adjacent to the transmitter side, creating the respective delivery table and discarding the data.

7. A repeater in a multicast data communication system, which multicasts data using only unicast communication from a transmitter to a plurality of receivers, the repeater being provided on a unicast delivery path from the transmitter to the plurality of receivers, each of the plurality of receivers, the transmitter, and the repeater being a node, the transmitter being a root of a multicast tree of delivery paths from the transmitter to the plurality of receivers, the repeater comprising:

a unit which creates a delivery table for registering one or more nodes adjacent to a receiver side where the data should be delivered to only a) after a reception request message for requesting receipt of multicast data, sent by one of the plurality of receivers with the transmitter as the destination at a time interval which is shorter than a predetermined value, has been received from a node adjacent to the receiver side and b) when the multicast data or a delivery-table-creation packet is received from a node adjacent to a transmitter side;

a unit which registers the node adjacent to the receiver side which transmitted the reception request message after the delivery table was created, in the delivery table;

a unit which determines whether the node adjacent to the receiver side is continuing to request receipt of the data, based on whether a receive interval of the reception request message is shorter than a predetermined time interval; and a unit which, when it has been determined that the node adjacent to the receiver side is continuing to request receipt of the data, transmits a reception request message with the transmitter as the destination at a time interval which is shorter than a predetermined value, and in addition, replicates the data, sent from the node adjacent to the transmitter side, and delivers replicated data to the node adjacent to the receiver side, which is registered in the delivery table, wherein each of the plurality of receivers and repeater spontaneously transmit every reception request message.

8. The repeater according to claim 7, further comprising a unit which determines whether the delivery table has been created; and wherein in the case where the delivery table has not been created, the repeater updates the source of the reception request message, sent from the node adjacent to the receiver side, to itself, and forwards the reception request message toward the transmitter, and in addition, creates the delivery table when the data has been sent from the node adjacent to the transmitter side, and discards the data, and in the case where the delivery table has been created, the repeater registers the source node adjacent to the receiver side, which transmitted the reception request messages, in the delivery table.

9. The repeater according to claim 8, further comprising:
a unit which determines whether the repeater has reached a high load state, exceeding a predetermined load; and
a unit which, while the high load state has been determined, forwards the reception request message with the transmitter as the destination without registering a node adjacent to the receiver side, which is not registered in the delivery table, in the delivery table when the reception request message is sent from the node adjacent to the receiver side.

10. The repeater according to claim 8, further comprising:
a transformation information memory unit which stores in advance transformation information, needed for transforming data delivered to the plurality of receivers, over a plurality of required categories;
a transformation-instruction table which defines in advance categories of the transformation information, relating to the node adjacent to the receiver side based on preference information, which represents a correlation between a preference of a plurality of users corresponding to the plurality of receivers and a cost of transforming the data, the preference information being contained in reception request message sent from the node adjacent to the receiver side;
a transformation unit which consults the transformation-instruction table and selects categories of the transformation information to be used relating to the node adjacent to the receiver side, in accordance with the data sent from the node adjacent to the transmitter side, reads the transformation information stored in the transformation information memory unit in correspondence with the selected categories, and transforms the data by using the transformation information which is read; and
a transmitting unit which transmits the data, which is transformed by the transformation unit, to the node adjacent to the receiver side.

11. A repeating method for a repeater, applied when multicasting data using only unicast communication from a transmitter to a plurality of receivers, the data being repeated via one or more repeaters provided on a unicast delivery path from the transmitter to the plurality of receivers, each of the one or more repeaters, the transmitter, and the plurality of receivers being a node, the transmitter being a root of a multicast tree of delivery paths from the transmitter to the plurality of receivers, the method comprising the steps of:

receiving reception request messages for requesting receipt of multicast data, sent by the plurality of receivers with the transmitter as the destination at a time interval which is shorter than a predetermined value;

creating a delivery table for registering one or more nodes adjacent to a receiver side where the data should be delivered to only a) after a reception request message has been received from a node adjacent to the receiver side and b) when the multicast data or a delivery-table-creation packet is received from a node adjacent to a transmitter side;

registering the node adjacent to the receiver side, which transmitted the reception request message after the delivery table was created, in the delivery table;

determining whether the node adjacent to the receiver side is continuing to request receipt of the data, based on whether a receive interval of the reception request message is shorter than a predetermined time interval; and when it has been determined that the node adjacent to the receiver side is continuing to request receipt of the data, transmitting a reception request message with the transmitter as the destination at a time interval which is shorter than a predetermined value, and in addition, replicating the data, sent from the node adjacent to the transmitter side, and delivering the replicated data to the node adjacent to the receiver side, which is registered in the delivery table;

wherein each of the plurality of receivers and one or more repeaters spontaneously transmits every reception request message.

12. The repeating method according to claim 11, further comprising the steps of:

until the respective delivery table is created, updating the source of the reception request message, sent from the node adjacent to the receiver side, to each of the one or more repeaters, and forwarding the reception request message to the node adjacent to the transmitter side, and thereafter, creating the respective delivery table when the data has been sent from the node adjacent to the transmitter side, and discarding the data; and after creating the respective delivery table, registering the node adjacent to the receiver side, which transmitted the reception request message, in the respective delivery table, and in addition, transmitting the data to the node adjacent to the receiver side.

13. A non-transitory computer-readable storage medium encoded with processing instructions for directing a processor to perform a method for repeating data when multicasting data using only unicast communication from a transmitter to a plurality of receivers, the data being repeated via one or more repeaters provided on a unicast delivery path from the transmitter to the plurality of receivers, each of the one or more repeaters, the transmitter, and the plurality of receivers being a node, the transmitter being a root of a multicast tree of delivery paths from the transmitter to the plurality of receivers, the method comprising:

a step of receiving reception request messages for requesting receipt of multicast data, sent by the plurality of receivers with a transmitter as the destination at a time interval which is shorter than a predetermined value;

a step of creating a delivery table for registering one or more nodes adjacent to a receiver side where the data should be delivered to only a) after a reception request message has been received from a node adjacent to the receiver side and b) when the multicast data or a delivery-table-creation packet is received from a node adjacent to a transmitter side;

a step of registering the node adjacent to the receiver side, which transmitted the reception request message after the delivery table was created, in the delivery table;

a step of determining whether the node adjacent to the receiver side is continuing to request receipt of the data, based on whether a receive interval of the reception request message is shorter than a predetermined time interval; and a step of, when it has been determined that the node adjacent to the receiver side is continuing to request receipt of the data, transmitting a reception request message with the transmitter as the destination at a time interval which is shorter than a predetermined value, and in addition, replicating the data, sent from the node adjacent to the transmitter side, and delivering replicated data to the node adjacent to the receiver side, which is registered in the delivery table;

wherein each of the plurality of receivers and one or more repeaters spontaneously transmit every reception request message.

* * * * *